United States Patent [19]

Yamamoto et al.

[11] Patent Number: 5,778,237

[45] Date of Patent: Jul. 7, 1998

[54] DATA PROCESSOR AND SINGLE-CHIP MICROCOMPUTER WITH CHANGING CLOCK FREQUENCY AND OPERATING VOLTAGE

[75] Inventors: Mitsuyoshi Yamamoto, Higashimurayama; Ikuya Kawasaki, Kodaira; Hideo Inayoshi; Susumu Narita, both of Kokubunji; Masaharu Kubo, Hachiouji, all of Japan

[73] Assignee: Hitachi, Ltd., Tokyo, Japan

[21] Appl. No.: 572,677

[22] Filed: Dec. 14, 1995

[30] Foreign Application Priority Data

Jan. 10, 1995 [JP] Japan .................. 7-018629

[51] Int. Cl.⁶ ................ G06F 1/00; G06F 1/18; G06F 1/26

[52] U.S. Cl. .............. 395/750.04; 395/750.01; 395/750.03; 395/750.08; 364/707

[58] Field of Search ................. 395/750, 550, 395/800, 306, 308, 309, 750.03, 750.04, 750.08, 555, 556; 364/707

[56] References Cited

U.S. PATENT DOCUMENTS

| | | | |
|---|---|---|---|
| 4,766,567 | 8/1988 | Kato | 395/750 |
| 5,237,697 | 8/1993 | Nakano | 395/750 |
| 5,270,581 | 12/1993 | Nakamura | 307/296.1 |
| 5,319,771 | 6/1994 | Takeda | 395/556 |
| 5,471,587 | 11/1995 | Fernando | 395/309 |
| 5,511,013 | 4/1996 | Tokieda et al. | 364/707 |
| 5,560,022 | 9/1996 | Dunstan et al. | 395/750 |
| 5,632,040 | 5/1997 | Nakajima | 395/750 |
| 5,638,307 | 6/1997 | Kamimura et al. | 364/707 |
| 5,642,487 | 6/1997 | Flynn et al. | 395/250 |
| 5,692,201 | 11/1997 | Yato | 395/750 |

FOREIGN PATENT DOCUMENTS

| | | |
|---|---|---|
| 3-68007 | 3/1991 | Japan . |
| 5-108193 | 4/1993 | Japan . |

*Primary Examiner*—Ayaz R. Sheikh
*Assistant Examiner*—Raymond N Phan
*Attorney, Agent, or Firm*—Antonelli, Terry, Stout & Kraus, LLP

[57] ABSTRACT

A microcomputer has a clock generator capable of changing the frequency of an output clock signal; and a power circuit capable of changing the level of an operating voltage to be outputted. The frequencies of clock signals and the levels of operating voltages to be individually fed to a plurality of circuit modules can be dynamically changed according to the content of a packaged register. If the content of the register instructs the reduction of the clock signal frequency and the operating voltage in its absolute value, the operating voltage is lowered in its absolute value prior to the change in the clock signal frequency. On the contrary, if the instruction is to increase the frequency of the clock signal and the operating voltage in its absolute value, the clock signal having the increased frequency is outputted prior to the increase of the operating voltage in the absolute value. As a result, it is possible to prevent in advance the malfunctions of the circuit at the time of switching the operation frequency and the operating voltage of the circuit module.

23 Claims, 32 Drawing Sheets

| BIT VALUE | MEANING |
|---|---|
| 00 | Vmax |
| 01 | Vmax x 1/2 |
| 10 | Vmax x 1/4 |
| 11 | GROUND |

| BIT VALUE | MEANING |
|---|---|
| 00 | Fmax |
| 01 | Fmax x 1/4 |
| 10 | Fmax x 1/16 |
| 11 | CLOCK STOP |

FIG. 4
FOR LOWERING FREQUENCY & VOLTAGE
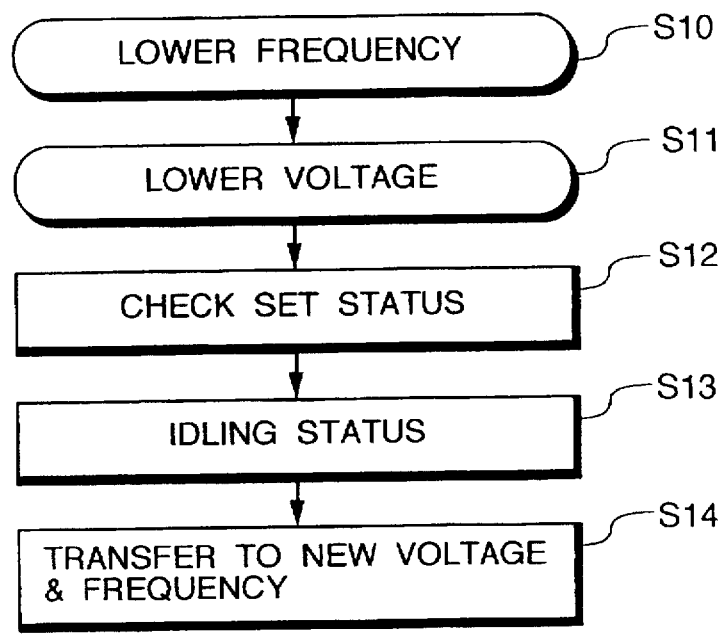
FOR RAISING FREQUENCY & VOLTAGE
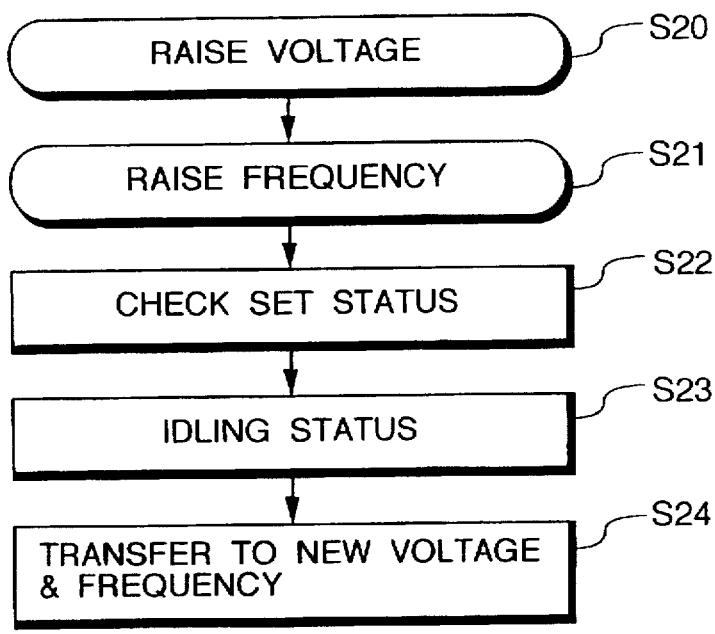
☐ HARDWARE CONTROL STEP
◯ SOFTWARE CONTROL STEP

| BIT VALUE | MEANING |
|---|---|
| 0 | 3V |
| 1 | 2.5V |

| BIT VALUE | MEANING |
|---|---|
| 00 | 100MHz |
| 01 | 25MHz |
| 10 | 6.25MHz |
| 11 | CLOCK STOP |

FIG. 10

| | FREQUENCY | VOLTAGE | SET VALUE | CHANGING SEQUENCE |
|---|---|---|---|---|
| (a) | INCREASE | NO CHANGE | ERROR | |
| (b) | DECREASE | NO CHANGE | | ONLY FREQUENCY |
| (c) | NO CHANGE | INCREASE | | ONLY VOLTAGE |
| (d) | NO CHANGE | DECREASE | ERROR | |
| (e) | INCREASE | INCREASE | | VOLTAGE→FREQUENCY |
| (f) | INCREASE | DECREASE | ERROR | |
| (g) | DECREASE | INCREASE | | FREQUENCY→VOLTAGE |
| (h) | DECREASE | DECREASE | | FREQUENCY→VOLTAGE |

FIG. 17

| PLLEN | STC 1 | STC 0 | CFC 1 | CFC 0 | PFC 1 | PFC 0 | MST 1 | MST 0 |
|-------|-------|-------|-------|-------|-------|-------|-------|-------|

PLLEN : ENABLE OF PLL1
STC1-0 : FREQUENCY MULTIPLICATION FACTOR OF PLL1 : 1 TO 4 TIMES
CFC1-0 : FREQUENCY DIVISION FACTOR OF CPU CLOCK : 1 TO 1/4 TIMES
PFC1-0 : FREQUENCY DIVISION FACTOR OF PERIPHERAL CLOCK : 1 TO 1/4 TIMES
MST1 : STOP TIMER CLOCK
MST0 : STOP CLOCK OF SERIAL INTERFACE

NOTE) : BUS CLOCK IS NOT DYNAMICALLY CHANGED BECAUSE IT IS CONSTANT FOR EXTERNAL DEVICE TO BE CONNECTED

FIG. 18

| NO. | TERMINAL COMBINATION MD2 | MD1 | MD0 | CLOCK INPUT/OUTPUT SUPPLY SOURCE | OUTPUT | PLL CIRCUIT 912 ON/OFF | FUNCTIONS / OPERATIONS |
|---|---|---|---|---|---|---|---|
| 0 | 0 | 0 | 0 | EXTAL | CKIO | ON MULTIPLICATION FACTOR ; 1 | EXTERNAL CLOCK IS INPUTTED FROM EXTAL TERMINAL AND HAS ITS WAVEFORM SHAPED BY PLL CIRCUIT 912 UNTIL IT IS OUTPUTTED TO CKIO TERMINAL |
| 1 | 0 | 0 | 1 | EXTAL | CKIO | ON MULTIPLICATION FACTOR ; 4 | EXTERNAL CLOCK IS INPUTTED FROM EXTAL TERMINAL AND HAS ITS FREQUENCY MULTIPLIED BY FOUR TIMES UNTIL IT IS OUTPUTTED TO CKIO TERMINAL |
| 2 | 0 | 1 | 0 | QUARTZ OSCILLATOR | CKIO | ON MULTIPLICATION FACTOR ; 4 | QUARTZ OSCILLATOR IS OPERATED TO PRODUCE A CLOCK, THE OSCILLATION FREQUENCY OF WHICH IS MULTIPLIED BY FORE TIMES BY PLL CIRCUIT 912 UNTIL IS OUTPUTTED TO CKIO TERMINAL |
| 3 | 0 | 1 | 1 | QUARTZ OSCILLATOR | CKIO | ON MULTIPLICATION FACTOR ; 1 | QUARTZ OSCILLATOR IS OPERATED TO PRODUCE A CLOCK, THE WAVEFORM OF WHICH IS SHAPED BY PLL CIRCUIT 912 UNTIL IT IS OUTPUTTED TO CKIO TERMINAL |
| 4 | 1 | 0 | 0 | EXTAL | CKIO | OFF | EXTERNAL CLOCK IS INPUTTED FROM EXTAL TERMINAL AND HAS ITS WAVEFORM SHAPED BY FREQUENCY DIVIDER 913 UNTIL IT IS OUTPUTTED TO CKIO TERMINAL. FREQUENCY IS DIVIDED TO 1/2. |
| 5 | 1 | 0 | 1 | QUARTZ OSCILLATOR | CKIO | OFF | QUARTZ OSCILLATOR IS OPERATED TO PRODUCE A CLOCK, THE WAVEFORM OF WHICH IS SHAPED BY FREQUENCY DIVIDER 913 UNTIL IT IS OUTPUTTED TO CKIO TERMINAL. FREQUENCY IS DIVIDED TO 1/2. |
| 6 | 1 | 1 | 0 | CKIO | — | OFF | EXTERNAL CLOCK IS INPUTTED FROM CKIO TERMINAL |

DATA PROCESSOR AND SINGLE-CHIP MICROCOMPUTER WITH CHANGING CLOCK FREQUENCY AND OPERATING VOLTAGE

BACKGROUND OF THE INVENTION

The present invention relates to a data processor or a microcomputer, as acting in synchronism with a clock signal, and a data processing system having the former mounted thereon. More particularly, the present invention relates to a technique for reducing the consumption by switching both the frequency of the clock signal for the action or the frequency of the operating clock signal and the voltage of an operation power, such as a technique effective if applied to the microcomputer.

In Japanese Patent Laid-Open No. 68007/1991, there is described a technique for reducing the power consumption of a microcomputer acting in synchronism with a clock signal, by switching the frequency of the operation clock signal, if necessary. In Japanese Patent Laid-Open No. 108193/1993, on the other hand, there is disclosed a microcomputer which has its power consumption reduced by changing the supply voltage fed from the outside and a clock signal frequency according to the set value of a packaged register.

SUMMARY OF THE INVENTION

In accordance with the higher function of a semiconductor integrated circuit such as a microcomputer, however, a plurality of circuit modules composing it are hierarchized and coupled to the internal bus. In case the circuit modules are coupled to the hierarchized internal bus in accordance with their action frequency or speed, the characteristics of the hierarchized circuit modules have to be considered for switching the frequency of the clock signal. When the value of the register is reloaded to change the operation frequency of the inside, for example, we have clarified that the frequency of the operation clock signal of the circuit module such as a bus controller for controlling the interface with the external bus has to be controlled by considering the relationship with the outside.

We have also found that in case the power is to be reduced by making variable not only the operation frequency but also the operating voltage of the circuit modules composing the microcomputer, whether or not a predetermined circuit module is to be operated with a low power consumption cannot be uniquely decided from the general functional difference, i.e., which of a peripheral circuit or a central processing unit the circuit module belongs to. In the central processing unit, for example, the low power consumption has to be preferred for a task requiring no high-speed data processing, and the high speed of the data processing has to be preferred, even if accompanied by the increase in the power consumption, for a task requiring the high-speed processing. For these preferences, there is required a degree of freedom for switching the operation frequency and voltage of the circuit module at a unit of task. In other words, in accordance with the data processing performance of the circuit module and the proportions of the data processing to be executed, the operation supply voltage and the operation frequency of the circuit module can be set relatively freely to optimize the power consumption and the data processing efficiency. The low power consumption is preferred for the task or circuit module requiring no relatively high-speed data processing, and the high power consumption is allowed for the task or circuit requiring a relatively high-speed processing. Thus, the low power consumption is realized while improving the data processing efficiency as a whole.

We have found that, in case the operation supply voltage and frequency can be set relatively freely, it is necessary for enhancing the reliability of the system that no malfunction occurs in the circuit module neither occurs when the setting is changed nor is caused by the mode of combination. In case the operation supply voltage of the circuit is lowered, for example, the drivability of the circuit drops to increase the signal delay. Therefore, the change in the frequency has to be admitted so as to prevent the malfunction which might otherwise be caused by the increase in the signal delay. In case the operation frequency of the circuit is to be increased, the change in the supply voltage has to be admitted so as to prevent the resultant malfunction.

An object of the present invention is to provide a data processor which is given the degree of freedom for switching the operation frequency and operating voltage of a circuit module even at a unit of task so that it can prevent in advance the malfunction of the circuit, which might otherwise occur at the time of switching the operation frequency and operating voltage of the circuit module.

Another object of the present invention is to realize the aforementioned prevention of malfunction relatively simply.

Still another object of the present invention is to provide a data processor which is enabled to arbitrarily set the frequency of the clock signal of a packaged circuit module by considering the interface with an external bus in case the internal bus is hierarchized.

The foregoing and other objects and novel features of the present invention will become apparent from the following description to be made with reference to the accompanying drawings.

The summary of the representative ones of the invention to be disclosed herein will be briefly described in the following.

[1] According to the invention for controlling both the operation frequency and the operating voltage of a plurality of circuit modules, there is provided a data processor comprising: a clock generator (120, 320) capable of outputting clock signals of different frequencies selectively; a power circuit (110, 310) capable of outputting different voltages selectively as the operating voltages of said circuit modules; and storage means (114, 124, 307) for reloadably storing control data for designating the frequencies of the clock signals and the operating voltages to be fed to one or more circuit modules, whereby the selection of the clock signal frequency and the selection of the operating voltage in said clock generator and said power circuit are controlled on the basis of the stored control data. Further comprised is first control means (131, 3341) for controlling the switching the output states of said clock generator and said power circuit so as to block the state, in which the operating voltage is reduced in its absolute value prior to the change in the present operation frequency, when it detects an instruction to reduce said clock signal frequency and the operating voltage in its absolute value, and to block the state, in which the clock signal having an increased frequency is outputted prior to the increase of the operating voltage in its absolute value, when it detects an instruction to increase the frequency of the clock signal and the operating voltage in its absolute value, thereby to prevent the malfunctions of the circuit modules at the time of or immediately after the switching of the frequency and the operating voltage.

In order to simply realize the aforementioned control mode according to the first control means, said clock generator includes output gates (1206, 3261, 3262, 3263) for interrupting the outputting of the clock signals for a predetermined time period on the basis of the instruction from said first control means when the outputting of the frequency is switched.

In the aspect of preventing in advance the fear of the malfunctions due to the undesired switching mode of the frequency and the supply voltage, although the setting can be inhibited in advance, there is further comprised second control means (132, 3342) for suppressing the outputting state change of the clock generator and the power circuit by detecting an instruction to increase not the operating voltage in its absolute value but the frequency of the clock signal or an instruction to reduce not the clock signal frequency but the operating voltage in its absolute value on the basis of the control data before and after the reloading of said storage means.

In order to control the switching of the clock frequency and the supply voltage individually for the plurality of circuit modules, said storage means may include: a plurality of storage regions (3071, 3072) for storing the control data reloadably for each predetermined one of said circuit modules; selectors (3251, 3252, 3253) for individually selecting the clock signals to be fed to the corresponding circuit modules in accordance with the individual control data of the memory regions of said memory means; and selectors (3141, 3142, 3143) for individually selecting the operating voltages to be fed to the corresponding circuit modules in accordance with the individual control data of the storage regions of said memory means.

In the aforementioned data processor, said circuit modules are one circuit module acting as a central processing unit and another circuit module having its operation controlled by the central processing unit, and all of them are constructed as a single-chip microcomputer formed over one semiconductor substrate. The data processor can also be constructing by making said circuit modules, said storage means, said first control means and said second control means into the single-chip semiconductor integrated circuit and by arranging said clock generator and said power circuit at the outside of said semiconductor integrated circuit. The data processor can also be constructed into a multi-chip microcomputer by making said circuit modules of one circuit module acting as a central processing unit and another circuit module having its operation controlled by the central processing unit, by making the circuit module acting as said central processing unit, one of said anther circuit module, said storage means, said first control means and said second control means into a single-chip semiconductor integrated circuit, and by arranging the remaining ones of said another circuit module, said clock generator and said power circuit at the outside of said semiconductor integrated circuit.

[2] According to the invention relating to the switching of the operation frequency for the data processor having a hierarchized internal bus, there is provided a single-chip microcomputer comprising: a first internal bus (60) to which is coupled a central processing unit (61); a second internal bus (70) to which is coupled a bus controller (72) interfacing with an external bus through an input/output circuit (73) for controlling the interface with the external bus; a third internal bus (80) to which is coupled a predetermined peripheral circuit; a clock pulse generator (9) for outputting a first clock signal (91) for a circuit module coupled to said first internal bus; a second clock signal (92) for a circuit module coupled to said second internal bus, and a third clock signal (93) for a circuit module coupled to said third internal bus; and a clock controller (65) coupled to said first internal bus for making variable the signal of at least one of said first and third clock signals in accordance with the control data which have their content set by said central processing unit.

In case an external device (e.g., a synchronous dynamic random access memory) connected with the external bus and operating according to the bus cycle controlled by said bus controller acts in synchronism with the clock signal, the data processor is equipped with an output terminal (CKIO) for the external clock signal, if it is considered that a synchronizing operation clock signal is fed to said external device. In this case, said clock controller has its second clock signal frequency equalized to the frequency of said external clock signal.

In case it is considered that the bus cycles or bus operations inside and outside of the single-chip microcomputer cannot be synchronized unless the frequency of the second clock signal for the second internal bus, to which is coupled the bus controller, accords to the operation speed of the external device coupled to the external bus, it is desired for the high-speed data processing that the circuit module of the first internal bus, to which is coupled the central processing unit, can operate at a high speed, if necessary. In case, therefore, a cache memory device is packaged in the data processor, it is preferable for improving the data processing efficiency that the cache memory device is used for the interface between said first internal bus and said second internal bus.

According to a more detailed more, there is provided a data processor comprising: a first internal bus (60), to which is coupled a central processing unit (61); a second internal bus (70) interfacing with an external bus through an input/output circuit (73) for controlling the interface with the external bus; a third internal bus (80) to which is coupled a predetermined peripheral circuit; a clock pulse generator (9) for outputting a first clock signal (91) for a circuit module coupled to said first internal bus, a second clock signal (92) for a circuit module coupled to said second internal bus, and a third clock signal (93) for a circuit module coupled to said third internal bus; and a clock controller (65) for controlling said first to third clock signal frequencies individually, wherein all of these components are constructed into a single-chip microcomputer. Moreover, said clock pulse generator includes: first frequency changing means (910, 911, 912, 913, 914) coupled to first connection terminals (XTAL, EXTAL) capable of being coupled to an external clock source; second frequency changing means (921) coupled to a second connection terminal (CKIO) capable of being coupled to the external clock source; select means (930, 931) for selecting the output of either of said first and second frequency changing means; third frequency changing means (940, 941, 942, 943) made receptive of the clock signal selected by said select means, for changing the frequencies of said first to third clock signals individually; and a clock signal path (951) for outputting the clock signal, which is outputted from said first frequency changing means, as an external clock signal. At this time, the aforementioned clock control circuit (65) includes a clock control register (650) coupled to external clock mode terminals (MD0 to MD2), and the control data for specifically designating the changing ratio of the frequency to the first to third clock signals by said third frequency changing means and for designating the changing ratio of the frequency by said second frequency changing means are set by the central processing unit. In accordance with the status of the external clock mode terminal, the frequency changing ratio by said first frequency changing means is decided to select either a first state, in which the third frequency changing means is controlled to transmit the clock signals from the first connection terminal to said third frequency changing means and to equalize the second clock signal frequency to the frequency of the clock signal outputted from said first frequency changing means, or a second state in which the clock signal can be transmitted from the second connection terminal to the input of the third frequency changing means. In accordance with the control data set in said clock control register, moreover, the frequency changing ratio by said second frequency changing means and the frequency changing ratio corresponding to the first and third clock signals by said third frequency changing means are controlled to variable ones. At the same time, in said second state designated by the clock mode terminal, in accordance with the control data set by said clock control register, the frequency changing ratio of the second clock signal by said third frequency changing means is controlled such that the frequency of the second clock signal is equalized to the frequency of the clock signal fed from the second connection terminal.

In order to further enlarge the frequency changeable range of the first and second clock signals, there may be provided connection means (920) for connecting the output of the first frequency changing means with the input of the second frequency changing means in the first state which is designated by the clock mode terminal. At this time, in case the external device (e.g., a synchronous dynamic random access memory) is operated in synchronism with the clock signal, as described above, the aforementioned clock signal path may be coupled to the second connection terminal if it is considered to feed the synchronizing clock signal to the external device.

In case the first connection terminal is used as both the connection terminal of an oscillation element and the input terminal of the external clock signal, the first frequency changing means can be constructed to include: a frequency divider (913) and a phase locked loop circuit (912) for selecting either of the clock signal, which comes from an oscillator (910) having a vibration element (or oscillation element), attached to the first connection terminal for oscillations, and the clock signal which is fed directly from the first connection terminal; and select means (914) for outputting the output of either of the two as a fundamental clock signal. In case the third frequency changing means is constructed of a frequency divider, the frequency changeable range can be enlarged if the second frequency changing means is constructed of the phase locked loop circuit acting as multiplier means.

From the means thus far described, the following effects can be achieved.

[1] According to the aforementioned means for controlling both the operation frequency and the operating voltage of the circuit modules, the control data for instructing the switching modes of the clock frequency and the operating voltage are reloadably set in the frequency setting register and the storage means by the central processing unit. As a result, the operating voltages and the operating frequencies of the control circuits can be freely switched by reloading the control data in accordance with the data processing performances and the proportions of the data processings to be executed. As a result, a low power consumption is preferred for the task or circuit module which requires no relatively high-speed data processing, but a high power consumption is allowed for the task or circuit module which requires a relatively high-speed data processing, so that the low power consumption is realized while improving the data processing efficiency as a whole. The controls for lowering the power consumption while improving the data processing efficiency as a whole can be further finely realized by making it possible to switch the clock frequency and the supply voltage individually for a predetermined circuit module.

If the operating voltage is to be lowered earlier in case both the frequency of the clock signal and the operating voltage are to be lowered, the drivability of the circuit in the operating status may be lowered, till the clock signal frequency is lowered, to cause the malfunctions due to the undesired signal delay. In this case, the first control circuit controls the switching procedures of the frequency and the operating voltage to block the status in which the operating voltage is lowered prior to the change in the operating frequency at present. On the other hand, if the clock signal frequency is increased earlier in case the frequency of the clock signal and the operating voltage are to be increased, the drivability of the circuit in the operating status may fail to follow the improvement in the operating speed thereby to cause the malfunctions till the operating voltage is raised. In this case, too, the first control circuit controls the procedure of switching the frequency and the operating voltage so as to block the status in which the clock signal having its frequency raised is outputted prior to the rise in the operating voltage. Thus, the first control means can prevent the malfunctions in the procedure of switching the clock signal frequency and the operating voltage.

In the switchings of the clock frequency and the operating voltage, the raising of not the operating voltage in its absolute value but the frequency of the clock signal will cause no improvement in the drivability of the circuit but a relatively high signal propagation delay improper for the high-speed operation even if the circuit operations are speeded up. On the other hand, the lowering of not the clock signal frequency but the supply voltage in its absolute value will still cause the high-speed operation of the circuit although the drivability of the circuit is lowered to increase the signal propagation delay. Against such instruction, the second control circuit can suppress the switching between the clock frequency and the supply voltage to prevent in advance the fear of the malfunctions which might otherwise be caused by the undesired switching modes of the frequency and the operating voltage.

[2] According to the aforementioned means relating to the switching of the operation frequency for the data processor having the hierarchized internal bus, the second clock signal is excluded from the clock signal having the variable frequency in the data processor having its first to third internal buses hierarchized. In the means of the aforementioned specific mode, the clock controller controls the frequency of the second clock signal to be held constant, when the frequencies of the first and third clock signals have their frequencies varied dynamically according to the control data. This satisfies the condition that the frequency of the second clock signal for the second internal bus, to which is coupled the bus controller, cannot synchronize the internal and external bus cycles or bus operations unless it accords to the operating speed of the external device to which is coupled the external bus. The dynamically controllability of the first clock signal frequency with the control data satisfies that it is desirable for the high-speed data processing that the circuit module of the first internal bus, to which is coupled the central processing unit, can operate at a high speed, if necessary. When a task requiring no high-speed operation is to be executed, on the contrary, the clock signal frequency is reduced to realize the low power consumption. If the frequency of the third clock signal can be dynamically and variably controlled with the control data, the circuit module, as coupled to the third internal bus, can be controlled in the operation speed independently of the remaining circuit modules in accordance with the function and operating status thereby to promote the low power consumption, because it belongs to the peripheral circuit module.

The external clock signal to be outputted from the output terminal (CKIO) has its frequency equalized to that of the second clock signal. The external device, as operated in synchronism with the clock signal, can be controlled by the bus controller (as can act in response to the second clock signal) to use the clock signal outputted from the external terminal (CKIO), as a clock signal for synchronizing the external device.

BRIEF DESCRIPTION OF THE DRAWINGS

FIG. 4 is a flow chart showing one example of a control sequence for changing the frequency and the internal voltage of an internal clock signal;

FIG. 10 is a diagram for explaining one example of control modes by first and second control means;

FIG. 17 is a diagram showing one example of the format of a clock control register;

FIG. 18 is a diagram for explaining a clock mode to be set by mode terminals;

DESCRIPTION OF THE PREFERRED EMBODIMENTS

[1] A plurality of embodiments of the invention for controlling both the operating frequencies and the operating voltages of circuit modules will be described first of all with reference to FIGS. 1 to 14.

Figure 1:
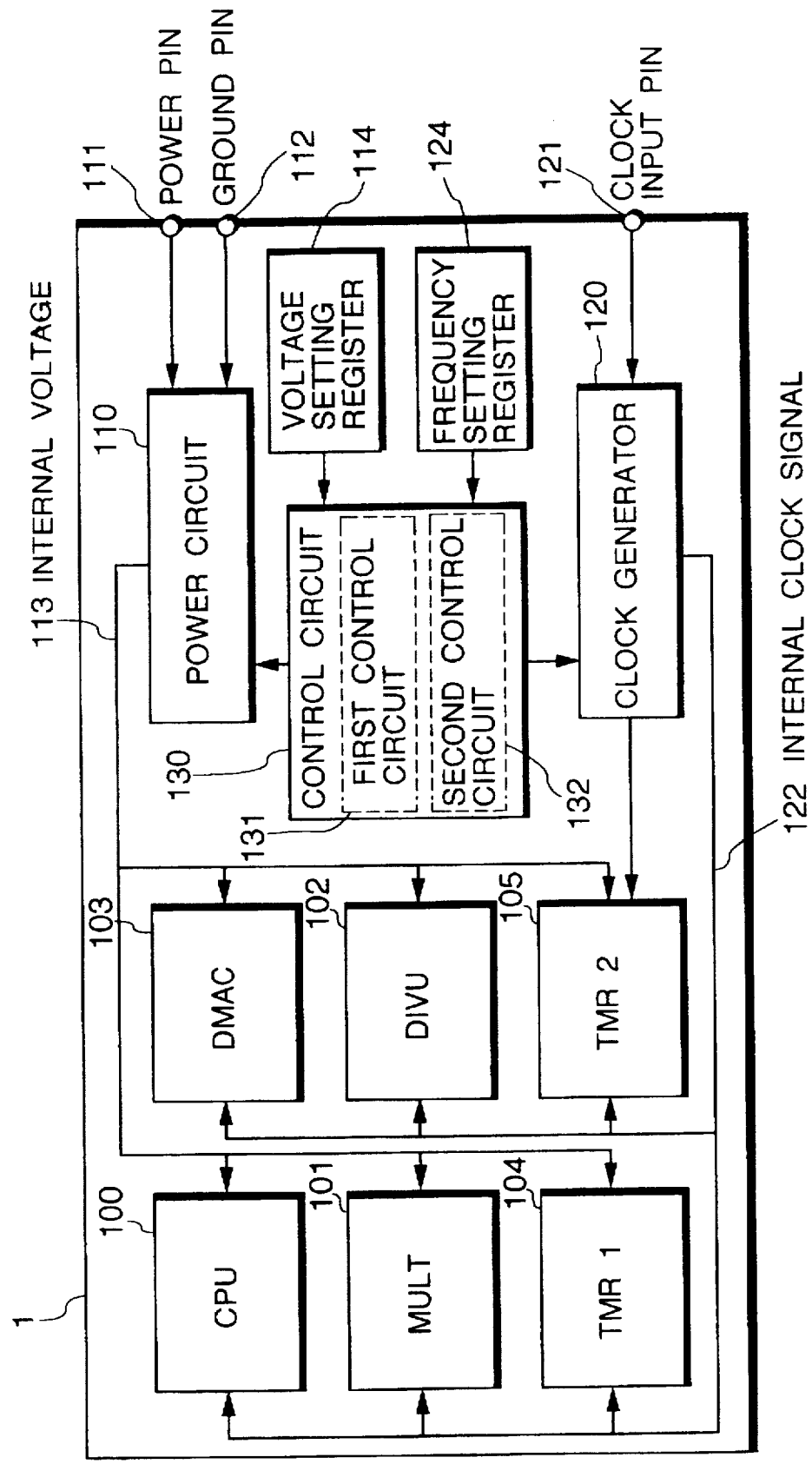
FIG. 1 is a block diagram showing one embodiment of a single-chip microcomputer to which is applied the present invention.

FIG. 1 is a block diagram showing a single-chip microcomputer according to a first embodiment of the present invention. In the single-chip microcomputer 1 of the present embodiment, there are representatively shown a central processing unit (as designated at CPU) 100, a multiplier (as designated at MULT) 101, a divider (as designated at DIVU) 102, a direct memory access controller (as designated at DMAC) 103, a timer (as designated at TMR1) 104 and a timer (as designated at TMR2) 105. The single-chip microcomputer 1 is further equipped with the not-shown RAM and ROM and an external bus interface, which can be connected with individual circuit modules through the not-shown predetermined internal buses. Both the multiplier 101 and the divider 102 are designated to coprocessors for processing the data by decoding the commands which are issued from the central processing unit 100. The not-shown ROM latches the operation program of the central processing unit 100. The not-shown RAM provides a work area or a temporary storage area for the central processing unit 100.

The operating power of the circuit modules 100 to 105, as representatively shown in FIG. 1, is supplied by a power circuit 110. The power circuit 110 can receive a power voltage at 5V from a power pin 111 and the ground voltage at 5 V of the circuit from a ground point 112, to output a different internal voltage 113 selectively. According to the present embodiment, the internal voltage 113 is set to either supply voltage or the voltage which is lowered from the power voltage. The ground potential is commonly supplied to the individual circuit modules.

The circuit modules 100 to 105, as representatively shown in FIG. 1, have heir operation clock signals supplied from a clock generator 120. This clock generator 120 can receive external clock signals, as fed from external clock input pins 121, to output desired clock signals as internal clock signals 122 from a plurality of clock signals having different frequencies. Alternatively, the clock generator may connected an oscillator with the input pins 121 so that the internal clock signals 122 may be selectively oscillated by the oscillator and the clock generator 120.

Figure 2:
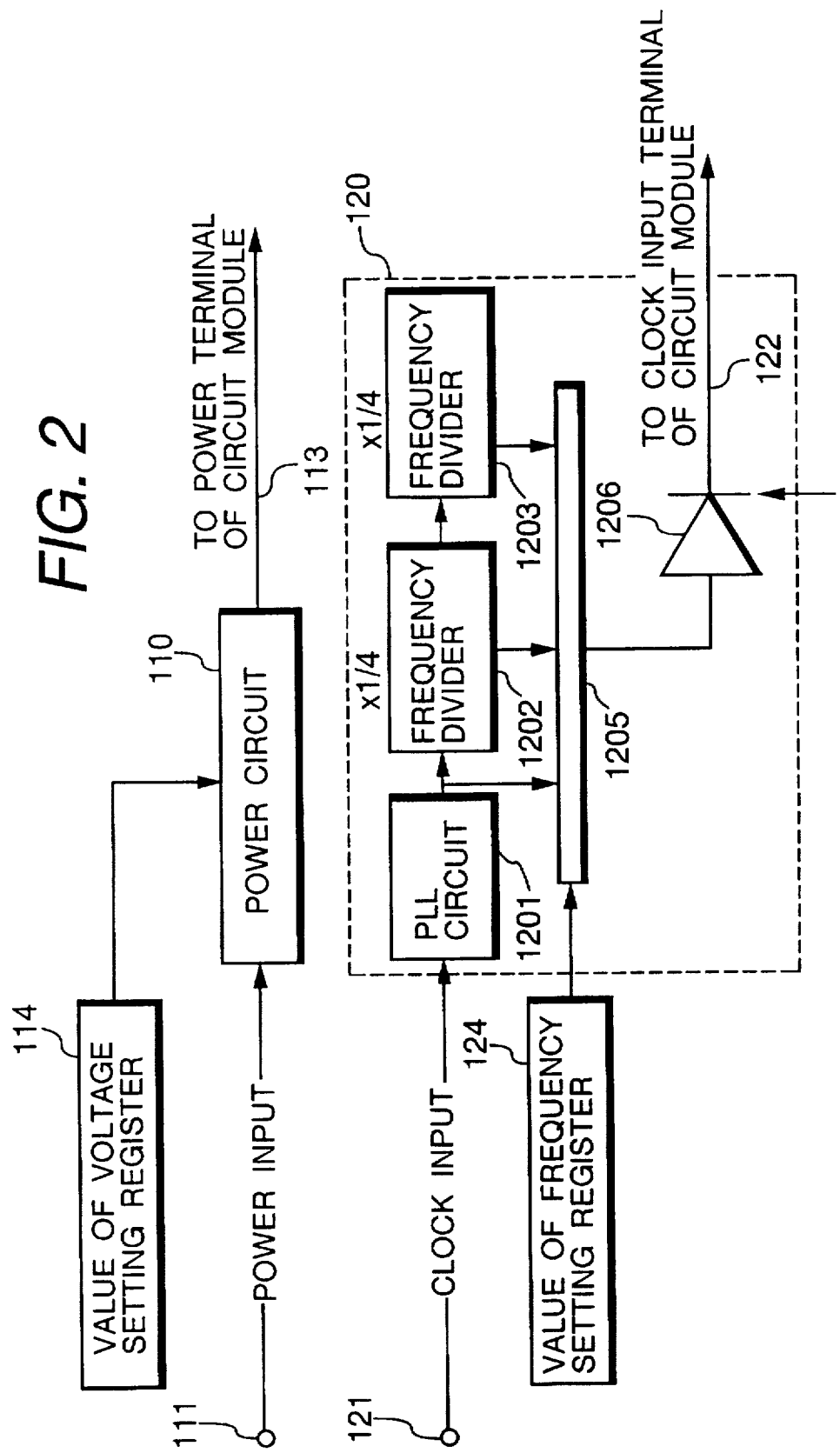
FIG. 2 is a block diagram showing one example of a clock generator of FIG. 1.

FIG. 2 shows one detailed example of the clock generator 120. The clock generator 120, as shown in FIG. 2, is equipped with a PLL circuit 1201 for receiving a clock signal from the outside to output the clock signal by multiplying its frequency, and frequency dividers 1202 and 1203 coupled in two stages in series with the output of the PLL circuit 1201. These frequency dividers 1202 and 1203 individually output the inputs by dividing their frequencies into 1/4. The individual outputs of the PLL circuit 1201 and the frequency dividers 1202 and 1203 are selected by a selector 1205 so that the selected clock signals are fed to the clock input terminals of the individual circuit modules 100 to 105 through an output gate 1206 such as a clocked inverter. Although one set of the selector and the output gate is representatively shown in FIG. 2, it should be understood that the selector 1205 and the output gate 1206 are provided for each predetermined circuit module in case the frequency of the internal clock signal is to be set for each predetermined circuit module. Similar provision is made for the internal voltage to be selected by the power circuit 110.

A voltage setting register 114 and a frequency setting register 124, as shown in FIG. 1, are storage means for reloadably storing the control data for designating the frequencies of the internal voltages 113 and the internal clock signals 122 to be fed to the circuit modules 100 to 105. The voltage setting register 114 and the frequency setting register 124 are arranged in predetermined address spaces of the central processing unit 100, for example, so that an instruction such as an LDC (Load Control Register) is executed by the central processing unit 100 to set their control data. As a result, the reloading operations of the voltage setting register 114 and the frequency setting register 124 can be desirably executed according to the operating program of the microcomputer 1. For example, the reloading operations can be set for each task according to the loads of the operations. Specifically, at the start of a task, the registers 114 and 124 may be included for the targets of saving, initializing and restoring a stack pointer or a status register of the CPU 100.

Figure 3A:
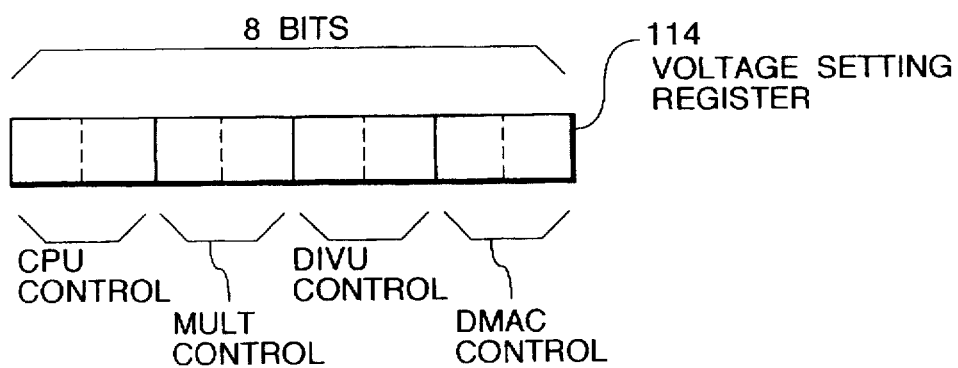
FIGS. 3(A) and 3(B) are diagrams for explaining formats of examples of a voltage setting register and a frequency setting register, as shown in FIG. 1.
Figure 3B:
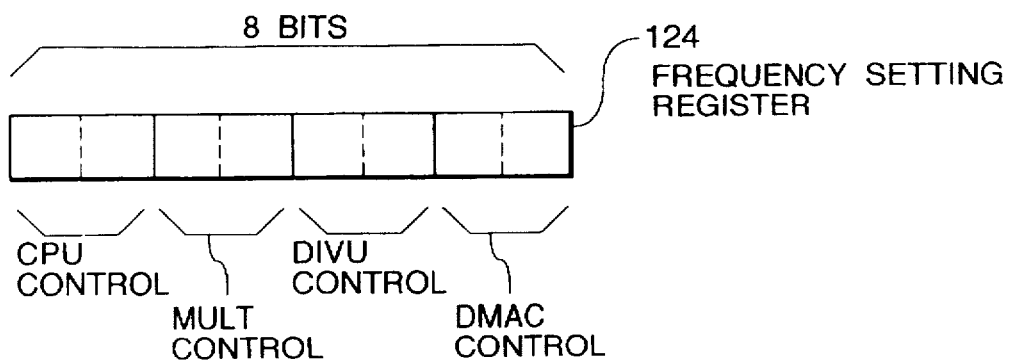

FIG. 3(A) shows an detailed example of the voltage setting register 114, and FIG. 3(B) shows a detailed example of the frequency setting register 124. The voltage setting register 114 is constructed of 8 bits, although not especially limited thereto, to determine the internal voltages 113 to be fed to the CPU 100, the MULT 101, the DIVU 102 and the DMAC 103, for example, individually at values of 2 bits. Of the individual 2 bits: the bit value "00" indicates the maximum voltage level (Vmax); the bit value "01" indicates (Vmax)×1/2; the bit value "10" indicates (Vmax)×1/4; and the bit value "11" indicates the ground potential. The frequency setting register 124 is composed of 8 bits, although not especially limited thereto, to determine the frequencies of the internal clock signals to be fed to the CPU 100, the MULT 101, the DIVU 102 and DMAC 103, individually at values of 2 bits. Incidentally, at the power-on-reset time, both the registers 114 and 124 have their all bits initialized to 0. Incidentally, with the constructions of the registers 114 and 124, as shown in FIGS. 3(A) and 3(B), the frequencies of the operating power and the internal clock signal to be fed to other circuit modules can be fixed at predetermined values. In order to increase the number of the modules whose operating voltage and clock signal are to have their frequencies variably controlled, moreover, it is sufficient to increase the bit numbers of the voltage setting register 114 and the frequency setting register 124 thereby to accordingly increase the logic scales for selecting the frequencies of the voltages and clock signals of the power circuit 110 and the clock generator 120. The stop of feed of the internal clock signal implies that the signal is fixed at a predetermined level.

In FIG. 1, reference numeral 130 designates a control circuit to control the frequency selection of the internal clock signal 122 and the level selection of the internal voltage 113 in the clock generator 120 and the power circuit 110 on the basis of the control data which are latched in the voltage setting register 114 and the frequency setting register 124. The control data, as latched in the voltage setting register 112 and the frequency setting register 124, are fed to the power circuit 110 and the clock generator 120 so that the power circuit 110 and the clock generator 120 select the frequency of the internal clock signal 122 and the internal voltage 113 in accordance with the control data and feed them to the circuit modules.

The control circuit 130 is composed of a first control circuit 131 and a second control circuit 132 for preventing the malfunctions of the circuit modules in advance at the time of changing the operating voltage and the clock signal frequency.

The first control circuit 131 administers the controls for preventing the malfunctions of the internal circuit modules in the procedure of switching the frequency of the internal clock signal 122 and the internal voltage 113. Specifically, in case both the frequency of the internal clock signal 122 and the internal voltage 113 are to be decreased, if the internal voltage 113 is lowered before the frequency, the drivability of the circuit in the circuit module in the operating status may drop, while the frequency of the internal clock signal 122 is lowered, to cause the malfunctions due to an undesired signal delay. In case the frequency of the internal clock signal 122 and the internal voltage 113 are to be increased, the drivability of the circuit in the circuit module in the operating status may fail to follow the improvement in the operating speed thereby to cause the malfunctions till the internal voltage 113 is increased. In order to cope with these malfunctions, therefore, the first control circuit 131 blocks the status, in which the operating voltage 113 decreases, prior to the change in the operating frequency at present, if it detects the instruction to decrease the frequency of the internal clock signal 122 and the internal voltage 113 in the clock generator 120 and the power circuit 110 in the procedure of changing the frequency of the internal clock signal 122 and the internal voltage 113, and blocks the status, in which the clock signal 122 having its frequency increased prior to the increase in the voltage is fed to the circuit modules, if it detects the instruction to increase the frequency of the internal clock signal 122 and the internal voltage 113.

For example, the mode of changing the operating voltage and the frequency is decided. In case the result of this decision indicates "the decreases of both the frequency of the internal clock signal 122 and the internal voltage 113", there are taken the procedures of changing the frequency by feeding the changed value of the frequency setting register 124 earlier to the clock generator 120 and then changing the operating voltage. In case the result of this decision indicates "the increases of both the frequency of the internal clock signal 122 and the internal voltage 113", there are taken the procedures of raising the operating voltage by feeding the changed value of the voltage setting register 114 earlier to the power circuit 110 and then changing the frequency. These procedures are executed by the first control circuit 131. Alternatively, at the time of changing the operating voltage and the frequency, the first control circuit 131 can adopt the procedures of stopping the feed of the clock signal 122 to the circuit modules through the output gate 1206 and opening again the feed of the clock signal 122 after lapse of a predetermined time period for the stable circuit operations. The first control circuit 131 is shown as belonging to the hardware which is independent of the central processing unit 100 in FIG. 1, but its function can be realized by the central processing unit 100 and its operation programs.

The second control circuit 132 administers the controls for preventing the malfunctions which are caused by the undesired switching modes of the frequency of the internal clock signal 122 and the internal voltage 113. Specifically, if the frequency of the clock signal 122 is increased without no increase in the internal voltage 113 at the time of changing in the frequency of the internal clock signal 122 and the internal voltage 113, the drivability of the circuit is not improved to cause a delay in a relatively high signal propagation improper for the high-speed operation. On the other hand, if the internal voltage 113 is lowered without any decrease of the frequency of the clock signal 122, the circuit still operates at a high speed although its drivability is dropped to increase the signal propagation delay. In order that the second control circuit 132 may not be switched in those modes to perform the malfunctions, it can detect either the instruction to increase not the internal voltage 113 but the frequency of the internal clock signal 122 or the instruction to decrease not the frequency of the internal clock signal 122 but the internal voltage 113, on the basis of the control data before and after the reloading of the storage means composed of the voltage setting register 114 and the frequency setting register 124, thereby to suppress the change, as based upon the instruction, in the output statuses of the clock generator 120 and the power circuit 110.

For example, the second control circuit latches the values of the voltage setting register 114 and the frequency setting register 124 immediately before reloaded, when it detects the instructions to reload the registers 114 and 124, and compares the latched and reloaded values of the registers 114 and 124 to decide whether the undesired statuses are instructed. If the undesired instructions are detected, the control circuit 130 is caused to suppress the update the selected statuses of the frequency and voltage with the changed values of the registers 114 and 124, and informs the central processing unit 100 of the error status to urge the second settings of the registers 114 and 124. As a result, it is possible to prevent the malfunctions which might otherwise be caused by the undesired changing modes of the frequency and the supply voltage.

The second control circuit 132 is shown as belonging to the hardware which is independent of the central processing unit 100 in FIG. 1, but its function can be realized by the central processing unit 100 and its operation programs. Specifically, in the routine of changing the voltage setting register 114 and the frequency setting register 124, the values of the voltage setting register 114 and the frequency setting register 124 are read in the central processing unit 100, and the read values are compared with the values to be changed thereby to decide whether or not it is in the undesired instruction status. If this answer is YES, this changing routine is ended to start a predetermined exception routine.

FIG. 4 shows one example of the procedure of controlling the switchings of the operating voltage and the frequency by the control circuit 130. In case the operating voltage and the frequency are to be lowered, the frequency setting register 124 is reloaded (at Step 10) by the CPU 100 with such a value as to lower the frequency of a desired circuit module, and the voltage setting register 114 is reloaded (at Step S11) by the CPU 100 with such a value as to lower the operating voltage of the predetermined circuit module. For the reloaded value, the control circuit 130 checks the set status (at Step S12). If the result of this check is either the instruction to increase not the internal voltage 113 but the frequency of the internal clock signal 122 or the instruction to decrease the frequency of the internal clock signal 122 but the internal voltage 113, this instruction is informed to the central processing unit 100 to end the routine. In the case of another switching mode, in the idling status (at Step S13) in which the outputting of the internal clock signal 122 is stopped by the output gate 1206, the internal voltage 113 and the frequency of the internal clock signal 122 are switched according to the set values of the frequency setting register 124 and the voltage setting register 114. This idling status is continued for a predetermined time period till the statuses of the power circuit 110 and the clock generator 120 become stable. After this, the operations can be effected (at Step S14) at new voltage and frequency by restarting the outputting of the internal clock signal through the output gate 1206.

In case the operating voltage and the frequency are to be raised, the voltage setting register 114 is reloaded (at Step S20) by the CPU 100 with such a value as to raise the internal operating voltage of a desired circuit module, and the frequency setting register 124 is reloaded (at Step S21) by the CPU 100 with such a value as to raise the operating frequency of the desired circuit module. For the reloaded value, the control circuit checks the set status (at Step S22). If the result of this check is either the instruction to increase not the internal voltage 113 but the frequency of the internal clock signal 122 or the instruction to decrease the frequency of the internal clock signal 122 but the internal voltage 113, this instruction is informed to the central processing unit 100 to end the routine. In the case of another switching mode, in the idling status (at Step S23) in which the outputting of the internal clock signal 122 is stopped by the output gate 1206, the internal voltage 113 and the frequency of the internal clock signal 122 are switched according to the set values of the frequency setting register 124 and the voltage setting register 114. This idling status is continued for a predetermined time period till the statuses of the power circuit 110 and the clock generator 120 become stable. After this, the operations can be effected (at Step S24) at new voltage and frequency by restarting the outputting of the internal clock signal through the output gate 1206. Incidentally, similar controls are performed for other switching modes.

In the idling status, in which the outputting of the internal clock signal 122 is stopped in the procedure of FIG. 4, the procedure of switching the internal clock signal and the internal voltage and then restarting the feed of the internal clock signal after lapse of a predetermined time period blocks the status, in which the supply voltage is lowered prior to the change in the operating frequency at present, and blocks the status in which the clock signal having its frequency increased is fed to the circuit module prior to the increase in the supply voltage. These blocking operations can be realized by the simple method of stopping the feed of the internal clock signal especially at the switching time. The time length of the idling period can be controlled by the timer 105. This timer 105 is enabled to retain its number or time counting operations, even if it is fed with the clock signal through a path different from those of other circuit modules to stop the feed of the clock signal to the circuit modules. Incidentally, the control procedure by the first control circuit can also be controlled, for lowering the voltage and the frequency, such that the operation to lower the internal voltage is not started before the end of the switching operation to lower the frequency, and, for raising the voltage and the frequency, such that the operation to raise the internal voltage is not started before the end of the switching operation to raise the internal voltage. In this modified case, however, the controls of the switching procedure have to be individualized or classified for the switching modes.

According to the first embodiment, the following effects can be attained.

(1) The control data for instructing the switching modes of the clock frequency and the operating voltage are reloadably set in the frequency setting register 124 and the voltage setting register 114 by the central processing unit. As a result, the operating voltages and the operating frequencies of the control circuits packaged in the single-chip microcomputer 1 can be freely switched by reloading the control data in accordance with the performances of the circuit modules and the proportions of the data processings to be executed. As a result, a low power consumption is preferred for the task or circuit module which requires no relatively high-speed data processing, but a high power consumption is allowed for the task or circuit module which requires a relatively high-speed data processing, so that the low power consumption can be realized while improving the data processing efficiency as a whole. The controls for lowering the power consumption while improving the data processing efficiency as a whole can be further finely realized by making it possible to switch the clock frequency and the supply voltage individually for a predetermined circuit module.

(2) In the switchings of the clock frequency and the operating voltage, the raising of not the operating voltage but the frequency of the clock signal will cause no improvement in the drivability of the circuit but a relatively high signal propagation delay improper for the high-speed operation even if the circuit operations are speeded up. On the other hand, the lowering of not the clock signal frequency but the supply voltage will still cause the high-speed operation of the circuit although the drivability of the circuit is lowered to increase the signal propagation delay. Against such instruction, the second control circuit 132 can suppress the switching between the clock frequency and the supply voltage to prevent the malfunctions which might otherwise be caused by the undesired switching modes of the frequency and the operating voltage.

(3) If the operating voltage is to be lowered earlier in case both the frequency of the clock signal and the operating voltage are to be lowered, the drivability of the circuit in the operating status may be lowered, till the clock signal frequency is lowered, to cause the malfunctions due to the undesired signal delay. In this case, the first control circuit 131 controls the switching procedures of the frequency and the operating voltage to block the status in which the operating voltage is lowered prior to the change in the operating frequency at present. On the other hand, if the clock signal frequency is increased earlier in case the frequency of the clock signal and the operating voltage are to be increased, the drivability of the circuit in the operating status may fail to follow the improvement in the operating speed thereby to cause the malfunctions till the operating voltage is raised. In this case, too, the first control circuit 131 controls the procedure of switching the frequency and the operating voltage so as to block the status in which the clock signal having its frequency raised is fed prior to the rise in the operating voltage. As a result, in the procedure of switching the clock signal frequency and the operating voltage, it is possible to prevent a fear of the malfunctions of the circuit modules in advance.

Figure 5:
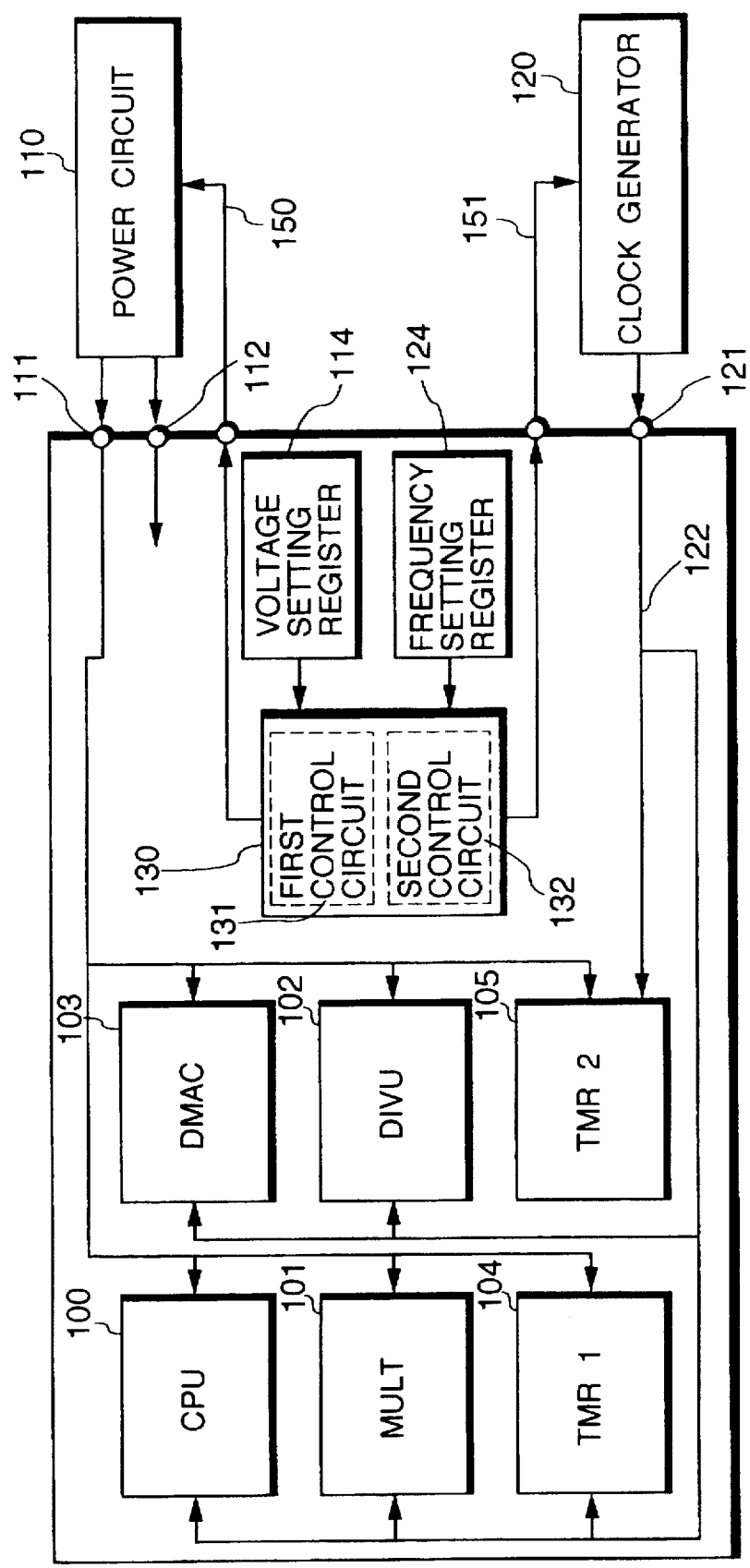
FIG. 5 is a block diagram showing a second embodiment of a data processor to which is applied the present invention.

FIG. 5 shows a second embodiment of the data processor according to the present invention. The detailed description of the circuit blocks having the same functions as those shown in FIG. 1 will be omitted by designating them at the identical reference numerals. The second embodiment, as shown in FIG. 5, is different from the embodiment shown in FIG. 1 in that the power circuit 110 and the clock generator 120 are arranged outside of the chip and made receptive of a supply voltage selecting signal 150 and a frequency selecting signal 151 from the microcomputer to feed the power having the voltage instructed thereby to the power pin 111 and the clock signal having the frequency instructed thereby to the clock input pin 121. In case the internal voltage and the operating frequency can be set for each predetermined circuit module as in the embodiment of FIG. 1, there are individually required a plurality of power pins 111 and clock input pins 121. Although not especially shown, the voltage setting register 114 and the frequency setting register 124 of the embodiment of FIG. 1 can be partially assigned for selecting the operations of the external power circuit and the external clock generator to output the control signal corresponding to the set value to the outside of the chip thereby to switch the supply voltage to be fed to the power pin 111 and the frequency of the external clock signal to be fed to the clock input pin 121 in the embodiment of FIG. 1.

Figure 6:
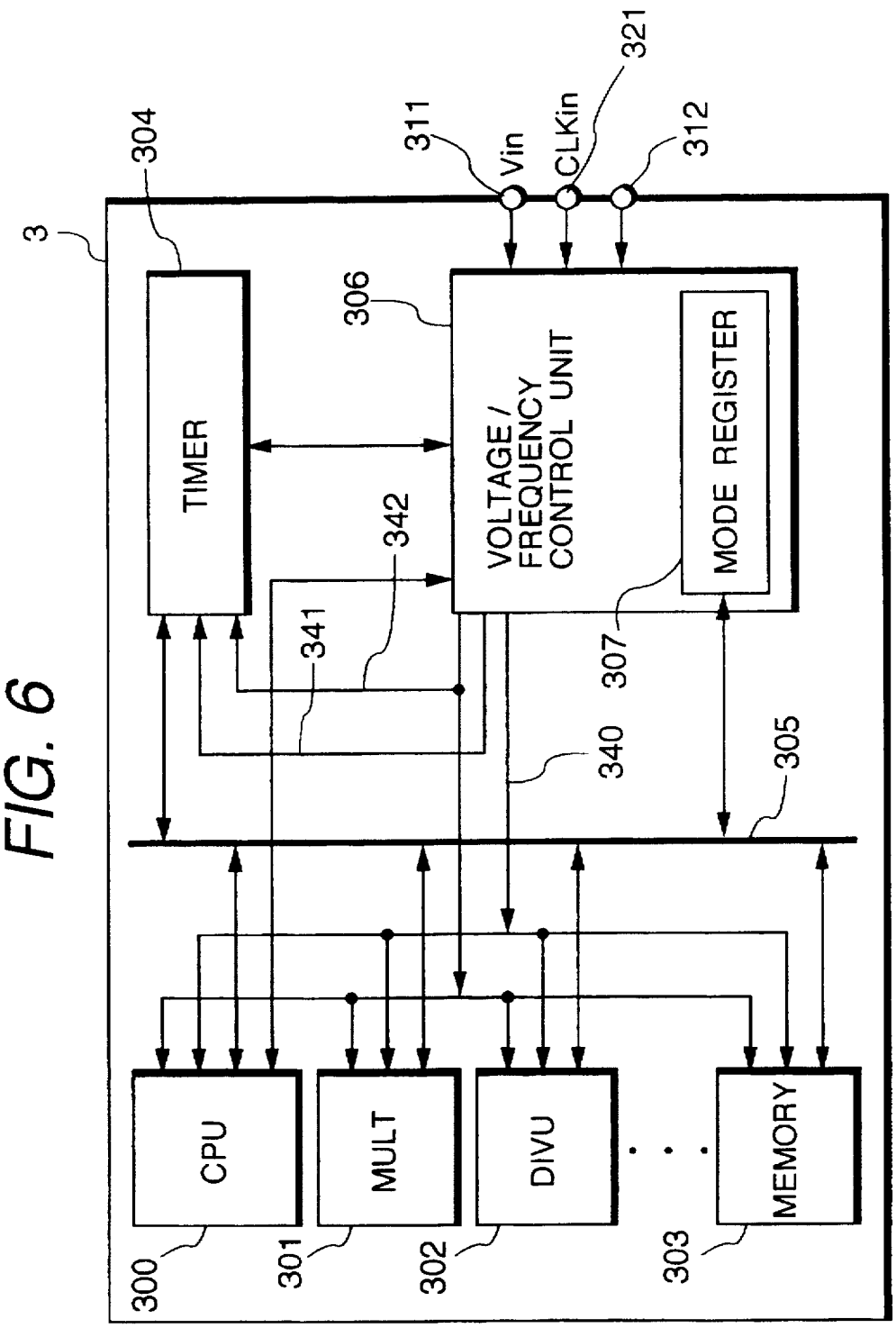
FIG. 6 is a block diagram showing a third embodiment of the single-chip microcomputer to which is applied the present invention.

FIG. 6 is a block diagram showing a single-chip microcomputer according to a third embodiment of the data processor of the present invention. The single-chip microcomputer 3 of the present embodiment is constructed to include a central processing unit (as designated at CPU) 300, a multiplier (as designated at MULT) 301, a divider (as designated at DIVU) 302, a memory 303 and a timer 304 representatively as the circuit modules to be operated synchronously with the clock signals, and further the not-shown external bus interface circuit. These circuit modules can be connected to each other through a predetermined internal bus 305. The multiplier 301 and the divider 302 are designated together to coprocessors for decoding the commands, as issued from the central processing unit 300, for processing the data, although not especially limited thereto. The memory 303 constitutes a ROM for latching the operation programs for the central processing unit 100 and a RAM for providing a work area or a temporary data storage area for the central processing unit 100.

In FIG. 6, reference numeral 306 designates a voltage/frequency control unit for generating the operating powers and the operating clock signals for the circuit modules 300 to 304, as representatively shown, and outputting them to the individual units. Numeral 311 designates a power pin to be fed with a supply voltage Vin such as 3.3 V; numeral 312 designates a ground pin made receptive of the ground potential such as 0 V; and numeral 321 designates a clock input pin to be fed with an external clock signal CLKin. Numeral 340 designates an internal clock signal to be outputted from the voltage/frequency control unit 306 and fed to the circuit modules 300 to 303; numeral 341 designates an internal clock signal to be fed especially to the timer 304; and numeral 342 designates an operating voltage to be fed as the supply voltage to the individual units of the microcomputer.

Here will be schematically described the voltage/frequency control unit 306. This voltage/frequency control unit 306 has a mode register 307 for designating the clock signal frequency and the operating voltage of the circuit module individually for each circuit module and changes and feeds the operating voltage of the circuit module and the frequency of the operation clock to the individual units in accordance with the control data which are reloadably set in the mode register 307 by the central processing unit 300. The mode register 307 is loaded with the control data from the central processing unit 300 through the internal bus 305 to inform the central processing unit 300 of the control data of an improper content, in case these control data are set in the mode register 307, and to inhibit the switching between the operating voltage and the operating frequency in case the switching mode may be erroneous. In case this switching is allowed, the feed of the clock signal is stopped for a predetermined time period administered by the timer 304, so that no malfunction may be caused by the unstable operations of the circuits accompanying the switching. On the other hand, the content of the mode register 307 can be switched for each task to control the power consumption and the data processing performance at a unit of task.

Figure 7:
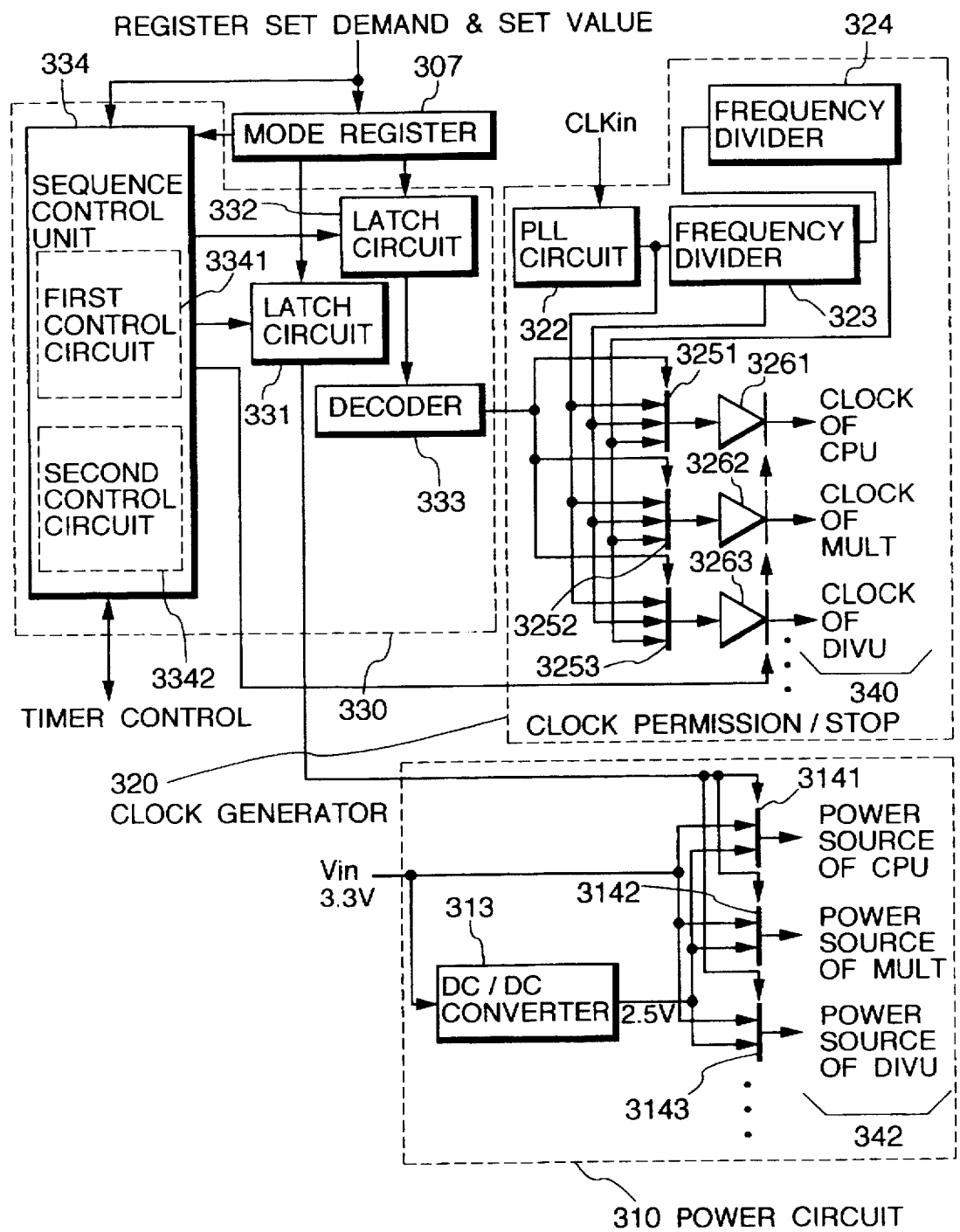
FIG. 7 is a circuit diagram showing one detailed embodiment of a voltage/frequency control unit of FIG. 6.

FIG. 7 shows a detailed example of the voltage/frequency control unit 306. This voltage/frequency control unit 306 includes a power circuit 310, a clock generator 320 and a control circuit 330. The power circuit 310 can receive the supply voltage Vin from the power pin 311 and the ground voltage such as 0 V from the ground pin 312 to output the selectively different internal voltages 342 as the operating power sources of the circuit modules 300 to 304. According to the present embodiment, the internal voltages 342 are set to either the supply voltage (Vin=3.3 V) or the voltage (2.5 V) dropped from the supply voltage, with reference to the ground potential. The ground potential is fed commonly to the individual circuit modules. The dropped voltage is generated by a DC/DC converter 313. Both the operating voltages are fed to the inputs of the selectors (e.g., selectors 3141 to 3143, as representatively shown in FIG. 7) provided for every modules 300 to 304, and the selectors 3141 to 3143 have their individual outputs coupled to the power terminals of the corresponding circuit modules. The selectors 3141 to 3143, as representatively shown, select and output the input voltages individually in accordance with the control data which are latched in the later-described voltage setting fields of the mode register 307. Incidentally, the other circuits such as the voltage/frequency control circuit are fed with a predetermined voltage (e.g., 3.3 V) as the operating power supply, although not especially limited thereto.

Figure 8:
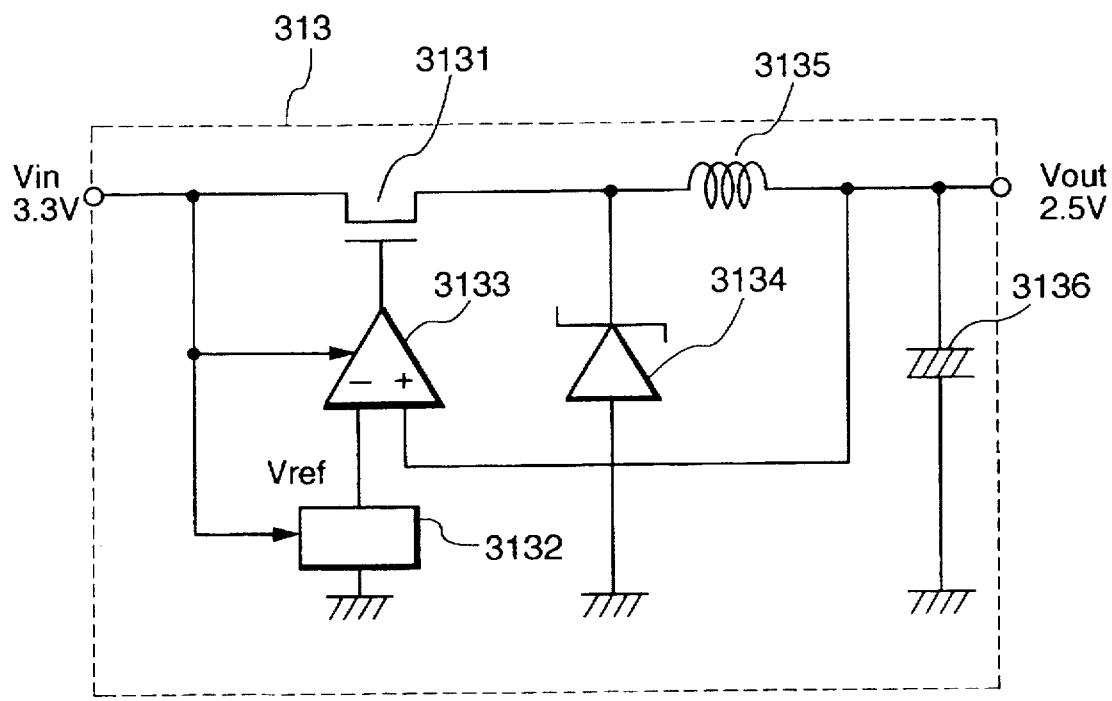
FIG. 8 is a circuit diagram showing one example of a DC/DC converter.

The DC/DC converter 313 is a voltage drop type switching regulator composed, as shown in FIG. 8, of: a switching element 3131; a reference potential generator for generating a reference potential Vref of 2.5 V from the input voltage Vin; an operation amplifier 3133; a Schottky diode 3134; a coil 3135 and a smoothing capacitor 3136, so that a voltage Vout dropped to 2.5 V is generated by the negative feedback operation of the operation amplifier 3133. The coil 3135 may be attached to the chip, and the Schottky diode 3134 may be packaged in or attached to the chip.

The clock generator 320 can receive either an external clock signal from an external clock input pin 321 or the oscillating output to be issued through the not-shown oscillator, to output clock signals having different frequencies selectively as internal clock signals 340. Specifically, this clock generator 320 is equipped with a PLL circuit 322 for receiving the clock signal CLKin from the outside to multiply its frequency and output the multiplied signal, and frequency dividers 323 and 324 coupled in two stages in series with the output of the PLL circuit 322. These frequency dividers 323 and 324 divide and output the frequencies of the inputs individually to 1/4, for example. The individual outputs of the PLL circuit 322 and the frequency dividers 323 and 324 are fed to selectors (i.e., selectors 3251 to 3253, as representatively shown in FIG. 7) provided at a unit of the circuit modules 300 to 303, and the individual outputs of the selectors 3251 to 3253 are coupled through output gates 3261 to 3263 such as clocked inverters to the clock input terminals of the corresponding circuit modules. The selectors 3251 to 3253, as representatively shown, individually select and output the inputs in accordance with the control data which are latched in the later-described frequency setting fields of the mode register 307. Incidentally, the feed of a clock signal 341, as specified for the timer 304, is not stopped.

Figure 9A:
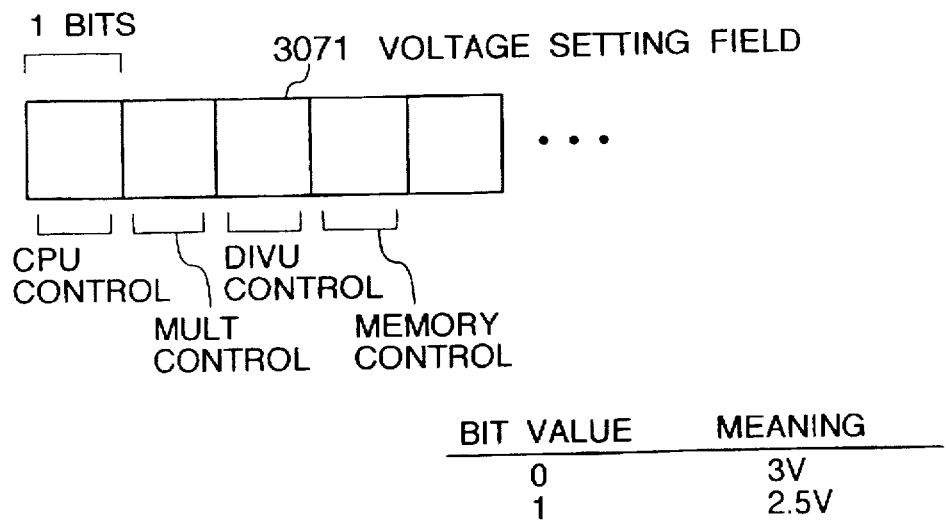
FIGS. 9(A) and 9(B) are diagrams for explaining detailed formats of the mode register of FIG. 6.
Figure 9B:
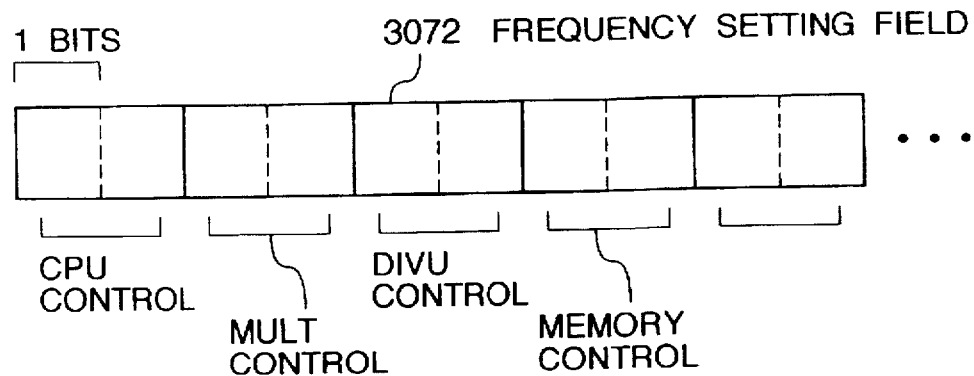

FIGS. 9(A) and 9(B) shown a detailed example of the mode register 307. This mode register 307 is composed of a voltage setting field 3071 and a field setting field 3072. As shown in FIG. 9(A), the voltage setting field 3071 is assigned bit by bit to each of the circuit modules 300 to 303, as representatively shown, and has a logic value "1" at 2.5 V and a logic value "0" at 3 V (3.3 V), for example. In accordance with the logic value set to a bit, the internal voltage to be fed to the circuit module corresponding to the bit is designated. The field setting field 3072 is assigned by two bits to each of the circuit modules 300 to 303, as representatively shown in FIG. 9(B), and has a logic value "00" at 100 MHz, a logic value "01" at 25 MHz, a logic value "10" at 6.25 MHz and a logic value "11" at a lock stop. In accordance with the assigned bit, a clock signal frequency to be fed to the corresponding circuit module is designated. In accordance with the construction of FIG. 7, the control data of the voltage setting field 3071 is latched at a predetermined timing by a latch circuit 331, and the latched control data are fed to the select terminals of the selectors 3141 to 3143 for the corresponding circuit modules. The control data of the field setting field 3072 are decoded at every 2 bits by a decoder 333, and the individually decoded select signals are fed to the select terminals of the selectors 3251 to 3253 for the corresponding circuit modules. As a result, the circuit modules 300 to 303 are individually fed with the operating voltages designated by the voltage setting field 3071 and the clock signals having the frequencies designated by the field setting field 3072.

The mode register 307 is arranged in a predetermined address space of the central processing unit 300, for example, so that it is set with the control data when the central processing unit 300 executes an instruction such as a LDC (Load Control Register) instruction. As a result, the reloading of the mode register 307 can be desirably executed according to the operation program of the microcomputer 3. For example, the control data can be set for each task in accordance with proportions of the procedure to be executed. In other words, at the start of a task, the mode register may be included in objects for saving, initializing and restoring the stack pointer or status register of the CPU 300. Incidentally, at the power-on-reset time, the register 307 is initialized to all bits 0.

The control circuit 330 is equipped with not only the latch circuits 331 and 332 and the decoder 333 but also a sequence control unit 334 for controlling the latch timings of the latch circuits 331 and 332 and the operations of the output gates 3261 to 3263, and controls the switching of the operating voltage and the frequency based upon the control data latched in the mode register 307. The sequence control unit 334 is equipped a first control circuit 3341 and a second control circuit 3342 for preventing the malfunctions of the circuit modules in advance at the time of switching the operating voltage and the clock signal frequency.

The first control circuit 3341 administers the controls for preventing the malfunctions of the internal circuit modules in respect of the procedure of switching the frequency of the internal clock signal 340 and the internal voltage 342. Specifically, in case both the frequency of the internal clock signal 340 and the internal voltage 342 are to be decreased, if the internal voltage 342 is lowered before the frequency, the drivability of the circuit in the circuit module in the operating status may drop, while the frequency of the internal clock signal 340 is lowered, to cause the malfunctions due to an undesired signal delay. In case the frequency of the internal clock signal 340 and the internal voltage 342 are to be increased, the drivability of the circuit in the circuit module in the operating status may fail to follow the improvement in the operating speed thereby to cause the malfunctions till the internal voltage 342 is increased. In order to cope with these malfunctions, therefore, the first control circuit 3341 blocks the status, in which the operating voltage 342 decreases, prior to the change in the operating frequency at present, if it detects the instruction to decrease the frequency of the internal clock signal 340 and the internal voltage 342 in the clock generator 320 and the power circuit 310 in the procedure of changing the frequency of the internal clock signal 340 and the internal voltage 342, and blocks the status, in which the clock signal 340 having its frequency increased prior to the increase in the voltage is fed, if it detects the instruction to increase the frequency of the internal clock signal 340 and the internal voltage 342.

The second control circuit 3342 administers the controls for preventing the malfunctions which are caused by the undesired switching modes of the frequency of the internal clock signal 340 and the internal voltage 342. Specifically, if the frequency of the clock signal 340 is increased without no increase in the internal voltage 342 at the time of changing in the frequency of the internal clock signal 340 and the internal voltage 342, the drivability of the circuit is not improved to cause a delay in a relatively high signal propagation improper for the high-speed operation. On the other hand, if the internal voltage 342 is lowered without any decrease of the frequency of the clock signal 340, the circuit still operates at a high speed although its drivability is dropped to increase the signal propagation delay. In order that the second control circuit 3342 may not be switched in those modes to perform the malfunctions, it can detect either the instruction to increase not the internal voltage 342 but the frequency of the internal clock signal 340 or the instruction to decrease not the frequency of the internal clock signal 340 but the internal voltage 342, on the basis of the control data before and after the reloading of the mode register 307, thereby to prohibit the change, as based upon the instruction, in the output statuses of the clock generator 320 and the power circuit 310.

FIG. 10 shows one example of the control modes by the first and second control circuits 3341 and 3342. Specifically, the error modes, in which the switchings of the frequency and the operating voltage are inhibited by the second control circuit 3342, are: a mode (a) in which the operating voltage is not changed but the frequency is increased; a mode (d) in which the frequency is not changed but the operating voltage is decreased; and a mode (f) in which the frequency is increased but the operating voltage is decreased. The modes for regulating the procedure of switching the operating voltage and the frequency by the first control circuit 3341 are: a mode (e) in which both the frequency and the operating voltage are increased; a mode (h) in which both the frequency and the operating voltage are decreased; and a mode (g) in which the frequency is decreased but the operating voltage is increased. In the mode (e), the circuit modules have to be operated by the clock signal having its operation frequency increased before the operating voltage is increased. In the modes (g) and (h), the operating voltage should not be changed before the present operation frequency is changed.

For example, the first control circuit 3341 decides the modes of switching the operating voltage and the frequency. In case of the modes (g) and (h) of FIG. 10, the value of the field setting field 3072 is latched earlier in the latch circuit 332 to change the frequency, and the value of the voltage setting field is then latched in the latch circuit 331 to change the operating voltage. In the case of the mode (e), the value of the voltage setting field is latched in the latch circuit 331 to change the operating voltage, and the value of the field setting field 3072 is then latched in the latch circuit 332 to change the frequency. In the remaining modes, the latch timings of the latch circuits 332 and 331 are not regulated in the least. For the first control circuit 3341, on the other hand, there may be adopted a procedure in which the feed of the clock signal 340 to the control circuits is stopped through the output gates 3261 to 3263 at the time of switching the operating voltage and the frequency and in which the feed of the clock signal 340 is restarted after lapse of a predetermined time period awaiting the stable circuit operations. The first control circuit 3341 is shown in FIG. 6 as belonging to a hardware independent of the central processing unit 300, but its functions can be realized by the central processing unit 300 and its operation programs.

For example, the second control circuit 3342 latches the value of the mode register 307 immediately before the reloading, if it detects the instruction to reload the register 307, to compare the latched previous value and the value of the reloaded mode register 307 thereby to decide whether or not the error modes (a), (d) and (f) are instructed. If these error modes are detected, the change in the status for selecting the frequency and the voltage according to the changed value of the mode register 307 is suppressed. In short, the latching actions by the latch circuits 331 and 332 are inhibited. Moreover, the central processing unit 300 is informed of the fact that the error modes have been instructed, to urge the second setting of the mode register 307. As a result, it is possible to prevent the malfunctions which might otherwise be caused the undesired switching modes of the frequency and the supply voltage.

The second control circuit 3342 is shown in FIG. 6 as is constructed of the hardware independent of the central processing unit 300, but its functions can be realized by the central processing unit 300 and its operation programs, as described above. Specifically, in the program (or the changing routine) for changing the content of the mode register 307, the value of the register 307 is read at first in the central processing unit 300 and is compared with the value to be changed thereby to decide whether or not the mode is in any of the error ones. If this answer is YES, this changing routine is ended, and a predetermined exception processing routine is executed.

Figure 11:
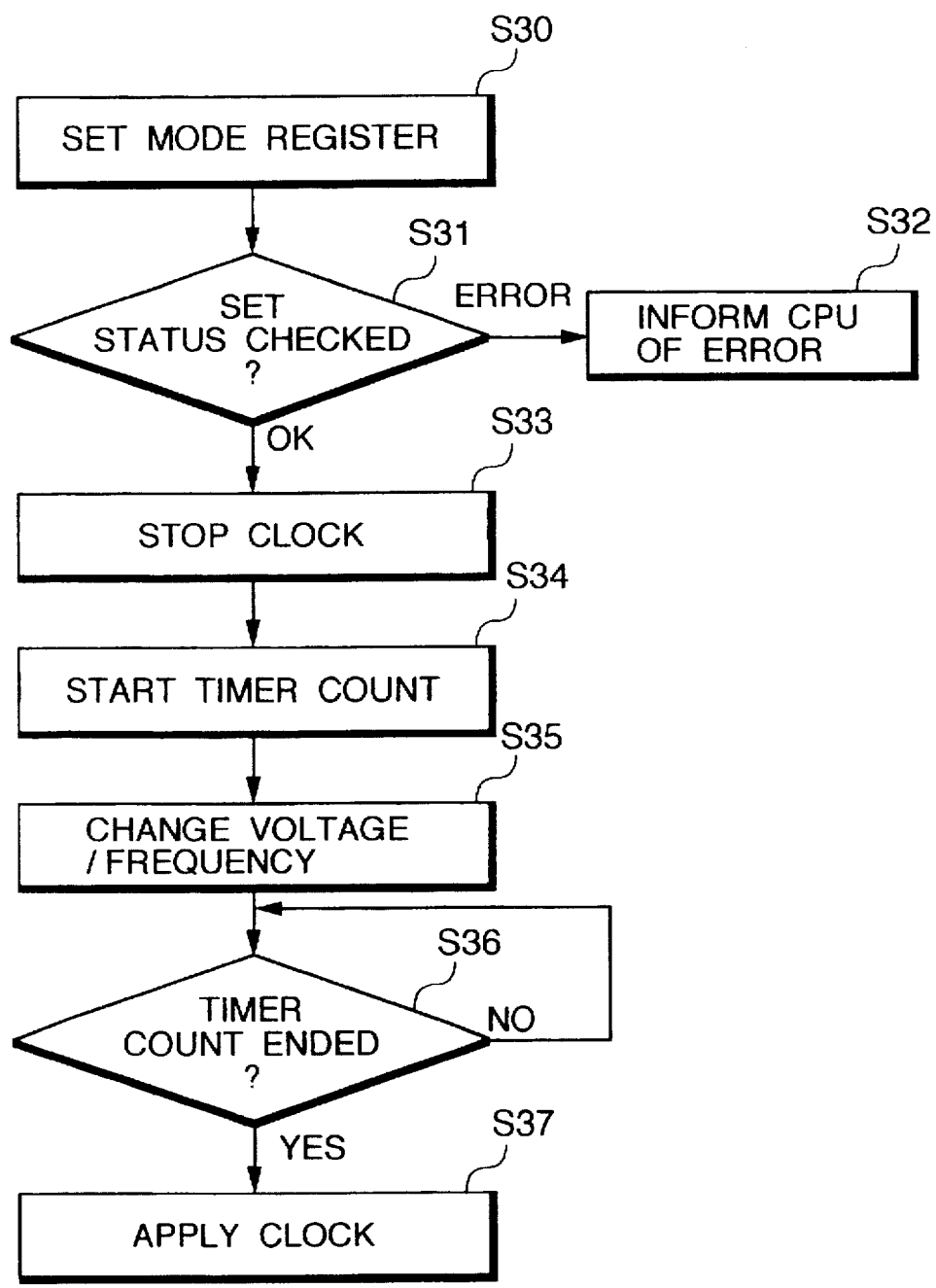
FIG. 11 is a flow chart showing one example of a procedure for changing the operating voltage and the frequency by a sequence control unit of FIG. 7.

FIG. 11 shows one example of the procedure of controlling the switching between the operating voltage and the frequency by the sequence control unit 334. First of all, the control data are written (at Step S30) in the mode register 307 by the central processing unit 300. The sequence control unit 334 checks (at Step S31) the set status on the basis of the control data before and after reloaded. If the result of the checking reveals that the set status belongs to any of the modes (a), (d) and (f) of FIG. 10, the central processing unit 300 is informed (at Step S32) of an error to end the routine (at Step S32). If the switching mode is another, the output gates 3261 to 3263 are controlled to the high-output impedance statuses to stop the outputting the clock signal 340 (at Step S33) and to start the timer counting action by the timer 304 (at Step S34). In this status, the circuit modules, which are enabled to switch the clock signal frequency and the operating voltage, are fed no operation clock signal so that their individual actions are stopped. At this time, the sequence control unit 334 causes the latch circuits 331 and 332 to latch. In accordance with the control data thus latched, the selected status of the clock signal by the selectors 3251 to 3253 is changed, and the selected status of the operating voltage by the selectors 3141 to 3143 is changed to change the operating voltage and the frequency (at Step S35). Then, it is detected (at Step S36) whether or not the timer count by the timer 304 is ended, and the feed of the clock signal 340 is restarted. The time period, as required for the timer count by the timer 304 to be ended, is so determined as to stabilize the statuses of the power circuit 310 and the clock generator 320 and to stabilize the switched voltage in the corresponding circuit module. Thus, the actions can be effected by the new operating voltage and frequency.

In this control procedure, the routine of switching the frequency of the internal clock signal 340 and the internal voltage with the outputting of the internal clock signal 340 being stopped, and then restarting the feed of the internal clock signal after lapse of a predetermined time period realizes the routine of blocking the status, in which the supply voltage is lowered prior to the change in the present operation frequency, and the status, in which the clock signal having the increased frequency is fed to the circuit modules prior to the increase in the supply voltage. The routine can be realized by the simple method of stopping the feed of the internal clock signal especially at the switching time. Incidentally, the timer 304 is fed with the dedicated clock signal 341 different from the other circuit modules so that it can maintain the timer counting actions even if the feed of the clock signal to the other circuit modules is stopped.

Figure 12:
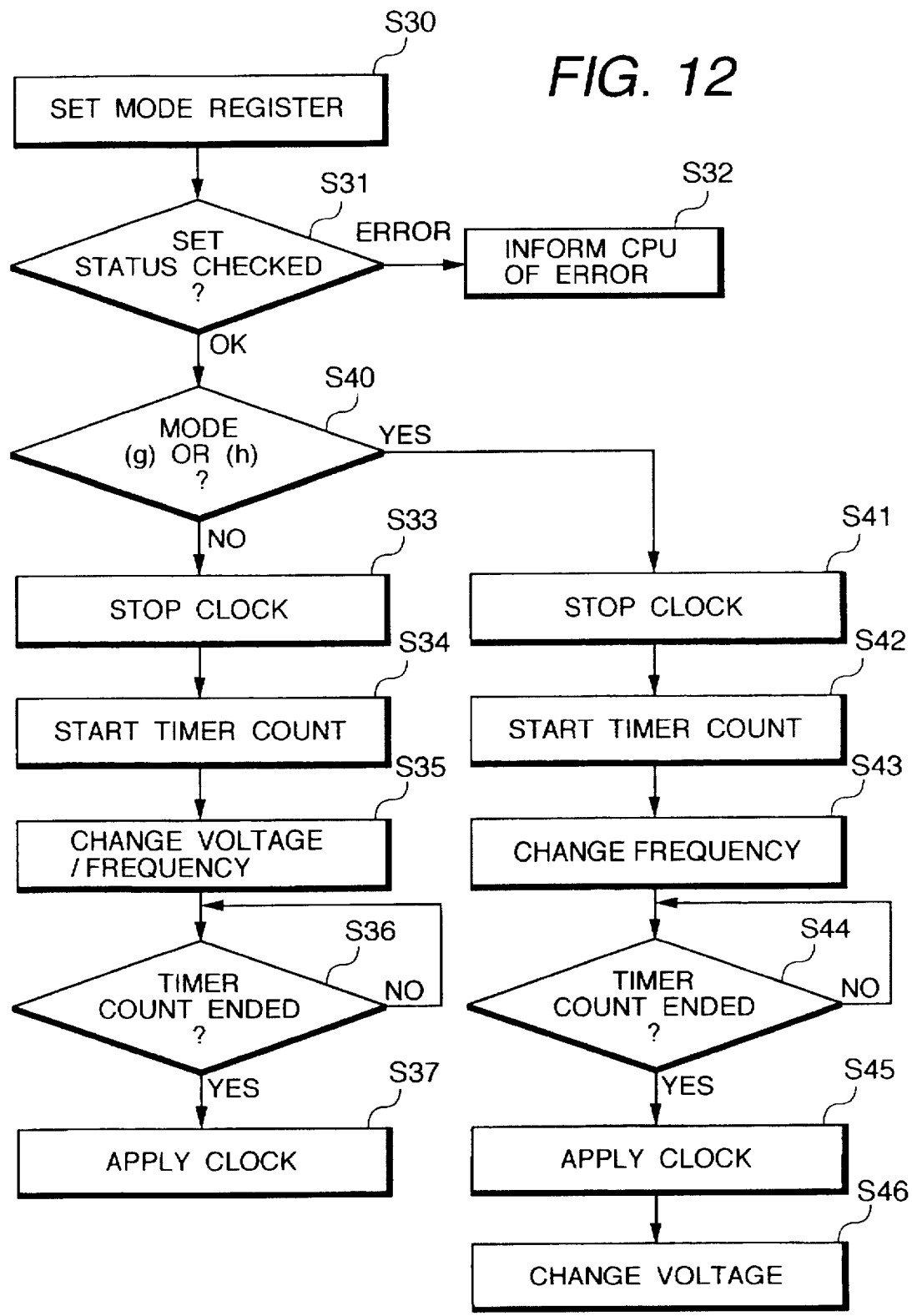
FIG. 12 is a flow chart showing another example of the operating voltage and frequency changing control procedure by the sequence control unit of FIG. 7.

FIG. 12 shows another example of the procedure of controlling the switching between the operating voltage and the frequency by the sequence control unit 334. In the procedure shown in FIG. 12, Step S31 is accompanied by Step S40, at which it is decided whether or not the switching corresponds to the modes (g) and (h) of FIG. 10. In the cases of the modes (g) and (h), the internal clock signal is stopped (at Step S41), and the timer count is started (at Step S42). In this status, the frequency is changed (at Step S43). After the end of the timer count (at Step S44), the feed of the clock signal is restarted (at Step S45) to change the operating voltage (at Step S46).

According to the third embodiment, the following effects can be achieved.

(1) Since the control data for instructing the mode to switch the clock frequency and the operating voltage are reloadably set in the mode register 307 by the central processing unit, the free switching of the operating voltage and the operation frequency of the circuit modules can be freely switched by reloading the control data, if necessary, according to the proportions of the performances and the data processings of the circuit modules packaged in the single-chip microcomputer 3. As a result, the low power consumption is preferred for the task or circuit module requiring no relatively high-speed data processing, and the increase in the power consumption is allowed for the task or circuit module requiring the relatively high-speed data processing. Thus, the low power consumption can be realized while improving the data processing efficiency as a whole. Moreover, the controls for reducing the power consumption while improving the data processing efficiency as a whole can be more finely realized by enabling the clock frequency and the supply voltage to be switched individually for a predetermined circuit module.

(2) By the second control circuit 3342, the malfunctions due to the undesired mode of switching the frequency and the operating voltage can be prevented as in the first embodiment.

(3) By the first control circuit 3341, the malfunctions of the circuit modules in respect of the procedure of switching the clock signal frequency and the operating voltage can be prevented in advance as in the first embodiment.

Figure 13:
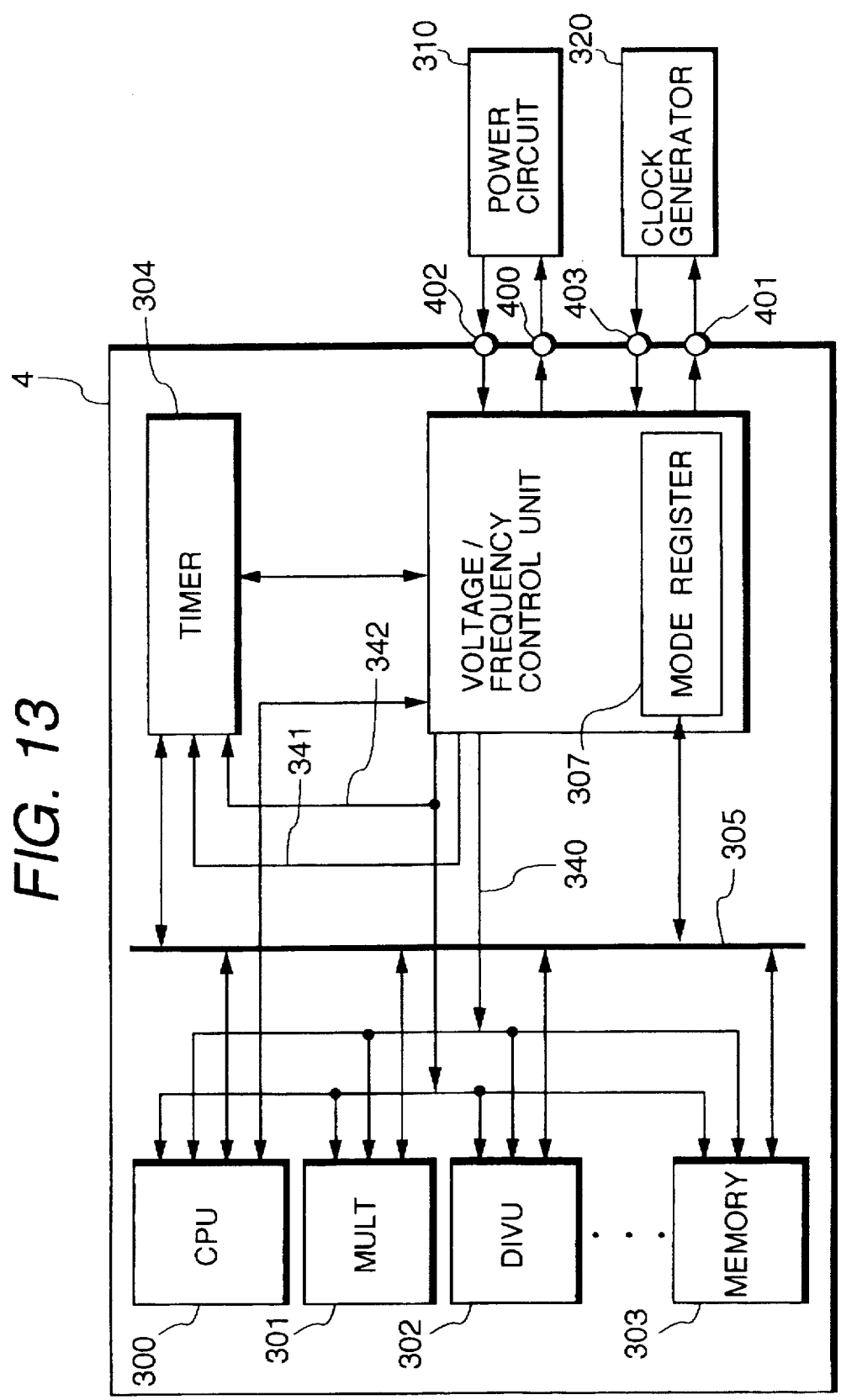
FIG. 13 is a block diagram showing a fourth embodiment of the data processor to which is applied the present invention.

FIG. 13 shows a fourth embodiment of the data processor according to the present invention. The detailed description of the circuit blocks having the same functions as those shown in FIG. 1 will be omitted by designating them at the identical numerals. In the fourth embodiment shown in FIG. 13, the power circuit 310 and the clock generator 320 are arranged outside of the single-chip microcomputer 4 unlike the embodiment shown in FIG. 6 and are made receptive of a supply voltage selecting signal 400 and a frequency selecting signal 401 from the microcomputer 4 to feed a plurality of power pins 402 with the power source having the voltage instructed thereby and a plurality of clock input pins 403 with the clock signal having the frequency instructed thereby. In the embodiment of FIG. 6, as not especially shorn, the mode register 307 is formed with control data designating fields for selecting the operations of the external power circuit and the external clock generator so that the control signal corresponding to the set value can be outputted to the outside of the chip to switch the supply voltage to be fed to the power pin 402 and the frequency of the external clock signal to be fed to the clock input pin 403 in the embodiment of FIG. 6.

Figure 14:
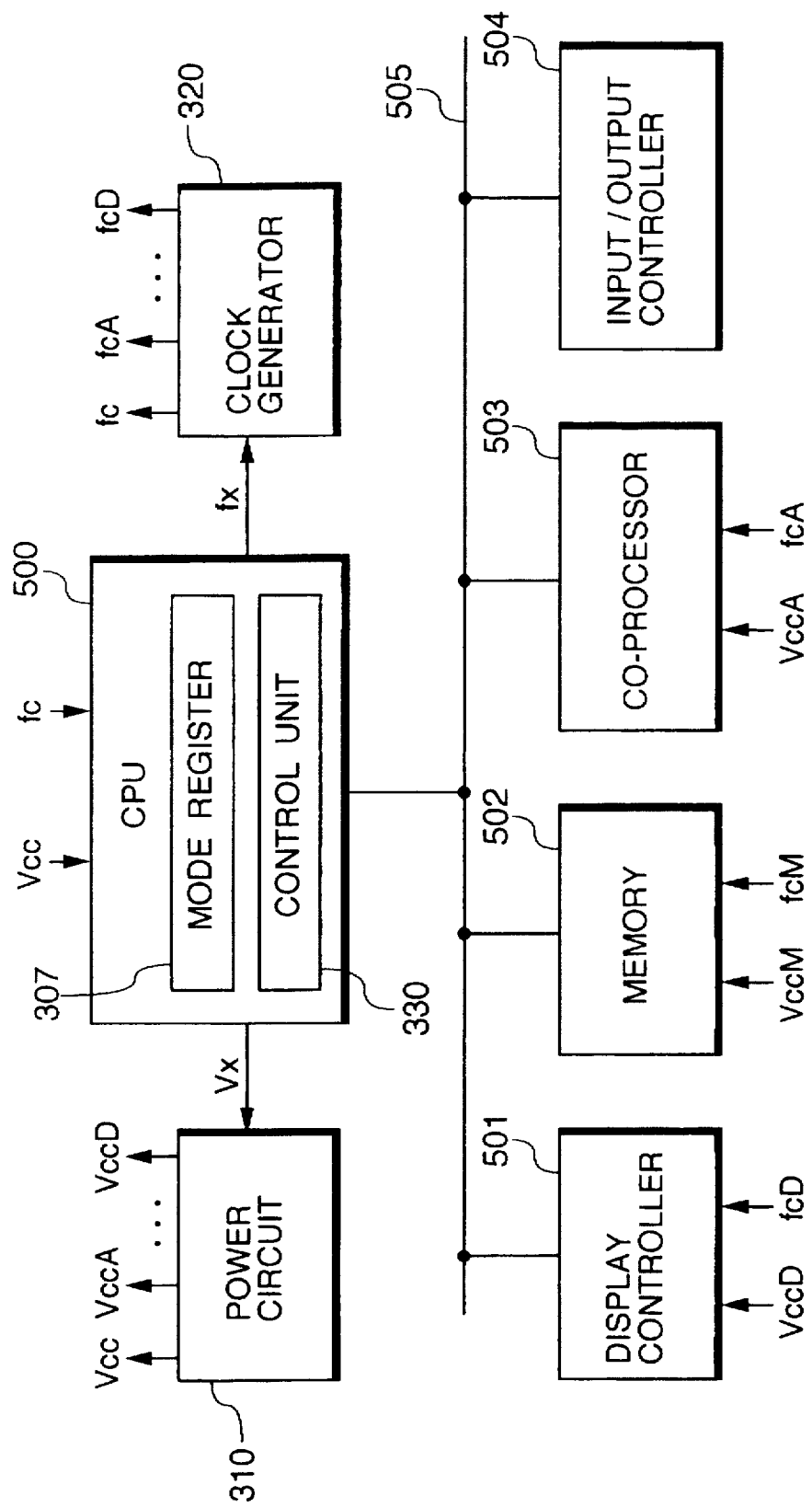
FIG. 14 is a block diagram showing a fifth embodiment of the data processor to which is applied the present invention.

FIG. 14 shows a fifth embodiment of the data processor according to the present invention. The data processor, as shown in FIG. 14, is a multi-chip microcomputer, as formed over the circuit substrate, is constructed such that a central processing unit 500, a display controller 501, a memory 502, a coprocessor 503 and an input/output circuit 504, as formed into semiconductor integrated circuits, are formed to share an external bus. In this system, the central processing unit 500, the display controller 501, the memory 502 and the coprocessor 503 can switch the clock signal and the voltage of the operation power supply individually. For these switching operations, there are provided the aforementioned clock generator 320 and power circuit 310, and the mode register 307 and control unit 330 are packaged in the central processing unit 500. In this embodiment, there are assigned to the mode register storage areas for individually setting the operation frequencies and operating voltages of the central processing unit 500, the display controller 501, the memory 502 and the coprocessor 503.

[2] Next, an embodiment of the present invention relating to the switching of an operation frequency for a data processor having a hierarchized internal bus will be described with reference to FIGS. 15 to 32.

Figure 15:
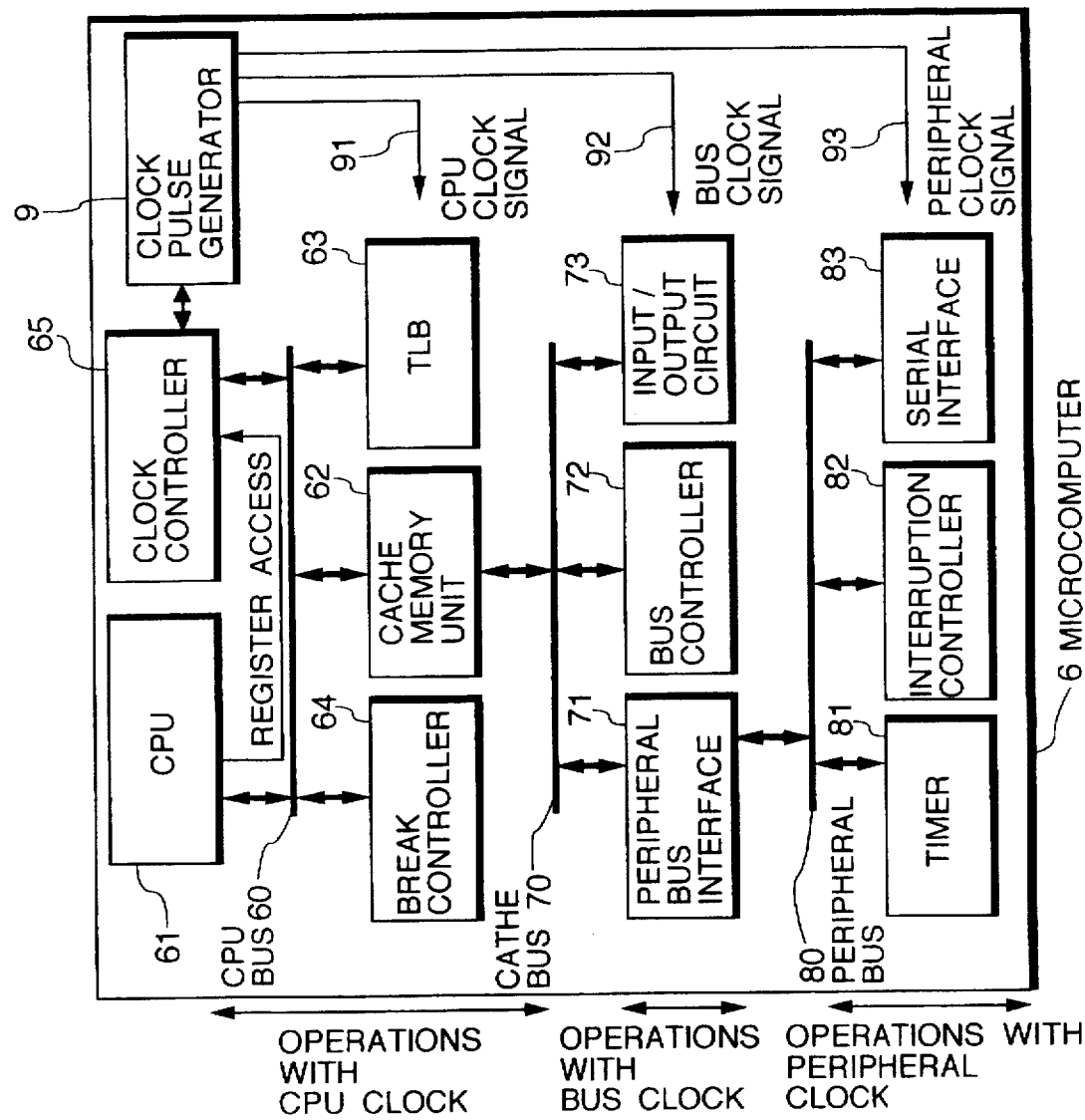
FIG. 15 is a block diagram showing a sixth embodiment of the microcomputer to which is applied the present invention.

FIG. 15 shows a microcomputer according to another embodiment of the present invention. The microcomputer 6, as shown in FIG. 15, is formed over one semiconductor substrate of single-crystalline silicon by the well-known semiconductor integrated circuit manufacture technique, for example. This microcomputer has a three-bus structure composed of a CPU bus (or a first internal bus) 60, a cache bus (or a second internal bus) 70 and a peripheral bus (or a third internal bus) 80, although not especially limited thereto. Each of these buses 60, 70 and 80 is equipped with individual signal lines for data, addresses and control signals, although not shown in FIG. 15. To the CPU bus 60, there are coupled a central processing unit (CPU) 61, a cache memory unit 62, an address translation buffer (TLB) 63, a clock controller 65 and a brake controller 64. On the other hand, the cache memory unit 62 is coupled to the cache bus 70, to which are coupled a peripheral bus interface 71, a bus controller 72 and an input/output circuit 73. This input/output circuit 73 is coupled to the not-shown external bus, and the bus controller 72 controls the interface between the circuit module coupled to the external bus and the cache bus 70. The peripheral bus interface 71 controls the interface for the peripheral circuit module such as a timer 81, an interruption controller 82 and a serial interface 83 which are connected with the peripheral bus 80. No bus master is coupled to the peripheral bus 80.

The microcomputer 6 of the present embodiment divides the logical address space into units called the "logical pages" and supports a virtual memory for translating the logical address into a physical address (i.e., by the address translation) at a unit of the logical page. The address translation buffer 63 is equipped with a memory portion and its control portion. Of these, the memory portion is an associative memory for storing a translation couple of the logical page number and the physical page number as a TLB entry, and the control portion controls the translation of the logical address, which is outputted by the central processing unit 61, into the physical address by using the memory portion. In the case of a TLB miss, the TLB entry corresponding to the logical address is read in through the control portion from an external page table (as stored in the not-shown external memory, for example).

The central processing unit 61 makes use of an address of 32 bits for supporting a logical address space of 4 Gigabytes, for example. This central processing unit 61 is equipped in its circuit blocks with an arithmetic portion represented by a general-purpose register or an arithmetic and logic unit, a group of control registers such as a program counter, and a control unit for controlling the fetching or decoding of an instruction, an instruction executing procedure, and the arithmetic operations. The central processing unit 61 fetches an instruction from the external memory through the input/output circuit 73 and processes the data according to the instruction description.

The cache memory unit 62 is equipped with an associative memory portion and a cache control portion, although not especially limited thereto. The indexing of the memory portion is carried out by a portion of the logical address. The tag portion of the entry contains the physical address, and the indexed tag portion is compared the physical address which is translated from the logical address by the address translation buffer 63 so that the cache miss/hit is decided according to the result of comparison. In the case of a cache miss, the data or instruction relating to the cache miss is read in by the cache control portion from the not-shown external memory through the bus controller 72 and the input/output circuit 73, and the data or instruction thus read in is stored as a new cache entry in the cache memory unit 62 and fed to the CPU bus 60. The interface between the CPU bus 60 and the cache bus 70 is executed by the cache control portion contained in the cache memory unit 62. The input/output terminals and the address input terminals of the associative memory portion are coupled to the CPU bus 60.

A clock pulse generator 9 outputs a CPU clock signal (or a first clock signal) 91, a bus clock signal (or a second clock signal) 92 and a peripheral clock signal (or a third clock signal) 93. The CPU clock signal 91 is used as an operation clock signal for the circuit module (e.g., the CPU 61, the cache memory unit 62, the TLB 63, the brake controller 64 or the clock controller 65) coupled to the CPU bus 60. The bus clock signal 92 is used as an operation clock signal for the circuit module (e.g., the peripheral bus interface 71, the bus controller 72 or the input/output circuit 73) coupled to the cache bus 70. The peripheral clock signal 93 is used as an operation clock signal for the circuit module (e.g., the timer 81, the interruption controller 82 or the serial interface 83) coupled to the peripheral bus 80. The clock controller 65 can dynamically change the frequencies of the CPU clock signal 91 and the peripheral clock signal 93 by the control data which are set in the central processing unit 61 through the CPU bus 60.

Here, the CPU clock signal 91 is used as a clock signal for the circuit module to be operated at a high speed, such as the central processing unit 61, the cache memory unit 62 or the address translation buffer 63. The peripheral clock signal 93 is used as a clock signal for the packaged peripheral circuit modules which need not be operated at high speeds. These clock signals 91 and 93 can have their signal frequencies dynamically changed according to the set content for the clock controller 65. The bus clock signal 92 is not subjected to the dynamic change in the signal frequency because it is adjusted to the operation speed of the external device such as the memory which is connected through the input/output circuit 73. Even when the internal status of the clock pulse generator 9 is changed for changing the frequencies of the clock signals 91 and 93, the clock pulse generator 9 is controlled by the clock controller 65 so that the frequency of the bus clock signal 92 may not be changed.

Figure 16:
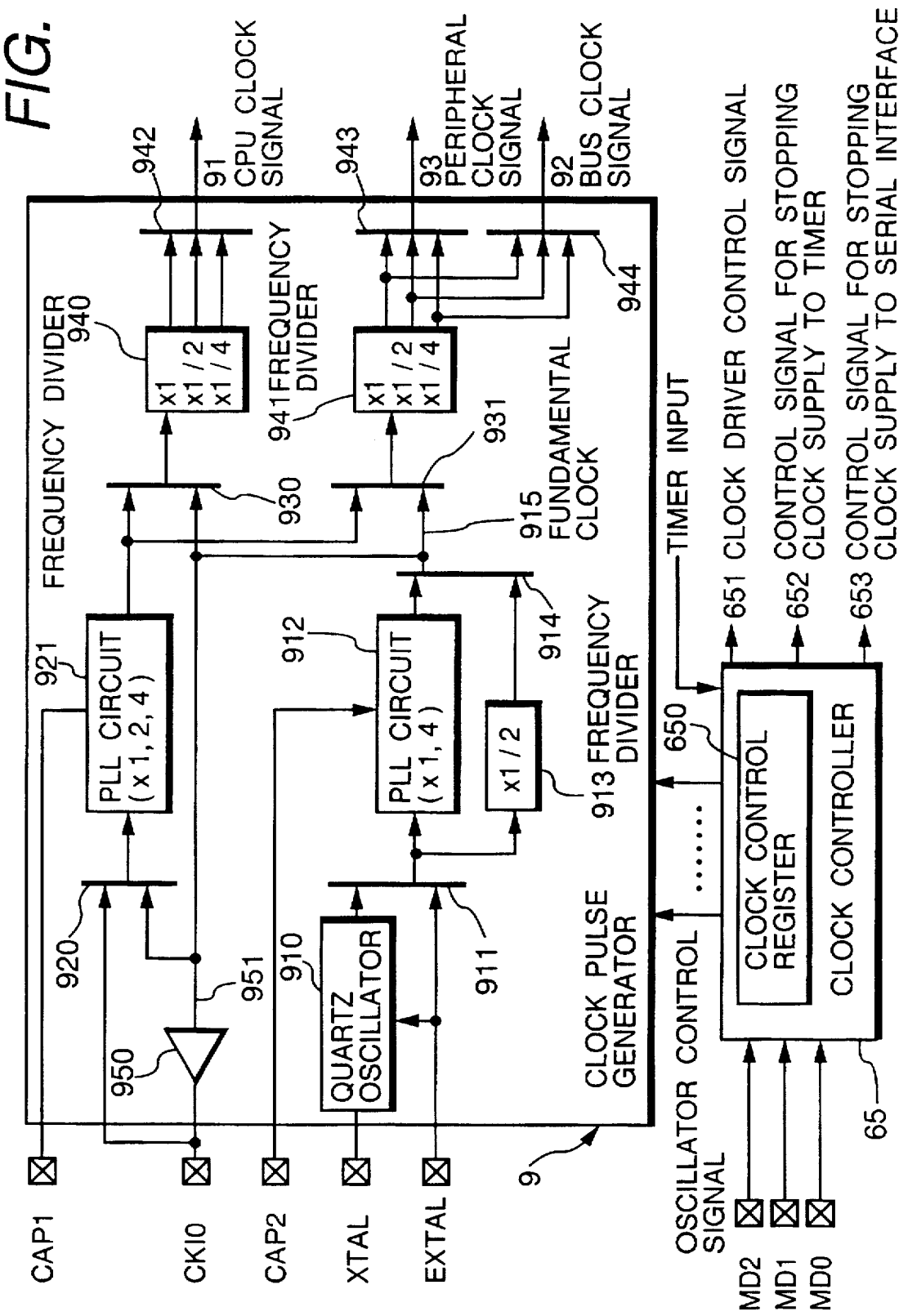
FIG. 16 is a block diagram showing a detailed example of a clock pulse generator and a clock control circuit.

FIG. 16 is a block diagram showing detailed examples of the clock pulse generator 9 and the clock controller 65. The clock pulse generator 9 is equipped with an oscillator connecting terminal XTAL acting as a first connection terminal to be coupled to an external clock source, a terminal EXTAL for connecting the oscillator or inputting the external clock signal, and an external clock inputting or outputting terminal CKIO acting as a second connection terminal to be coupled to another external clock source.

A quartz oscillator 910, a selector 911, a PLL circuit 912, a frequency divider 913 and a selector 914 constitute a first frequency changing circuit coupled to the terminals XTAL and EXTAL, and a selector 920 and a PLL circuit 921 constitute a second frequency changing circuit coupled to the terminal CKIO. The quartz oscillator 910 is exemplified by an over-tone type or gate type circuit which uses the natural oscillation of a quartz oscillation element connected with the terminals XTAL and EXTAL. The selector 911 selects either the output of the quartz oscillator 910 or the clock signal fed directly from the terminal EXTAL. The PLL circuit 912 is coupled to a PLL capacitor through the terminal CAP2 to synchronize and multiply the input clock signal. The multiplication factor is one or four times. The frequency divider 913 divides the frequency of the input clock signal to one half. The selector 914 selects either the output of the PLL circuit 912 or the output of the frequency divider 913 as a fundamental clock signal 915. This fundamental clock signal 915, as outputted from the selector 914, can be outputted from the terminal CKIO to the outside through a clock buffer 950 when the action of the selector is selected. Reference numeral 951 designates a clock signal output path therefor. The selector 920 selects either the fundamental clock signal 915 from the selector 914 or the clock signal inputted from the terminal CKIO. The PLL circuit 921 is coupled to a PLL capacitor through the terminal CAP1 to synchronize and multiply the input clock signal from the selector 920. The multiplication factor is one, two or four times. Selectors 930 and 931 constitute a selecting circuit for selecting the fundamental clock signal 915 outputted from the selector 914 or the clock signal outputted from the PLL circuit 921. A frequency divider 940, a frequency divider 941 and selectors 942, 943 and 944 constitute a third frequency changing circuit for receiving the clock signals selected by the selectors 930 and 931 to change the frequencies of the CPU clock signal 91, the peripheral clock signal 93 and the bus clock signal 92 individually. The frequency divider 940 divides the frequency of the clock signal coming from the selector 930 at division ratios of 1, 1/2 and 1/4, and the selector 942 selects one of the divided signals as the CPU clock signal 91. The frequency divider 941 divides the frequency of the clock signal coming from the selector 931 at ratios of 1, 1/2 and 1/4, and the selector 943 selects one of the divided signals as the peripheral clock signal 93 whereas the selector 944 selects one of the divided signals as the bus clock signal 92.

The clock controller 65 controls the actions of the clock pulse generator 9. The control modes are coarsely divided into an externally set mode for mode terminals MD0, MD1 and MD2, and a set mode for the clock control register 650 by the central processing unit 61. In the present embodiment, the external clock source is any of the three: the quartz oscillation element coupled to the terminals XTAL and EXTAL; the external clock signal from the terminal EXTAL; and the external clock signal from the terminal CKIO. The transmission path for the clock signal in the clock pulse generator has to be made different depending upon which of the external clock sources is to be adopted, and the CPU clock signal 91 cannot be generated to make the central processing unit 61 inactive unless the selected status of at least the selectors 911 and 920 is decided. Therefore, which is adopted cannot be coped with by setting the control data in a clock control register 650 by the central processing unit 61. In this sense, there is required the action control of the clock pulse generator 9 by the mode terminals MD0 to MD2. Moreover, the clock control circuit 65 controls the selecting status of the selector 944 in accordance with the statuses of the mode terminals MD0, MD1 and MD2 and the set value of the clock control register 650, such that the frequency of the bus clock signal 92 may coincide to that of the fundamental clock signal 915, in case the clock signals 91 to 93 are to be generated by the fundamental clock signal 915, and such that the frequency of the bus clock signal 92 may coincide to the clock signal frequency coming from the terminal CLIO, in case the clock signals 91 to 93 are to be generated by the clock signal fed from the terminal CKIO. This is to automatically hold the frequency of the bus clock signal 92 at a predetermined value when in the selected status of the clock mode by the mode terminals MD0 to MD2 and at the time of dynamically changing the CPU clock signal 91 and the peripheral clock signal 93 through the clock control register 650, because the frequency of the bus clock signal 92 has to be held constant in response to the allowable operation speed of the external device connected to the outside.

FIG. 17 shows one example of the clock control register. A bit PLLEN is an enable bit of the PLL circuit 921, in which PLLEN=1 indicates "enable" whereas PLLEN=0 indicates "disable." For the bit PLLEN=1, both the selectors 930 and 931 are controlled to the status for selecting the output of the PLL circuit 921. Bits STC1 and STC0 are bits for indicating the frequency multiplication factors of the PLL circuit 921, such as one time (STC1=0 and STC0=0), two times (STC1=0 and STC0=1), and four times (STC1=1 and STC0=1). Bits CFC1 and CFC2 are bits for indicating the frequency division factor of the CPU clock signal 91, i.e., the selection by the selector 942, such as a frequency division factor 1 (CFC1=0 and CFC0=0), 1/2 (CFC1=0 and CFC0=1), and 1/4 (CFC1=1 and CFC0=1). Bits PFC1 and PFC0 are bits for indicating the frequency division factor of the peripheral clock signal 93, i.e., the selection by the selector 943 such as a frequency division factor 1 (PFC1=0 and PFC0=0), 1/2 (PFC1=0 and PFC0=1) and 1/4 (PFC1=1 and PFC0=1). A bit MST1 is a control bit for selectively stopping the feed of the peripheral clock signal 93 to the timer 81, and MST1=0 indicates permission of the feed whereas MST=1 indicates stop of the feed. A bit MST0 is a control bit for selectively stopping the feed of the peripheral clock signal 93 to the serial interface 83, and MST0=0 indicates the permission of the feed whereas MST0=1 indicates the stop of the feed. The clock control register 650 initializes, at the time of initializing the microcomputer by the power-on-reset or manual reset, all the bits to the logic value "0" by the hardware (without any instruction execution by the central processing unit 61). By the reasons described above, the status of selecting the frequency of the bus clock signal 92 by the selector 944 is not arbitrarily effected through the clock control register 650.

FIG. 18 shows seven clock modes to be set by the mode terminals MD0 to MD2. In the clock modes No. 0 and No. 1, as shown in FIG. 18, the selecting statuses of the selectors 911 and 914 are so controlled as to exemplify the fundamental clock signal 915 by the clock signal which is produced by multiplying the clock feed source of the terminal EXTAL (by one time for the clock mode No. 0 and by four times for the clock mode No. 1) by the PLL circuit 912. In these clock modes, the clock buffer 950 is enabled to output so that the terminal CKIO is used for the clock output, and the selector 920 is controlled to the status for selecting the fundamental clock signal 915. As described above, the action of the PLL circuit 921 is inhibited in the initial status of the clock control register 650. The selectors 930 and 931 are brought into the statuses for selecting the fundamental clock outputted from the selector 914. The selector 944 is so automatically controlled by the clock control circuit 65 that the frequency of the bus clock signal 92 may coincide to that of the fundamental clock signal 915. At the time of resetting the microcomputer, the status of the clock control register 65 is initialized to a predetermined value not through the action of the central processing unit 61. Therefore, if the clock modes by the mode terminals MD0 to MD2 are decided, the clock signals 91 to 93 at the reset time are fed to the individual portions of the microcomputer to enable the central processing unit 61 to execute the instructions. After this, the central processing unit 61 reloads the value of the clock control register 650 so that the frequencies of the CPU clock signal 91 and the peripheral clock signal 93 can be dynamically changed. For example, if the PLL circuit 921 is activated (PLLEN=1), the selectors 930 and 931 select the output of the PLL circuit 921 so that the clock signal multiplied by the PLL circuit 921 is fed to the frequency dividers 940 and 941. At this time, the selector 944 selects the frequency division ratio of 1/2, if the multiplication factor of the PLL circuit 921 is two times, and the frequency division ratio of 1/4, if the multiplication factor is four times, to hold the frequency of the bus clock signal 92 constant.

In the clock modes No. 2 and No. 3, as shown in FIG. 18, the selecting states of the selectors 911 and 914 are so controlled that the fundamental clock may be exemplified by the clock signal which is obtained by multiplying the clock feed source of the quartz oscillator 910 (at the multiplication factor of four times in the clock mode No. 2 and at the multiplication factor of one time in the clock mode No. 3) by the PLL circuit 912. The remaining control statuses are similar to those of the cases of the clock modes No. 0 and No. 1.

In the clock modes No. 4 and No. 5, as shown in FIG. 18, the fundamental clock is generated by selecting the path through the frequency divider 913 by the selectors 911 and 914 without activating the PLL circuit 912. The clock source in the clock mode No. 4 is the external clock signal fed from the terminal EXTAL, and the clock source in the clock mode No. 5 is the quartz oscillator 910. The remaining control statuses are similar to those in the clock modes No. 0 and No. 1.

In the clock mode No. 6, as shown in FIG. 18, the clock signal to be fed from the terminal CKIO is used as the clock source, and the PLL circuit 921 has its action selected to have its output selected by the selectors 930 and 931. In this clock mode, the clock buffer 950 is inactivated to output. In this clock mode, the selection of the action of the PLL circuit 921 by the bit PLLEN of the clock control register 650 is invalidated. For example, the clock control circuit 65 forces the bit PLLEN to the logic value "1" when the clock mode No. 6 is set (that is, the circuit for forcibly pulling up the bit PLLEN is inactivated). As a result, it is substantially impossible to reload the bit PLLEN by the central processing unit 61. In the remaining clock modes, the action of the PLL circuit 921 can be arbitrarily set by the bit PLLEN of the clock control register 650.

In accordance with the statuses of the mode terminals MD0 to MD2, as described above, the clock control circuit 65 decides the frequency changing ratios by the PLL circuit 912 and the frequency divider 913, as contained in the first frequency changing circuit, to transmit the clock signals from the terminals XTAL and EXTAL to the inputs of the frequency dividers 940 and 941, and selects the first status, in which the selector 944 is controlled to equalize the frequency of the bus clock signal 92 to the frequency of the fundamental clock signal, and the second status, in which the clock signal can be transmitted from the terminal CKIO to the PLL circuit 921. Moreover, the clock control circuit 65 variably controls, in accordance with the control data set in the clock control register 650, the frequency changing ratio by the PLL circuit 921 and the selection of the frequencies of the CPU clock signal 91 and the peripheral clock signal 93 by the selectors 942 and 943, and selects and controls the selector 944, in the second status designated by the clock terminals MD0 to MD2, so that the product of the frequency division ratio of the bus clock signal 92 by the frequency divider 941, as selected by the selector 944, and the multiplication factor of the PLL circuit 921, as designated by the clock control register 650, may take the value 1 (in other words, the frequency of the bus clock signal 92 may coincide to the input clock signal frequency coming from the terminal CKIO).

Figure 19:
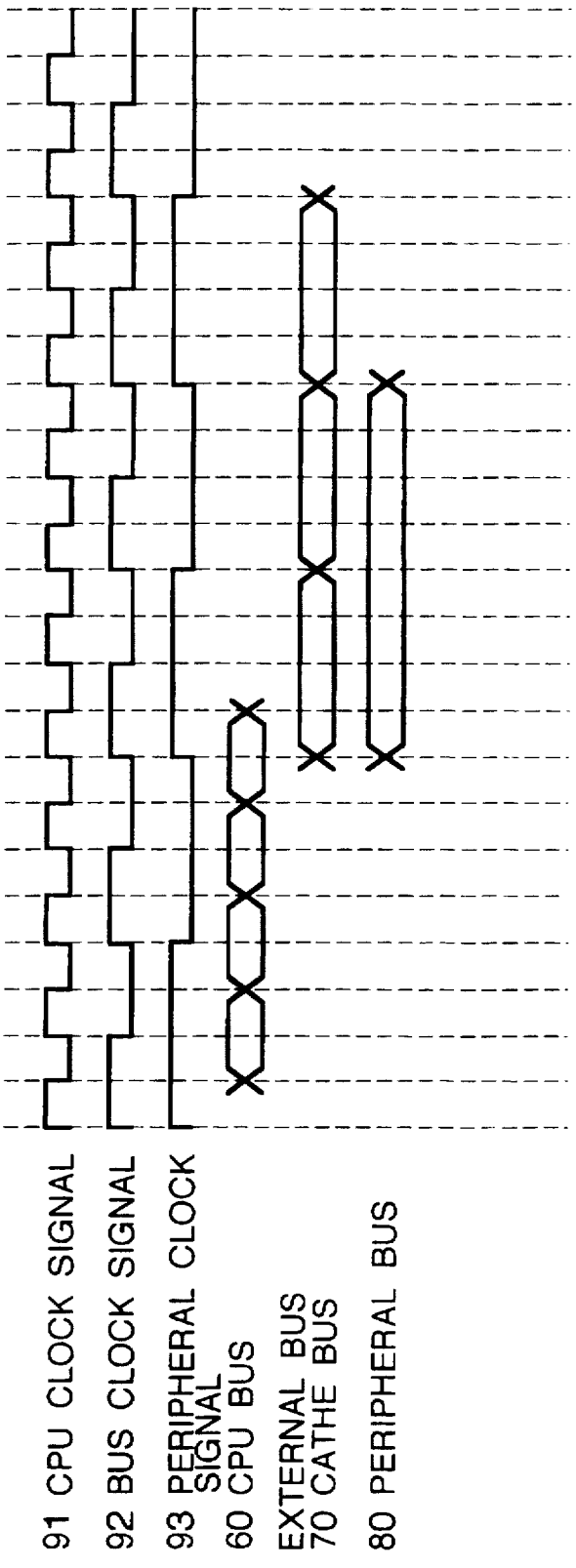
FIG. 19 is a timing chart showing examples of the cycles of a CPU clock signal, a bus clock signal and a peripheral clock signal and a bus cycle.
Figure 20:
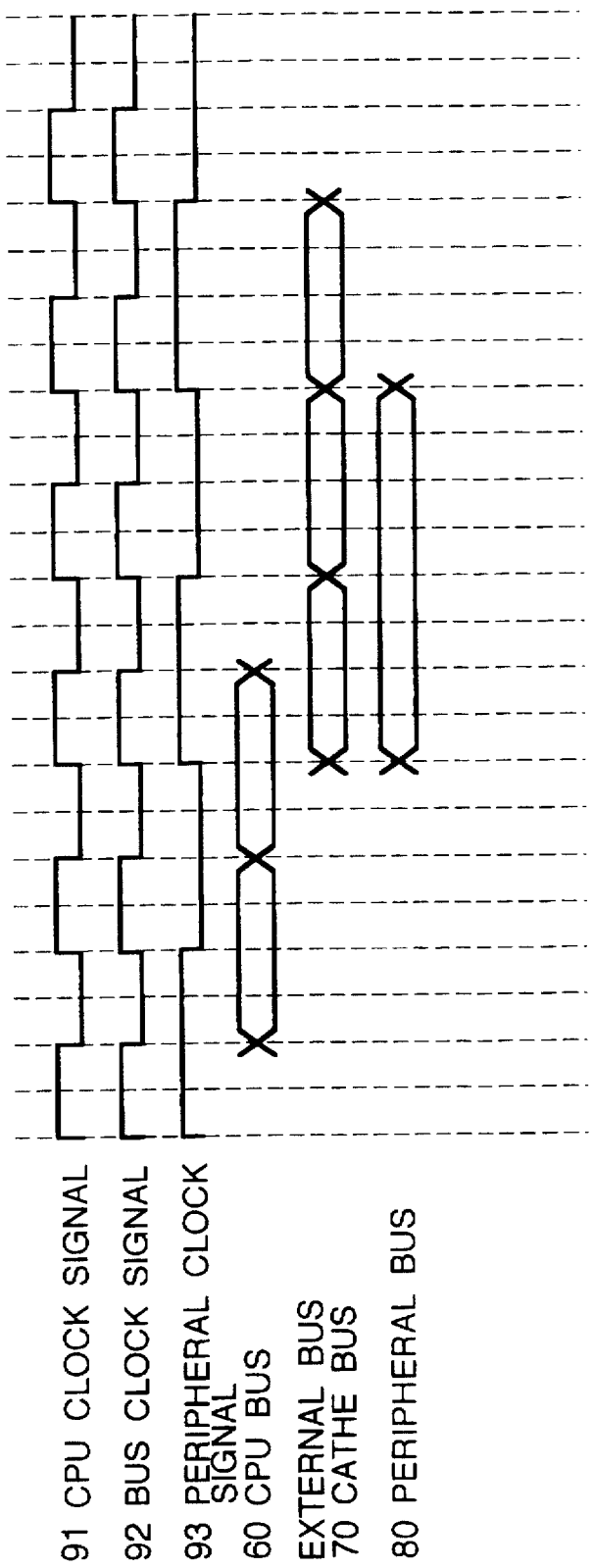
FIG. 20 is a timing chart at the time when the frequency of the CPU clock signal is changed to 1/2 with the frequencies of the bus clock signal and the peripheral clock signal being unchanged, as contrary to FIG. 19.

FIGS. 19 and 20 are timing charts showing examples of the clock signal cycle and the bus cycle. In FIG. 19, the frequency ratios of the clock signals are set at the CPU clock signal 91: the peripheral clock signal 93: the bus clock signal 92=1:1/2:1/4 to determine the bus cycles of the CPU bus 60, the cache bus 70 and the external bus or peripheral bus 80 accordingly. This is an example of the case in which the central processing unit 61 is operated at a high speed for preferring the data processing rate of the central processing unit 61. In the example of FIG. 20, as contrary to FIG. 19, the frequency of the CPU clock signal 91 is changed to 1/2 with the frequencies of the bus clock signal 92 and the peripheral clock signal 93 being held constant, and the low power consumption is preferred to the performance of the central processing unit 61 so that the power consumption of the central processing unit 61 is reduced to one half while the speeds of the peripheral module and the external bus access being held constant. In FIGS. 19 and 20, the bus cycle of the external bus is made identical to that of the cache bus 70. This is because the bus controller 72 operates in synchronism with the bus clock signal 92 so that the external bus cycle to be started by the bus controller 72 is also synchronized with the bus clock signal 92.

Figure 21A:
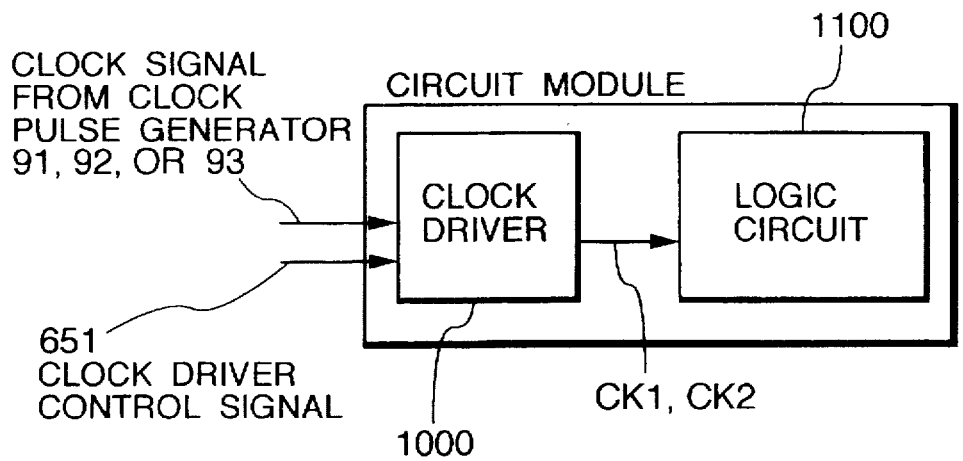
FIG. 21(A) is an explanatory diagram showing the positioning of a clock driver relative to a circuit module.
Figure 21B:
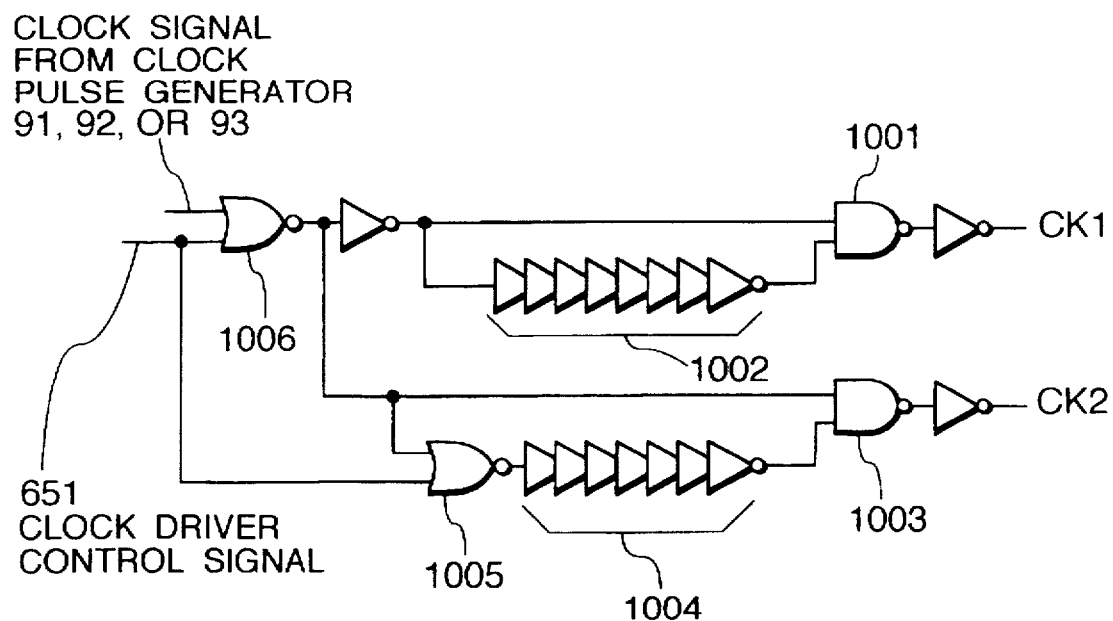
FIG. 21(B) is a logic circuit diagram showing one example of the clock driver.

In FIG. 16, the clock controller 65 generates a clock driver control signal 651, a control signal 652 for stopping the feed of a clock to the timer 81, and a control signal 653 for stopping the feed of a clock to the serial interface 83. The clock driver control signal 651 is a control signal for inhibiting the actions of the circuit modules by the clock signals 91 to 93 till these signals 91 to 93 are stabilized, when the internal statuses of the clock pulse generator 9 such as the frequency division or multiplication ratios are changed by reloading the clock control register 650. Each of the circuit modules is equipped with a clock driver 1000 and a logic circuit 1100, as exemplified in FIG. 21(A). FIG. 21(B) shows one example of the clock driver 1000. In this example, the clock driver 1000 receives the CPU clock signal 91, the peripheral clock signal 93 or the bus clock signal 92 from the clock pulse generator in accordance with the kinds of the circuit module containing it, and feeds the received signal as the clock signals CK1 and CK2 in the non-overlap two-phase module to the logic circuit 1100. A two-input NAND gate 1001 and a delay circuit (or inverter circuit of eight series stages) 1002 determine the rising and falling non-overlap periods in one clock signal CK1, and a two-input NAND gate 1003, a delay circuit (or inverter circuit of seven series stages) 1004 and a two-input NOR gate 1005 determine the rising and falling non-overlap periods in the other clock signal CK2. The clock signal 91, 92 or 93 from the clock pulse generator 9 is fed to one input terminal of a two-input NOR gate 1006, the other input terminal of which is fed together with the other input terminal of the NOR gate 1005 with the clock driver control signal 651. If the clock driver control signal 651 takes the logic value "1", the outputs of the two NOR gates 1005 and 1006 are fixed at the logic value "0" so that the clock signal CK2 is fixed at the logic value "0" whereas the clock signal CK1 is fixed at the logic value "1". As a result, in the logic circuit 1100, the actions of the circuit to be synchronized with the internal clock signals CK1 and CK2 can be stopped to hold its internal status. The clock controller 65 changes the clock drive control signal 651 from the logic value "0" to the logic valve "1" for a predetermined time period when it detects the end of the write cycle for the clock control register 650, for example. This period continues after the internal status of the clock pulse generator 9 is changed and before the clock signals 91, 92 and 93 are stabilized, and is determined according to the circuit characteristics. The administration of this period can be accomplished by the not- shown timer which has its action stopped neither by the clock driver control signal 651 nor by the control signal 652 for stopping the clock feed to the timer.

The control signal 652 for stopping the clock feed to the timer has its logic value determined by the bit MST1 of the clock control register 650, and the control signal 653 for stopping the clock feed to the serial interface also has its logic value determined by the bit MST0. The NOR gate, as shown in FIG. 21(B) to relating to the clock driver in the timer and the serial interface, is given three inputs, although not especially shown, each of which is fed with the clock feed stopping control signal 652 or 653 so that the internal clock signals CK1 and CK2 in those circuit modules can be arbitrarily stopped.

Figure 22:
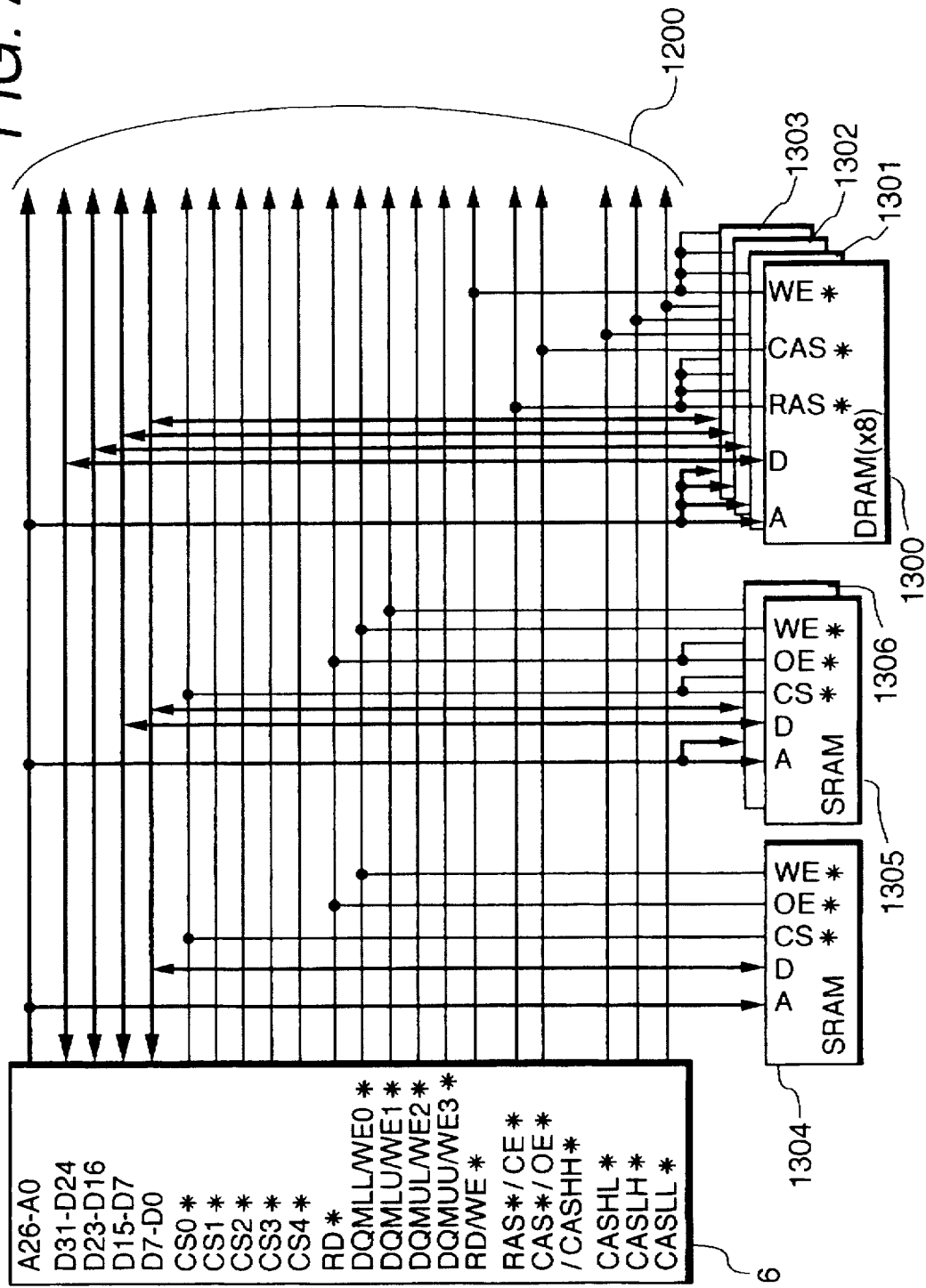
FIG. 22 is a system diagram at the time when a DRAM (×8) is connected with the outside of a microcomputer of the present embodiment.

FIG. 22 shows the connection modes between the microcomputer 6 and the external memories in the present embodiment. In FIG. 22, the external interface signals of the microcomputer 6 are exemplified by an address signal A26 to A0, data D31 to D0, chip select signals CS0* (wherein symbol * implies that the asterisked signals are row enable signals) to CS4*, a read signal RD*, data enable signals DQMLL/WEO*, DQMLU/WE1*, DQMUL/WE2* and DQMUU/WE3*, a read/write signal R/W*, a row address strobe signal RAS*/CS*, a column address strobe signal CAS*/CE*/CASHH*, and column address strobe signals CASHL*, CASLH* and CASLL*. The changing timings of the various access control signals such as the address signals A26 to A0, the data D31 to D0 at the writing time or the chip select signal CS0* are controlled by the bus controller 72 and changed in synchronism with the bus clock signal 92.

The row address strobe signal RAS*/CS* is used as the row address strobe signal for the DRAM (Dynamic Random Access Memory) and the SDRAM (Synchronous DRAM) when these are used and as the chip enable signal when a PSRAM (Pseudo Static Random Access Memory) is used. The column address strobe signal CAS*/CE*/CASHH* is used as the column address strobe signal, when used in the SDRAM, as the column address strobe signal for selecting the most significant byte, when used in the DRAM, and as the output enable signal when used in the PSRAM. The column address strobe signal CASHL* is used as the second byte column address strobe signal, when the DRAM is used; the column address strobe signal CASLH* is used as the third byte column address strobe signal, when the DRAM is used; and the column address strobe signal CASLL* is used as the fourth byte column address strobe signal when the DRAM is used. The data enable signal DQMLL/WE0* indicates the selection of the least significant byte, when the SDRAM is used, and the write of the least significant byte when the remaining memories are used. The data enable signal DQMLU/WE1* indicates the selection of the third byte, when the SDRAM is used, and the write of the third byte when the remaining memories are used. The data enable signal DQMUL/WE2* indicates the selection of the second byte, when the SDRAM is used, and the write of the second byte when the remaining memories are used. The data enable signal DQMUU/WE3* indicates the selection of the most significant byte, when the SDRAM is used, and the write of the most significant byte when the remaining memories are used. In addition, although not shown, a bus start signal, a bus right demand signal and a bus use permission signal are outputted, and a bus release demand signal and a wait signal are inputted. Moreover, the external terminal group, as shown in FIG. 16, is omitted.

In FIG. 22, the individual signals are connected through an external bus 1200 with other memories such as DRAMs 1300 to 1303 or SRAMs 1304 to 1306. The DRAMs 1300 to 1303, as shown in FIG. 22, input and output the data at a unit of 8 bits (or bytes) (×8 DRAMs). In the DRAMs 1300 to 1303 and the SRAMs 1304 to 1306: a terminal A is an address input terminal; a terminal D is a data input/output terminal; a terminal RAS#(RAS*) is a row address strobe signal input terminal; a terminal CAS#(CAS*) is a column address strobe signal input terminal; a terminal WE#(WE*) is a write enable signal input terminal; a terminal CS#(CS*) is a chip select signal terminal; and a terminal OE#(OE*) is an output enable signal input terminal.

Figure 23:
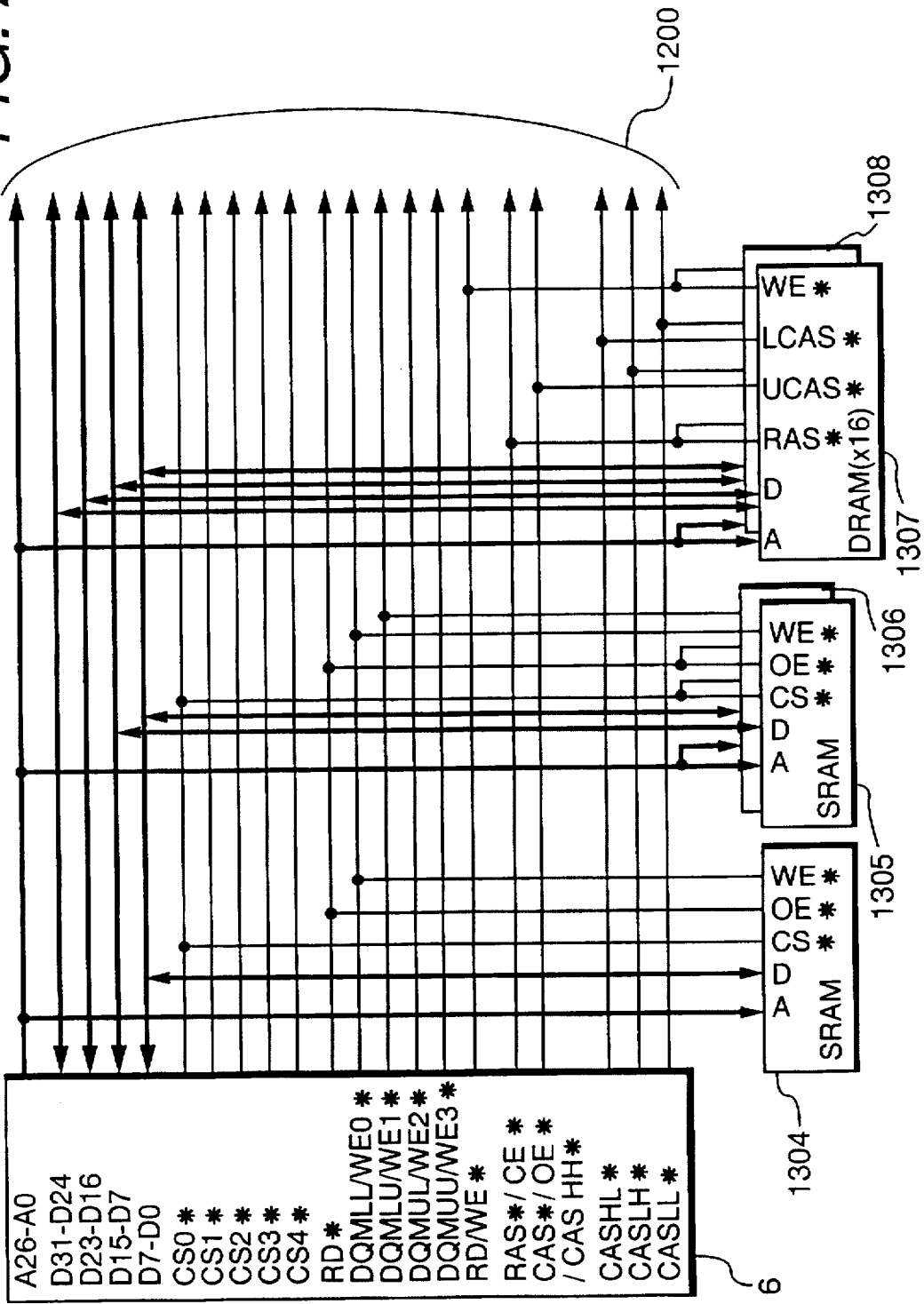
FIG. 23 is a system diagram at the time when a DRAM (×16) is connected with the outside of the microcomputer of the present embodiment.

FIG. 23 shows the connection modes of the case in which DRAMs 1307 and 1308 having a data parallel input/output number of 16 bits are adopted. In this example, the terminals UCAS#(UCAS*) of the DRAMs 1307 and 1308 are the more significant column address strobe signal input terminals, and the terminals LCAS# (LCAS*) are the less significant column address strobe signal input terminals, the remainder being similar to FIG. 22.

Figure 24:
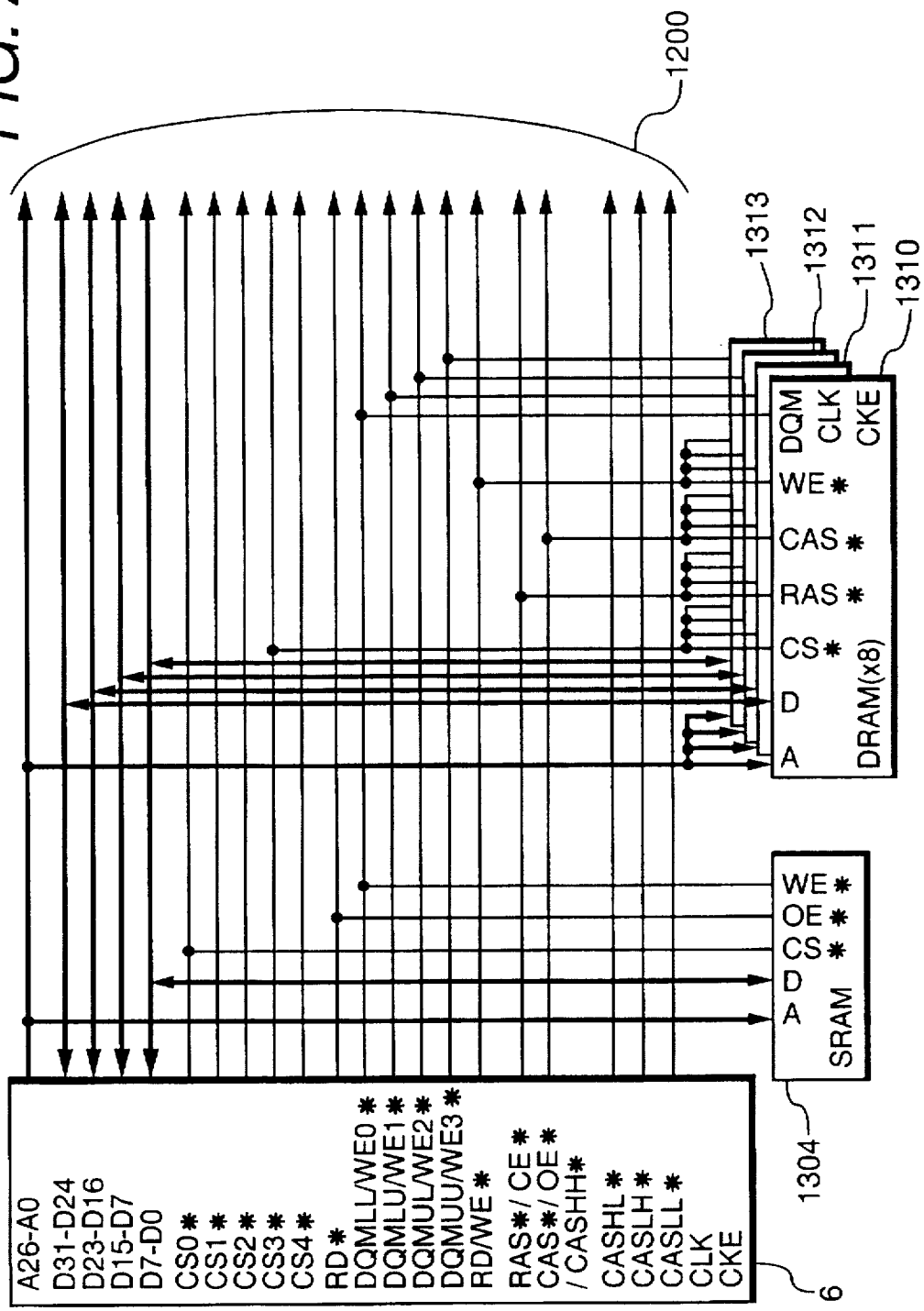
FIG. 24 is a system diagram at the time when a SDRAM (×8) is connected with the outside of the microcomputer of the present embodiment.

FIG. 24 shows the connection modes of the case in which SDRAMs 1310 to 1313 having a data parallel input/output bit number of 8 bits are adopted. The SDRAMs 1310 to 1313 can input and output the data, addresses and control signals unlike the DRAM in synchronism with the clocks so that memories having a capacity as high as that of the DRAMs can be realized with high-speed actions equivalent to those of the SRAMs to realize the higher speed accesses and larger capacities at a lower cost than those of the DRAMs of the prior art. The microcomputer 6 outputs not only the clock enable signal CKE for the interfaces with the SDRAMs but also the clock signal CLK from the terminal CKIO. The SDRAMs have an input terminal CKE for the clock enable signal CKE, a chip select signal input terminal CS#(CS*), a column address strobe signal input terminal CAS#(CAS*), a row address strobe signal input terminal RAS#(RAS*), a write enable signal input terminal WE#(WE*), an address signal input terminal A and a data input/output terminal D. The action modes of the SDRAMs (such as the fetch of the row address signal, the fetch and write of the column address signal, and the fetch and read of the column address signal) are determined by writing a command in the not- shown mode register with the predetermined less significant bits of a memory control signal and an address signal. The clock signal CKL is a master clock of the SDRAMs, and the remaining external input signals are made significant in synchronism with the rise of the clock signal CLK, for example. The low level of the chip select signal, as fed to the terminal CS#(CS*), instructs the start of the command input terminal. The clock enable signal CKE is a signal indicating the validity of the next clock signal such that the rising edge of the next clock signal CLK is valid, if the signal CKE is at the high level, but invalid if at the low level.

Figure 25:
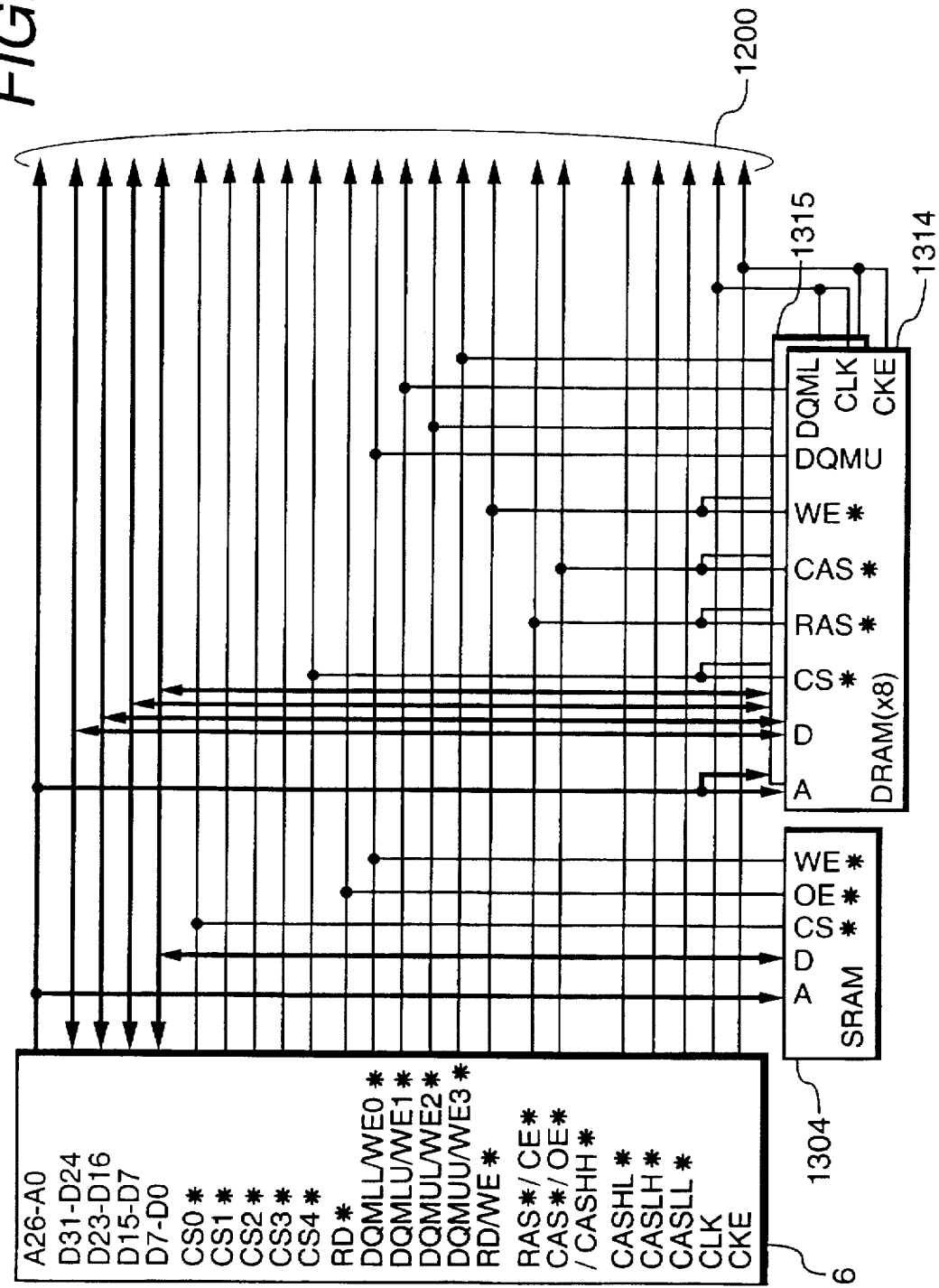
FIG. 25 is a system diagram at the time when a SDRAM (×16) is connected with the outside of the microcomputer of the present embodiment.

FIG. 25 shows the connection modes of the case in which SDRAMs 1314 and 1315 having a data parallel input/output bit number of 16 bits (×16) are adopted. In this example, the SDRAMs 1314 and 1315 have their terminal DQMU as the more significant data enable signal input terminal and their terminal DQML as the less significant data enable signal input terminal, and the remainder is similar to that of FIG. 24.

Figure 26:
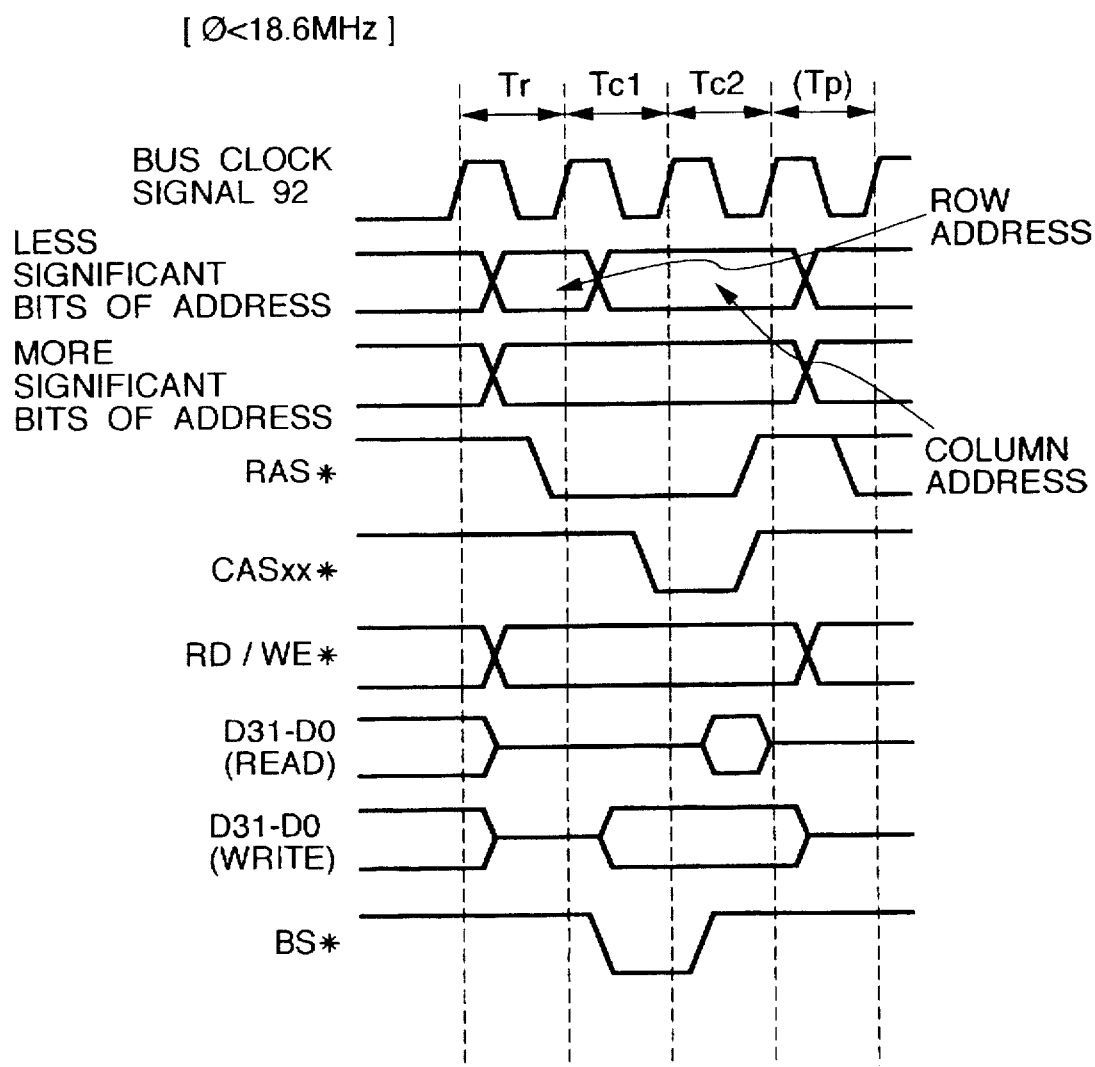
FIG. 26 is a timing chart of an access to an external DRAM by the microcomputer, to which is applied the present invention, when a bus clock signal frequency φ is φ<18.6 MHz.
Figure 27:
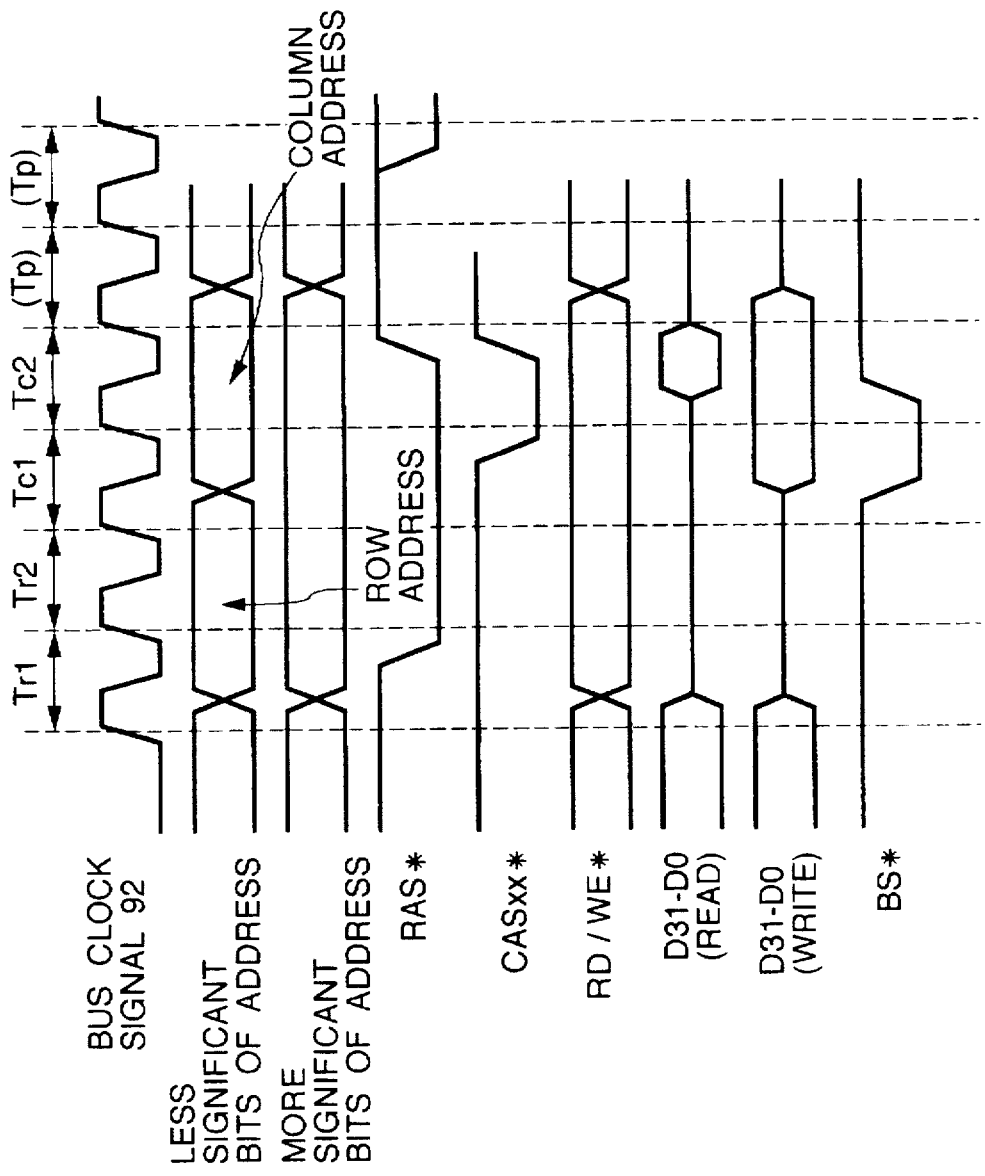
FIG. 27 is a timing chart of an access to an external DRAM by the microcomputer, to which is applied the present invention, when the bus clock signal frequency φ is 18.6 MHz ≦φ≦28.5 MHz.
Figure 28:
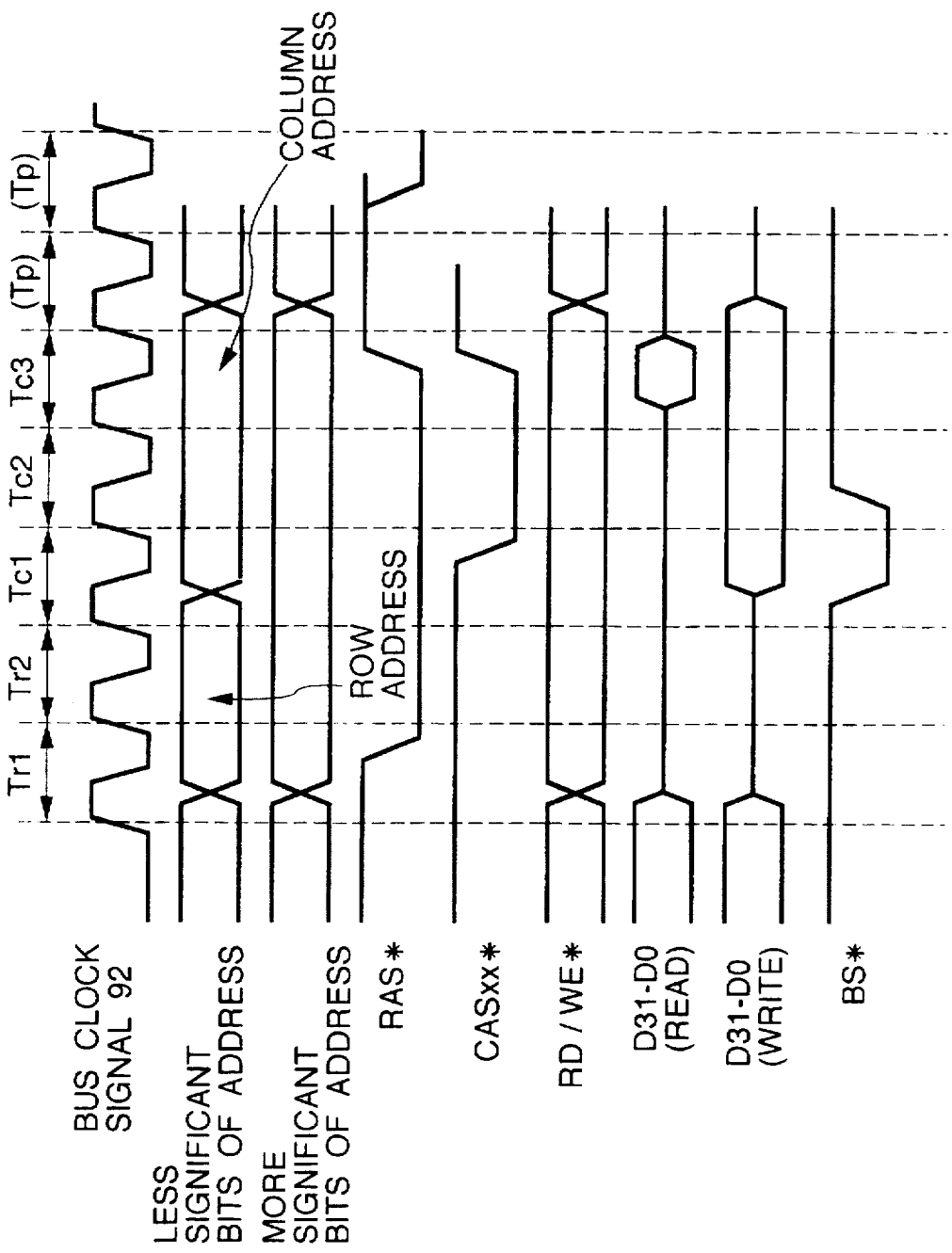
FIG. 28 is a timing chart of an access to an external DRAM by the microcomputer, to which is applied the present invention, when the bus clock signal frequency φ is 28.5 MHz ≦φ≦37.7 MHz.
Figure 29:
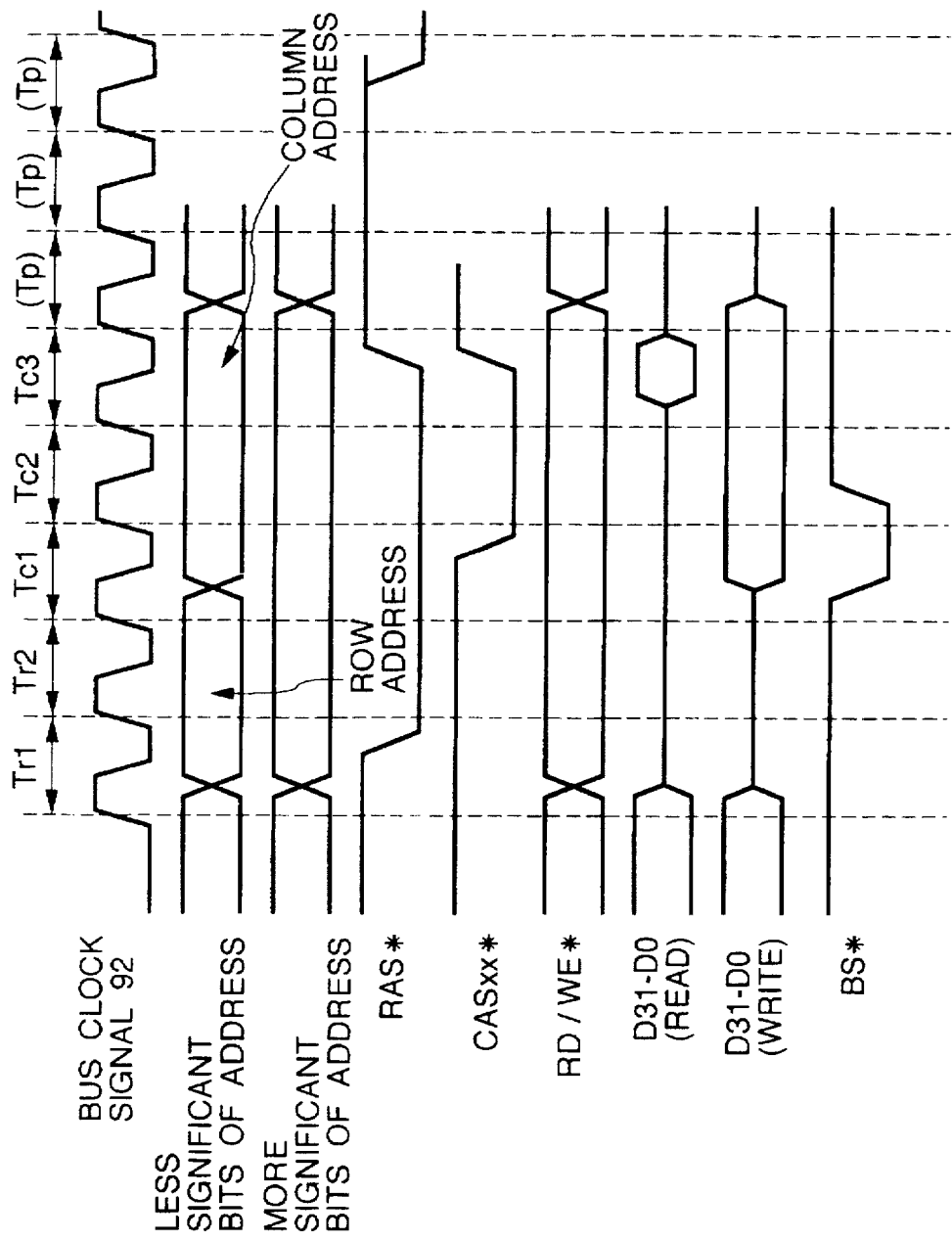
FIG. 29 is a timing chart of an access to an external DRAM by the microcomputer, to which is applied the present invention, when the bus clock signal frequency φ is 37.7 MHz ≦φ≦47 MHz.
Figure 30:
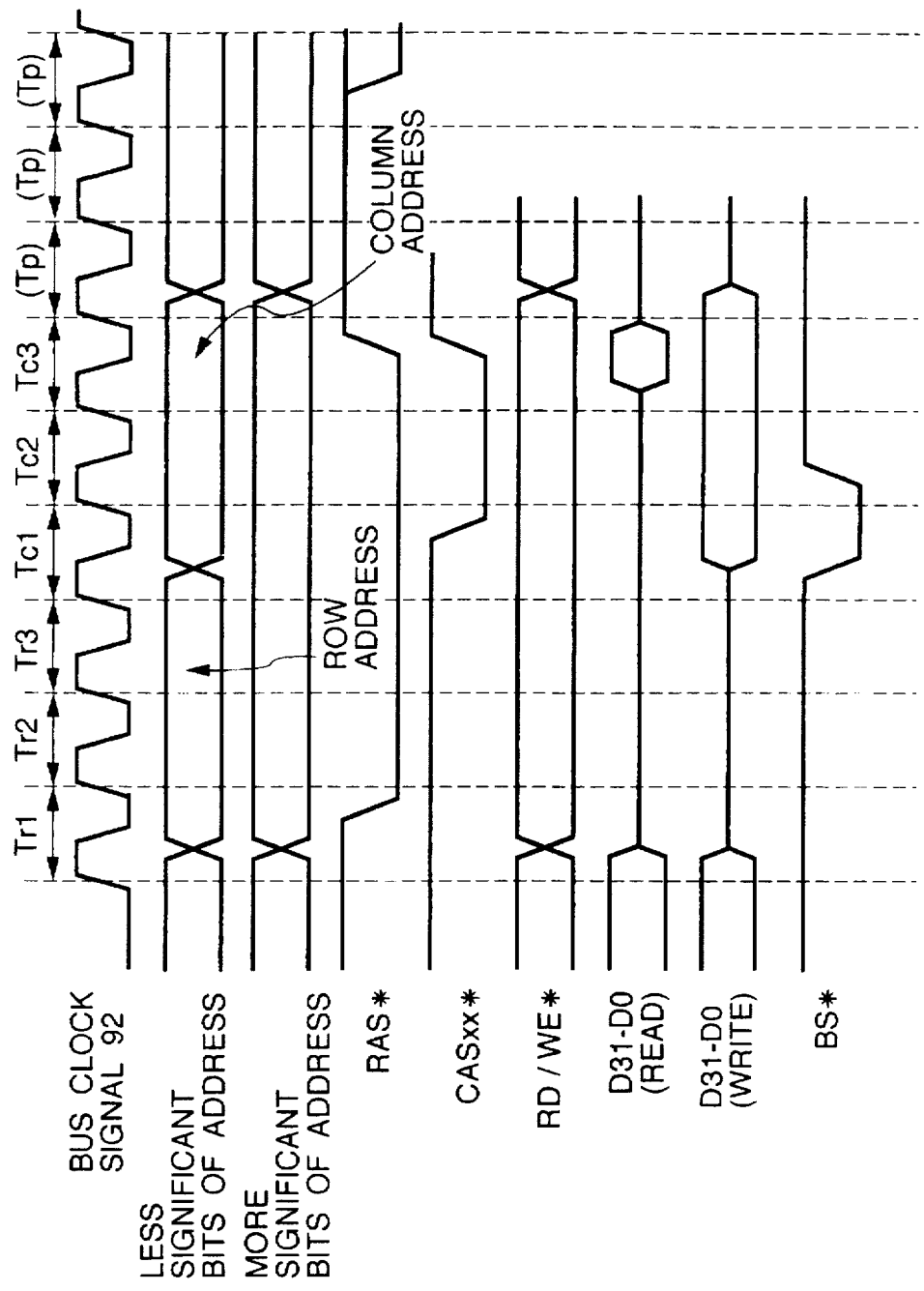
FIG. 30 is a timing chart of an access to an external DRAM by the microcomputer, to which is applied the present invention, when the bus clock signal frequency φ is 47.7 MHz ≦φ≦56 MHz.

FIGS. 26 to 30 show the example of the bus access timings of the DRAM, as shown in FIG. 22 or 23, with the changed frequency of the bus clock signal 92. The bus controller generates the various memory access control signals such as the row address strobe signal in synchronism with the bus clock signal 92 and inputs and outputs the data. In FIGS. 26 to 30: letters D31 to D0 designate the data; the address less significant bit are the address bits to be fed for the actual use to the DRAM; and the address more significant bits are address bits not to be fed to the DRAM. Letters BS# (BS*) designate a bus start signal indicating the start of the bus cycle, as is outputted by the bus controller 72 of the microcomputer 6. In FIGS. 26 to 30: characters Tr, Tr1, Tr2 and Tr3 designate row action states; characters Tc1, Tc2 and Tc3 designate column action states; and letters Tp designate a precharge action state. In FIG. 26, the bus clock signal 92 has a frequency φ smaller than 18.6 MHz, and the memory cycle of the DRAM has three cycles Tr, Tc1 and Tc2. In FIG. 27, the memory cycle of the DRAM (18.8 MHz ≦φ≦28.5 MHz) has five cycles Tr1, Tr2, Tc1, Tc2 and Tp. In FIG. 28, the memory cycle of the DRAM (28.5 MHz ≦φ≦37.7 MHz) has six cycles Tr1, Tr2, Tc1, Tc2, Tc3 and Tp. In FIG. 29, the memory cycle of the DRAM (37.7 MHz ≦φ≦47 MHz) has seven cycles Tr1, Tr2, Tc1, Tc2, Tc3, Tp and Tp. In FIG. 30, the memory cycle of the DRAM (47.7 MHz ≦φ≦56 MHz) has eight cycles Tr1, Tr2, Tr3, Tc1, Tc2, Tc3, Tp and Tp. Thus, the one memory access period (i.e., the cycle number of the bus clock signal 92) changes with the frequency of the bus clock signal 92 because the one memory access period matching the action speed of the external device such as the DRAM is determined according to the cycle number of the bus clock signal 92 while considering both the action speed of the external device of the DRAM and the period of the bus clock signal 92. The cycle number is different depending upon how high a operating speed is obtained by the external device adopted by the user of the microcomputer 6. When the same DRAM as that of the system, as is operated at the highest permissible speed with the cycle of FIG. 26, is operated at the highest permissible speed in another system having a higher frequency of the bus clock signal 92, the access cycle number has to be increased as large as those shown in FIGS. 27 to 30. In the present embodiment, the number of the fundamental bus clock signal cycles of the external bus access by the bus controller 72 can be arbitrarily set. This cycle number is set in the register in the bus controller by the external terminals, although not especially limited thereto.

Figure 31:
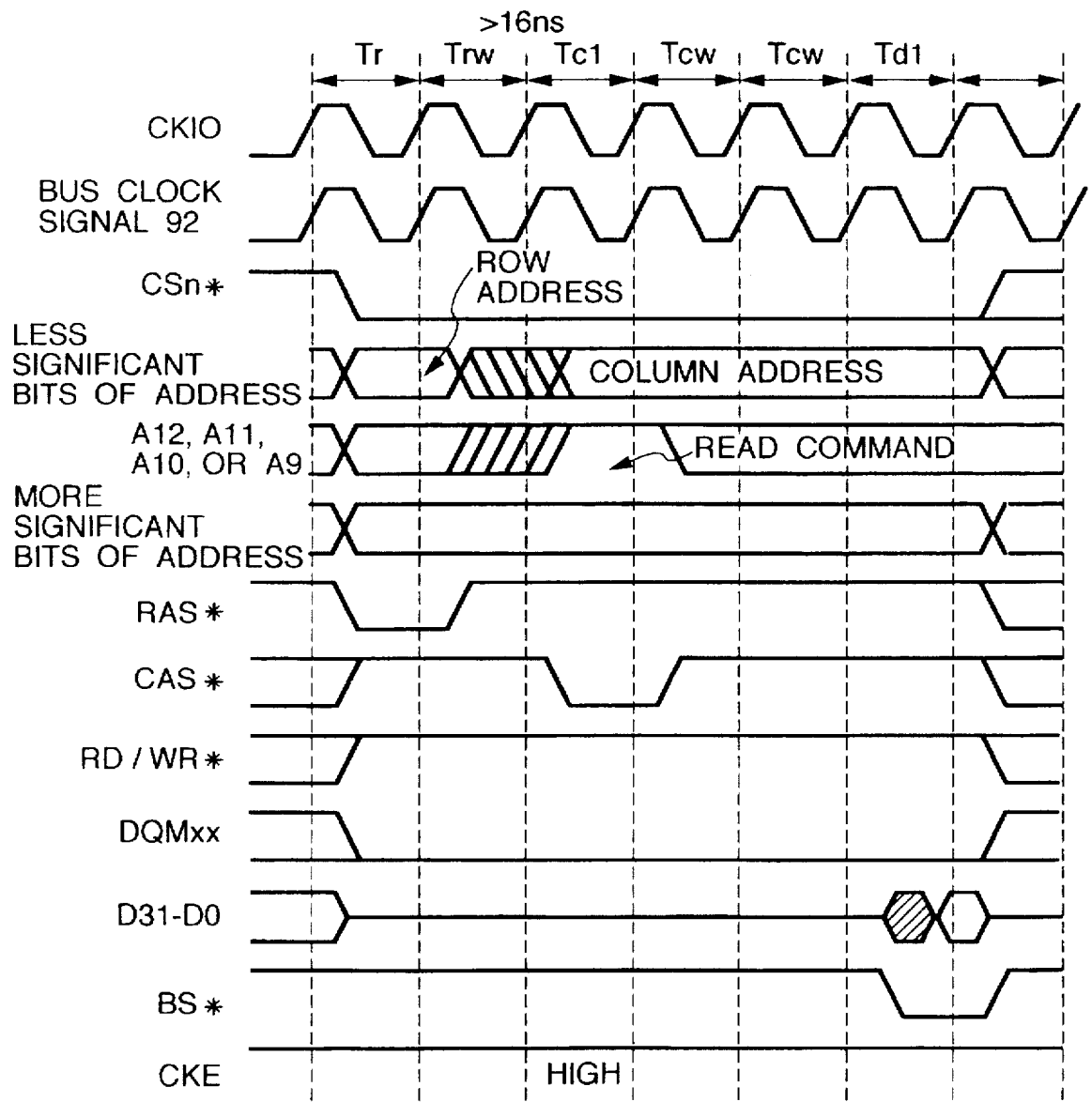
FIG. 31 is a timing chart of a read access to an SDRAM by the microcomputer to which is applied the present invention.
Figure 32:
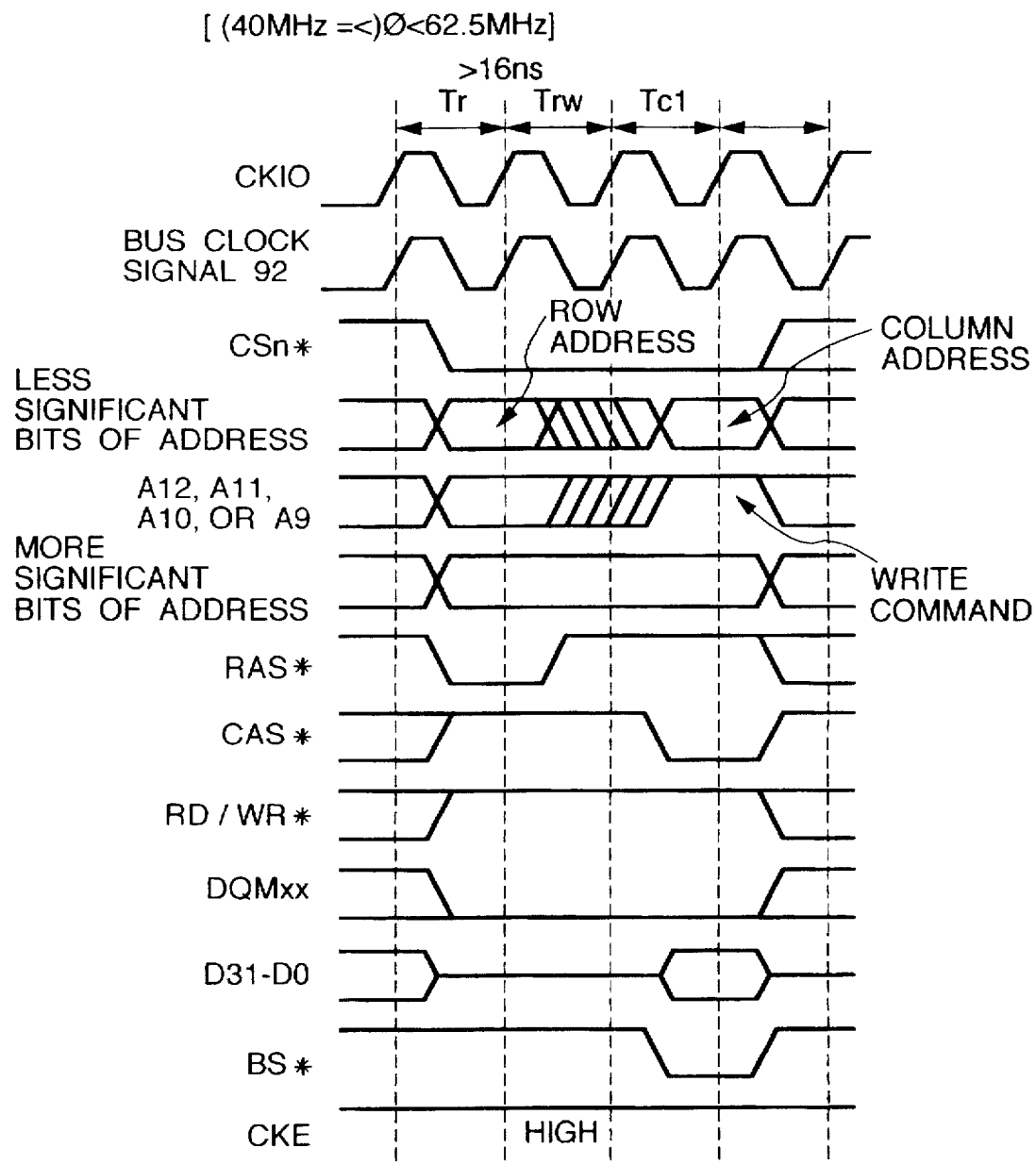
FIG. 32 is a timing chart of a write access to the SDRAM by the microcomputer to which is applied the present invention.

FIGS. 31 and 32 shows examples of the read/write bus access timings for the SDRAM, as shown in FIG. 24 or 25. In FIGS. 31 and 32, the characters D31 to D1 designate the data, and the address less significant bits are used as the row addresses and column addresses for selecting the memory cells of the SDRAM. The address A12, A11, A10 or A9 is used as the signal for instructing the action mode such as the read action by fetching the row address and the column address in the SDRAM or the write mode by fetching the column address. The address more significant bits imply the address bits which are not fed to the SDRAM. The signal BS#(BS*) is a bus start signal indicating the start of the bus cycle and is outputted by the bus controller 72 of the microcomputer 6. The bus controller 72 controls the bus in synchronism with the bus clock signal 92, as shown in FIGS. 31 and 32, at the time of accessing the address assigned to the SDRAM. This SDRAM receives the clock signal CLK, as outputted from the terminal CKIO of the microcomputer 6, and acts in synchronism with the received signal. In FIGS. 31 and 32, letters Tr indicate the row action state; letters Trw a wait state for elongating the Tr; characters Tc1 a column action state; letters Tcw a wait state for elongating the Tc1; and characters Td1 a data read state. The state number (or the bus clock signal cycle number) making the memory cycle is different for the read action and the write action. In the state Tr of FIG. 31, the row address is fetched, and the column address is fetched in the state Tc1 by the read command, so that the data are read out after three cycles (i.e., the cycle number of the bus clock signal or the external clock signal CLK outputted from the terminal CKIO) from the fall of the column address strobe signal CAS#(CAS*). In the state Tr of FIG. 32, the row address is fetched, and the column address is fetched in the state Tc1 by the write command so that the data are written.

According to the embodiment relating to the action frequency switching for the microcomputer 6 having the hierarchized internal bus, the following effects can be achieved.

(1) In the microcomputer 6 having its CPU bus 60, cache bus 70 and peripheral bus 80 hierarchized, the bus clock signal 92 is excluded from the clock signal having a dynamically variable frequency. Specifically, the CPU clock signal 91 and the peripheral clock signal 93 can have their frequencies dynamically changed depending upon the set content of the clock controller 65. However, the bus clock signal 92 is not subjected to the dynamic change of the signal frequency because it should be a clock signal according to the action speed of the external device such as the memory (e.g., external memory) connected through the input/output circuit 73. Even when the internal status of the clock pulse generator 9 is changed for changing the frequencies of the clock signals 91 and 93, the clock controller 6 controls the clock pulse generator 9 so that the frequency of the bus clock signal 92 may not be changed.

(2) Since the frequency of the CPU clock signal 91 can be dynamically variably controlled with the control data, the circuit module of the CPU bus 60, to which is coupled the central processing unit 61, can be operated at a high speed, if necessary, to improve the high-speed data efficiency. When a task requiring no high-speed action, on the contrary, the frequency of the clock signal can be lowered to realize the low power consumption.

(3) Since the frequency of the peripheral clock signal 93 can be dynamically variably controlled with the control data, the circuit module, as coupled to the peripheral bus 80, can have its action speed controlled independently of the remaining circuit modules according to its function and action status thereby to promote the low power consumption, because it belongs to the peripheral circuit module.

(4) In accordance with the statuses of the mode terminals MD0, MD1 and MD2 and the set value of the clock control register 650, the clock controller 65 controls the selecting state of the selector 944, in case the clock signals 91 to 93 are to be generated by the fundamental clock signal 915, so that the frequency of the bus clock signal 92 may be equal to that of the fundamental clock signal 915, and the selecting state of the selector 944, in case the clock signals 91 to 93 are generated by the clock signal fed from the terminal CKIO, so that the frequency of the bus clock signal 92 may be equal to that of the clock signal coming from the terminal CKIO. As a result, since the frequency of the bus clock signal 92 has to be held constant according to the permissible action speed of the external device connected with the outside, the frequency of the bus clock signal 92 can be automatically held at a constant level at the time of changing the selected status of the clock mode by the mode terminals MD0 to MD2 and the dynamic frequencies of the CPU clock signal 91 and the peripheral clock signal 93 through the clock control register 650.

(5) Since the external clock signal to be outputted from the terminal CKIO has its frequency equalized to that of the bus clock signal 92, the external device such as the SDRAM acting in synchronism with the clock signal is controlled by the bus controller (acting in response to the bus clock signal 92) 72 so that the clock signal to be outputted from the external terminal CKIO can be used as the clock signal for synchronizing the external device. As a result, the microcomputer 6 according to the present embodiment can facilitate access control for the clock synchronous type external device such as the SDRAM. In other words, such external device can be directly coupled through the external bus to control the access.

Although our invention has bee specifically described in connection with its embodiments, it should not be limited thereto but can naturally modified in various manners within the scope of the gist thereof.

As to the invention for controlling both the operation frequency and the supply voltage variably, for example, the setting of the control data for the storage means such as the mode register should not be limited to that effected by the CPU but can be executed by an external circuit through the data bus or through a predetermined external terminal. Moreover, the power supply of the circuit may be a negative one. In this case, the present invention is applied to the magnitude or change in the operating voltage by considering their absolute values. The circuit modules should not be limited to those described in the foregoing embodiments but can be suitably modified. In the embodiments, moreover, the change in the operating voltage may cover all the circuits in the target circuit modules, but the operating voltage of the interface circuit portion can be excluded from the target of the change, in case there arises a disadvantage in the relation to the remaining circuit modules or in the data transfer through the common bus. Especially in case the data processor is constructed of a multi-chip, the operating voltage of the interface portion of the individual circuit modules to be commonly connected with the external bus can be set at a constant level conforming to the data transfer specifications of the bus. On the other hand, in case the circuit modules have operation frequencies different from each other, the data transfer can be effected by the handshake control using wait signals, ready signals or busy signals. On the other hand, the data transfer can be effected without the handshake control if the frequencies can be switched while maintaining a constant relation such as 1/2 times in the frequencies to be mutually set for a specific circuit module. Since the frequency and the operating voltage can be switched for each task, the circuit modules can be mutually operated in a synchronous manner without any special restriction if the switchings are made by considering the resources to be used in that task.

As to the invention for controlling the operation frequency of the packaged circuit modules at the unit of the hierarchized internal bus, the target to have its operation frequency dynamically changed may be only the CPU clock signal or the peripheral clock signal. In the point that the power consumption is finely controlled without sacrificing the data processing performance, both the CPU clock signal and the peripheral clock signal may desirably have their frequencies variably controlled as in the foregoing embodiment.

The effects to be obtained by the representatives of the invention, as disclosed herein, will be briefly described in the following.

[1] As to the invention for controlling both the operation frequency and the operating voltage of the circuit modules, the control data for instructing the switching modes of the frequency of the clock signal and the operating voltage are set in the reloadable register or the remaining storage means by the central processing unit. As a result, the operating voltages and the operating frequencies of the control circuits can be freely switched by reloading the control data in accordance with the data processing performances and the proportions of the data processings to be executed. As a result, a low power consumption is preferred for the task or circuit module which requires no relatively high-speed data processing, but a high power consumption is allowed for the task or circuit module which requires a relatively high-speed data processing, so that the low power consumption is realized while improving the data processing efficiency as a whole. Moreover, the controls for lowering the power consumption while improving the data processing efficiency as a whole can be further finely realized by making it possible to switch the clock frequency and the supply voltage individually for a predetermined circuit module.

Thanks to the adoption of the first control circuit, the malfunctions can be prevented in the procedure of switching the frequency of the clock signal and the level of the operating voltage.

Thanks to the adoption of the second control circuit, it is possible to prevent in advance the fear of the malfunctions due to the undesired switching mode of the frequency and the supply voltage.

[2] As to the invention for switching the operation frequency of the packaged circuit modules at a unit of the hierarchized internal bus, by excluding the second clock signal such as the bus clock signal from the frequency-variable signal, that is, by the control of the clock controller to hold the frequency of the second clock signal at a predetermined level when the frequencies of the first and third clock signals are dynamically changed according to the control data, it is possible to satisfy the condition that the internal and external bus cycles or bus operations cannot be synchronized unless the frequency of the second clock signal for the second internal bus, to which is coupled the bus controller, is the frequency according tot the action speed of the external device coupled to the external bus.

Since the frequency of the CPU clock signal can be dynamically variably controlled with the control data, the circuit module of the first internal bus, to which is coupled the central processing unit, can be operated at a high speed, if necessary, to improve the high-speed data efficiency. When a task requiring no high-speed action, on the contrary, the frequency of the clock signal can be lowered to realize the low power consumption.

Since the frequency of the third clock signal can be dynamically variably controlled with the control data, the circuit module, as coupled to the third internal bus, can have its action speed controlled independently of the remaining circuit modules according to its function and action status thereby to promote the low power consumption, because it belongs to the peripheral circuit module.

In accordance with the statuses of the mode terminals and the set value of the clock control register, the clock controller controls the third frequency changing circuit, in case the first to third clock signals are to be generated by the fundamental clock signal coming from the first frequency changing circuit, so that the frequency of the second bus clock signal may be equal to that of the fundamental clock signal, and the third frequency changing circuit, in case the first to third clock signals are generated by the clock signal fed from the second connection terminal(CKIO), so that the frequency of the second clock signal may be equal to that of the clock signal coming from the terminal (CKIO). As a result, since the frequency of the second clock signal has to be held constant according to the permissible action speed of the external device connected with the outside, the frequency of the second clock signal can be automatically held at a constant level at the time of changing the selected status of the clock mode by the mode terminals and the dynamic frequencies of the first to third clock signals and the first and third clock signals through the clock control register.

Since the external clock signal to be outputted from the terminal (CKIO) has its frequency equalized to that of the second clock signal, the external device acting in synchronism with the clock signal is controlled by the bus controller (acting in response to the second clock signal) so that the clock signal be outputted from the terminal (CKIO) can be used as the clock signal for synchronizing the external device.

What is claimed is:

1. A data processor comprising:
   a circuit module operating in synchronism with a clock signal;
   a storage circuit storing control data for designating a frequency of the clock signal to be fed to said circuit module and an operating voltage to be fed to said circuit module;
   a clock generator outputting a clock signal having a frequency according to the control data of said storage means to said circuit module;
   a power circuit outputting an operating voltage having an absolute value according to the control data of said storage means to said circuit module; and
   a first control circuit controlling changes in the frequency of the clock signal to be outputted by said clock generator and in the absolute value of the operating voltage to be outputted by said power circuit,
   wherein the changes in the frequency of the clock signal and in the absolute value of the operating voltage are designated by changing the control data in the storage circuit, and wherein the operating voltage is prevented from being lowered in its absolute value prior to the lowering of the frequency of the clock signal if the change of the control data is an instruction to reduce the frequency of said clock signal and the absolute value of the operating voltage, and the frequency of the clock signal is prevented from being increased prior to the rise of the absolute value of the operating voltage if the change of the control data is an instruction to increase the clock signal frequency and the absolute value of the operating voltage.

2. A data processor according to claim 1,
   wherein said clock generator includes an output gate for stopping the outputting of the clock signal for a predetermined time period in response to the control data from said first control circuit, at a time of change in the frequency of the clock signal to be outputted.

3. A data processor according to claim 1, further comprising:
   a second control circuit coupled to the storage circuit and controlling changes in the frequency of the clock signal to be outputted by said clock generator and in the absolute value of the operating voltage to be outputted by said power circuit on the basis of control data before and after the change of the control data in the storage circuit, wherein the second control circuit controls so as to inhibit the changes in the frequency of the clock signal to be outputted by said clock generator and in the absolute value of the operating voltage to be outputted by said power circuit if the control data in the storage circuit designates that the frequency of the clock signal is risen without rising the absolute value of the operating voltage and that the absolute value of the operating voltage is lowered without lowering the frequency of the clock signal.

4. A data processor according to claim 1,
   wherein said circuit module includes a plurality of circuit modules,
   wherein said storage circuit includes a plurality of storage regions each of which reloadably stores control data corresponding to each of said circuit modules,
   wherein said clock generator includes a selector selecting an clock signal to be fed to a circuit module in accordance with the corresponding control data of said storage regions in said storage circuit, and
   wherein said power circuit includes a selector selecting an operating voltage to be fed to a circuit module in accordance with the corresponding control data of said storage regions in said storage circuit.

5. A data processor according to claim 4,
   wherein one of said circuit modules is a central processing unit,
   wherein one of said circuit modules is a circuit module whose operation is controlled by said central processing unit, and
   wherein said circuit modules are included in a single-chip microcomputer formed on one semiconductor substrate.

6. A data processor according to claim 4,
   wherein said circuit modules, said storage circuit, said first control circuit and said second control circuit are included in a semiconductor chip, and
   wherein said clock generator and said power circuit are disposed outside of said semiconductor chip.

7. A data processor according to claim 4,
   wherein first one of said circuit modules is a central processing unit,
   wherein second one of said circuit modules is a circuit module whose operation is controlled by said central processing unit,
   wherein said central processing unit, said second one of the circuit modules, said storage circuit, said first control circuit and said second control circuit are included in a semiconductor chip, and
   wherein one of the circuit modules excepting said central processing unit and the second one of the circuit modules, said clock generator and said power circuit are disposed outside of said semiconductor chip.

8. A data processor according to claim 4, wherein said storage circuit is a register to be accessed by said central processing unit.

9. A single-chip microcomputer comprising:

a central processing unit operating in accordance with a clock signal;

an input/output circuit;

a peripheral circuit operating in accordance with a clock signal;

a bus controller operating in accordance with a clock signal and controlling an interface with an external bus to be disposed outside of said single-chip microcomputer, through said input/output circuit;

a first internal bus to which is coupled said central processing unit;

a second internal bus, to which is coupled said bus controller and to which is coupled said central processing unit while interfacing with the external bus through said input/output circuit;

a third internal bus to which is coupled said peripheral circuit;

a clock generator outputting a first clock signal for the central processing unit coupled to said first internal bus, a second clock signal for the bus controller coupled to said second internal bus, and a third clock signal for the peripheral circuit coupled to said third internal bus; and a clock controller coupled to said first internal bus and to the clock generator, and changing a frequency of the first clock signal without changing a frequency of the second clock signal in accordance with control data set by said central processing unit.

10. A single-chip microcomputer according to claim 9, further comprising:

an output terminal an external clock signal to be fed to a circuit module to be coupled to said external bus.

wherein said clock controller outputs a clock signal having a frequency equal to that of said external clock signal, as said second clock signal.

11. A single-chip microcomputer according to claim 10, further comprising:

a cache memory unit coupled to said first internal bus and said second internal bus for effecting the interfaces between said first internal bus and said second internal bus.

12. A data processor, as constructed into a single-chip microcomputer, comprising:

a first internal bus to which is coupled a central processing unit;

a second internal bus interfacing through an input/output circuit with an external bus disposed outside of said data processor and to which is coupled a bus controller for controlling the interface with said external bus;

a third internal bus to which is coupled a predetermined peripheral circuit;

a clock pulse generator for outputting a first clock signal for a circuit module coupled to said first internal bus, a second clock signal for a circuit module coupled to said second internal bus, and a third clock signal for a circuit module coupled to said third internal bus; and a clock controller for controlling the frequencies of said first to third clock signals individually, wherein said clock pulse generator includes: first frequency changing means connected with a first connection terminal adapted to be coupled to a clock generator disposed outside; second frequency changing means coupled to a second connection terminal adapted to be coupled to said clock generator; select means for selecting one of said first and second frequency changing means; third frequency changing means for making said first to third clock signal frequencies individually changeable in response to the clock signal selected by said select means; and a clock signal output path for outputting the clock signal, which is outputted from said first frequency changing means, as an external clock signal, and wherein said clock controller includes a clock control register coupled to an external clock mode terminal and having control data set by said central processing unit for especially designating the frequency changing ratios of said first and third clock signals by said third frequency changing means and for designating the frequency changing ratio by said second frequency changing means, wherein said clock controller decides the frequency changing ratio by said first frequency changing means in accordance with the status of said external clock mode terminal, to select a first state, in which said third frequency changing means is controlled so that a clock signal can be transmitted from said first connection terminal to the input of said third frequency changing means and so that said second clock signal frequency may be equal to the frequency of the clock signal outputted from said first frequency changing means, and a second state, in which a clock signal can be transmitted from said second connection terminal to the input of said third frequency changing means, wherein said clock controller controls the frequency changing ratio by said second frequency changing means and the frequency changing ratios of said first and third clock signals by said third frequency changing means variably according to the control data set in said clock control register, and controls the frequency changing ratio of said second clock signal by said third frequency changing means in said second state designated at said clock mode terminal in accordance with the control data set in said clock control register, so that the frequency of said second clock signal may be equal to the frequency of the clock signal fed from said second connection terminal.

13. A data processor according to claim 12, further comprising:

connection means for connecting the output of said first frequency changing means to the input of said second frequency changing means in said first state designated at said clock mode terminal.

14. A data processor according to claim 13, wherein said clock signal output path is coupled to said second connection terminal.

15. A data processor according to claim 14, wherein said first frequency changing means includes: a frequency diver and a phase locked loop circuit for selecting either of the clock signal coming from an oscillator having its oscillation element attached to said first connection terminal and adapted to oscillate or the clock signal fed directly from said first connection terminal and for receiving the selected clock signals individually; and select means for outputting either of the outputs as a fundamental clock signal, and wherein said second frequency changing means includes a phase locked loop circuit.

16. A single-chip microcomputer comprising:

a central processing unit;

a circuit module operating in synchronism with a clock signal;

a register stores control data for designating a frequency of the clock signal to be fed to said circuit module and an operating voltage to be fed to said circuit module;

a clock generator outputting a clock signal having a frequency according to the control data of said register to said circuit module;

a power circuit outputting an operating voltage having an absolute value according to the control data of said register to said circuit module; and a first control unit controlling changes in the frequency of the clock signals to be outputted by said clock generator and in the absolute value of the operating voltage to be outputted by said power circuit, wherein the changes in the frequency of the clock signal and in the absolute value of the operating voltage are designated by changing the control data in the storage circuit, and wherein the operating voltage is prevented from being lowered in its absolute value prior to the lowering of the frequency of the clock signal if the change of the control data is an instruction to reduce the frequency of said clock signal and the absolute value of the operating voltage, and the frequency of the clock signal is prevented from being increased prior to the rise of the absolute value of the operating voltage if the change of the control data is an instruction to increase the clock signal frequency and the absolute value of the operating voltage, in which the operating voltage is lowered in its absolute value prior to the change in the frequency, when it detects an instruction to reduce the frequency of said clock signal and the operating voltage in its absolute value, and by blocking the state, in which the clock signal having its frequency increased is outputted prior to the rise of the operating voltage in its absolute value, when it detects an instruction to increase the clock signal frequency and the operating voltage in its absolute value], wherein the changes in the frequency of the clock signal and in the absolute value of the operating voltage are designated by changing the control data in the storage circuit, and wherein the first control circuit controls so as to prevent the absolute value of the operating voltage from being lowered prior to a lower in the frequency of the clock signal if the change of the control data instructs both of a lower in the frequency of the clock signal and a lower in the absolute value of the operating voltage, and so as to prevent the frequency of the clock signal from being risen prior to a rise in the absolute value of the operating voltage if the change of the control data instructs both of a rise in the frequency of the clock signal and a rise in the absolute value of the operating voltage.

17. A data processor according to claim 16, wherein said clock generator includes an output gate for stopping the outputting of the clock signal for a predetermined time period in response to the control data from said first control circuit, at a time of change in the frequency of the clock signal to be outputted.

18. A data processor according to claim 16, further comprising:

second control circuit coupled to the register and controlling changes in the frequency of the clock signal to be outputted by said clock generator and in the absolute value of the operating voltage to be outputted by said power circuit on the basis of control data before and after the change of the control data in the register, wherein the second control circuit controls so as to inhibit the changes in the frequency of the clock signal to be outputted by said clock generator and in the absolute value of the operating voltage to be outputted by said power circuit if the control data in the register designates that the frequency of the clock signal is risen without rising the absolute value of the operating voltage and that the absolute value of the operating voltage is lowered without lowering the frequency of the clock signal.

19. A data processor according to claim 16, wherein said circuit module includes a plurality of circuit modules, wherein said register includes a plurality of storage regions each of which reloadably stores control data corresponding to each of said circuit modules, wherein said clock generator includes a selector selecting a clock signal to be fed to each of the circuit modules in accordance with the control data of a corresponding storage region in the storage regions in said register, and wherein said power circuit includes a selector selecting an operating voltage to be fed to a circuit module in the circuit modules in accordance with control data of a corresponding storage region in the storage regions in said register.

20. A data processor according to claim 19, wherein said register is a register to be accessed to by said central processing unit.

21. A single-chip microcomputer comprising:

a central processing unit operating in accordance with a clock signal;

an input/output circuit;

a peripheral circuit operating in accordance with a clock signal;

a bus controller operating in accordance with a clock signal and controlling an interface with an external bus to be disposed outside of said single-chip microcomputer, through said input/output circuit;

a clock generator outputting a first clock signal for the central processing, a second clock signal for the bus controller, and a third clock signal for the peripheral circuit; and a clock controller coupled to the clock generator, and changing a frequency of the first clock signal without changing a frequency of the second clock.

22. A single-chip microcomputer according to claim 21, wherein said peripheral circuit includes a timer circuit and a serial interface circuit.

23. A single-chip microcomputer according to claim 22, further comprising:

a first internal bus coupled to the central processing unit, a cache memory unit and to an address translation table;

a second internal bus coupled to the input/output circuit and to the bus controller; and a third bus coupled to the timer circuit and to the serial interface circuit.

* * * * *

UNITED STATES PATENT AND TRADEMARK OFFICE
CERTIFICATE OF CORRECTION

| | |
|---|---|
| PATENT NO. | : 5,778,237 |
| APPLICATION NO. | : 08/572677 |
| DATED | : July 7, 1998 |
| INVENTOR(S) | : Mitsuyoshi Yamamoto et al. |

It is certified that error appears in the above-identified patent and that said Letters Patent is hereby corrected as shown below:

In Col. 33, lines 42-43 (Claim 1), please replace "storage means" with --storage circuit--.

In Col. 33, line 45 (Claim 1), please replace "storage means" with --storage circuit--.

In Col. 33, line 63 (Claim 1), please replace "clock signal frequency" with --frequency of the clock signal--.

Signed and Sealed this
Twenty-seventh Day of March, 2012

David J. Kappos
*Director of the United States Patent and Trademark Office*